(12) United States Patent
Adachi et al.

(10) Patent No.: US 8,111,357 B2
(45) Date of Patent: Feb. 7, 2012

(54) OPTICAL ELEMENT AND DISPLAY DEVICE USING THE SAME

(75) Inventors: Masaya Adachi, Hitachi (JP); Osamu Itou, Hitachi (JP); Shinichi Komura, Hitachi (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 915 days.

(21) Appl. No.: 11/271,802

(22) Filed: Nov. 14, 2005

(65) Prior Publication Data

US 2006/0103782 A1    May 18, 2006

(30) Foreign Application Priority Data

Nov. 15, 2004   (JP) ................. 2004-329941

(51) Int. Cl.
    *G02F 1/1335*  (2006.01)
(52) U.S. Cl. ........... 349/96; 349/74; 349/75; 349/76; 349/77; 349/78; 349/79; 349/80; 349/81; 349/82; 349/83
(58) Field of Classification Search .......... 349/123–130, 349/73–83, 117–121
    See application file for complete search history.

(56) References Cited

U.S. PATENT DOCUMENTS

| | | | |
|---|---|---|---|
| 4,097,128 A * | 6/1978 | Matsumoto et al. | 349/78 |
| 4,564,266 A * | 1/1986 | Durand et al. | 349/177 |
| 5,583,679 A | 12/1996 | Ito et al. | |
| 6,693,695 B2 * | 2/2004 | Okada et al. | 349/130 |
| 2002/0063829 A1 * | 5/2002 | Manabe et al. | 349/117 |
| 2005/0190329 A1 * | 9/2005 | Okumura | 349/123 |

FOREIGN PATENT DOCUMENTS

| | | |
|---|---|---|
| EP | 1475655 | 11/2004 |
| JP | A-5-108023 | 4/1993 |
| JP | A-9-105958 | 4/1997 |
| JP | A-10-268251 | 9/1998 |
| JP | 2000066193 A * | 3/2000 |
| JP | 2000-147250 | 5/2000 |
| JP | 2000-338489 | 12/2000 |

OTHER PUBLICATIONS

Office Action issued for the counterpart Chinese application as of Nov. 14, 2007.

* cited by examiner

*Primary Examiner* — Thanh-Nhan P Nguyen
(74) *Attorney, Agent, or Firm* — Antonelli, Terry, Stout & Kraus, LLP.

(57) ABSTRACT

An optical element is arranged in such a manner that a screen thereof can be hardly observed from a predetermined direction, and a deterioration of an image quality caused by moire does not occur. The optical element is constituted by a first polarizing layer, a second polarizing layer, and a liquid crystal layer arranged between these two polarizing layers. In the optical element, absorption axes of the first polarizing layer and the second polarizing layer are located parallel to each other; the liquid crystal layer is made of hybrid-aligned discotic liquid crystal; and an alignment axis of the liquid crystal layer is located parallel to, or perpendicular to both absorption axes of the first polarizing layer and of the second polarizing layer.

6 Claims, 36 Drawing Sheets

ILLUMINATING DEVICE SIDE

ILLUMINATING
DEVICE SIDE

FIG. 27
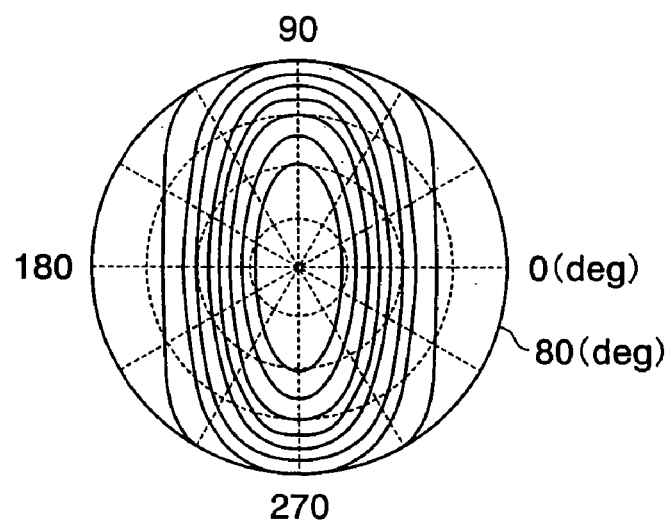
EQUI-TRANSMITTANCE DIAGRAM
APPLIED VOLTAGE OF 2V
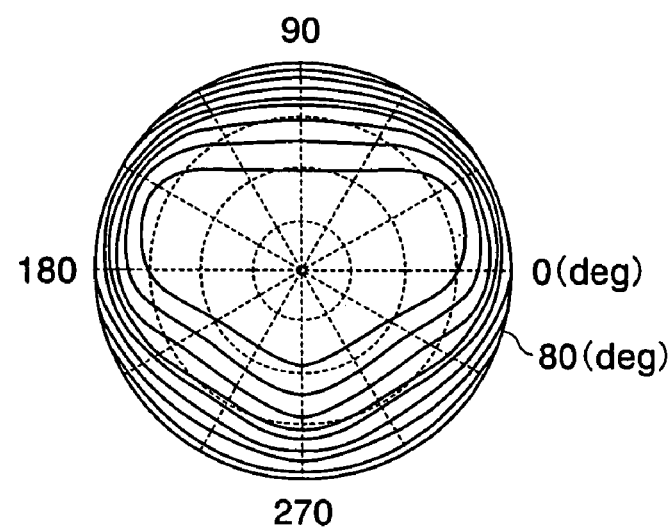
EQUI-TRANSMITTANCE DIAGRAM
APPLIED VOLTAGE OF 9V

OPTICAL ELEMENT AND DISPLAY DEVICE USING THE SAME

BACKGROUND OF THE INVENTION

1. Field of the Invention

The present invention relates to an optical element capable of varying view angles of a screen in display device, and a display device equipped with such optical element.

2. Description of the Related Art

As to screens of display devices, wide view angles are required which are effective in such a case that these screens are observed by a large number of viewers, and in contrast, narrow view angles are required in order that contents of screens are peeped by a third party, namely, various conditions are required for these screens of the display devices in response to use circumstances thereof.

As optical elements capable of narrowing view angles of screens of display devices, such a film that optical absorption layers and transparent layers are alternately arranged in a louver shape (will be referred to as "louver film" hereinafter) has been practically available.

Louver films have been commercially available as product names of "Light Control Film" marketed by 3M Company, or "View Control Film" marketed by Shin-Etsu Polymer Co., Ltd. Louver films have been utilized so as to avoid peeping actions for screens in public-use appliances such an ATMs (Automated Teller Machines), or in mobile appliances such as portable telephones.

In addition to such display devices which limit view angles by employing optical elements, for instance, louver films, other type of display devices capable of arbitrarily switching a view angle between a condition under which the view angle is wide and another condition under which the view angle is narrow have been proposed.

For example, JP-A-5-108023 discloses such a display device equipped with a plane-shaped light source, an optical shutter plate constituted by two polarizing films and a twisted nematic liquid crystal cell arranged between these two polarizing films, and an optical path control plate constructed of a micro lens array, which is provided on a rear plane of a display-purpose liquid crystal cell.

In this display device, since light emitted from the plane light source is limited by the optical shutter plate, a region on which light passes can be formed at an arbitrary position. Also, a positional relationship between the position of the micro lens array and the light passing region changes, so that the optical path is controlled so as to switch the view angles.

As another liquid crystal display device capable of switching view angles, such a display device has been proposed in which a display-purpose liquid crystal cell and a view angle control-purpose liquid crystal cell are arranged between two sheets of polarizing films.

As such a display device, JP-A-10-268251discloses a control method for a display device in which a twisted nematic liquid crystal layer is provided on a liquid crystal layer of a display-purpose liquid crystal cell, and also, a twisted nematic liquid crystal layer is provided on a liquid crystal layer of a view angle control-purpose liquid crystal cell. In this case, a proper voltage is applied to the view angle control-purpose liquid crystal cell, so that a view angle range during which the contrast ratio thereof becomes larger than or equal to a predetermined value can be changed.

Also, JP-A-9-105958 discloses such a display device. That is, under such a condition that liquid crystal molecules of a view angle control-purpose liquid crystal cell are aligned along a direction parallel to a substrate which constitutes a liquid crystal cell, or under such an isotropic condition by heating liquid crystal, a view angle characteristic similar to that of the conventional liquid crystal display device may be obtained; and in such a case that liquid crystal molecules of a view angle control-purpose liquid crystal cell are aligned along a vertical direction with respect to a substrate, a view angle can be made narrow.

As an optical element (will be also referred to as "view angle limiting element" hereinafter) which narrows view angles of screens of display devices, a louver film has been practically used. The louver film owns a periodic structure in which an optical absorption layer and a transparent layer are alternately arranged.

As a result, the louver film owns the following problem. That is, moire may occur between a pixel array of display elements and the periodic structure of the louver film, so that an image quality is deteriorated. Further, since the louver film is equipped with the optical absorption layer, this louver film owns another problem that a portion of light is absorbed by the optical absorption layer even along a front plane direction, so that transmittance for light is lowered. Also, the louver film basically corresponds to such an optical element which limits transmissions of light along two opposite directions, for example, an upper side and a lower side of a screen, or a right side and a left side of the screen.

SUMMARY OF THE INVENTION

The present invention has been made to solve the above-described problems of the conventional techniques, and therefore, has a first object to realize a view angle limiting element which has no deterioration of an image quality, which is caused by an occurrence of moire.

Also, the present invention is to realize a view angle limiting element capable of obtaining higher transmittance for light when the view angle limiting element is applied to a liquid crystal display element.

Also, the present invention is to realize a view angle controlling element capable of darkening a screen not along two directions, but only one predetermined direction.

As previously explained, as the display device capable of arbitrarily switching the condition between a condition under which the view angle are wide and another condition under which the view angle are narrow, such a display device has been proposed which is equipped with the plane-shaped light source, the optical shutter plate, and the optical path control plate on the rear plane of the display-purpose liquid crystal cell. Also, the display device has been provided in which both the display-purpose liquid crystal cell and the view angle control-purpose liquid crystal cell are arranged between the two polarizing plates.

In the former display device, an expensive optical member such as a macro lens array is required as the optical path control plate. Furthermore, since the macro lens array must be precisely positioned with respect to the optical shutter, there is a problem that the product cost is increased. Also, there is another problem that the moire is produced between the periodic structure of the macro lens array and the pixel array of the display-purpose liquid crystal cell, and thus, this moire may conduct the deterioration in the image quality.

On the other hand, in the latter-mentioned display device, the contrast ratio of the screen is lowered along the oblique direction, or the gradation is inverted, so that the image can be hardly recognized.

In this case, although the visibility of the image when this image is observed along the oblique direction is deteriorated, a portion of the light is leaked from the screen. As a result, in an on-vehicle type display device, this latter-mentioned display device cannot effectively function as such a purpose capable of suppressing that an image falls on a windshield in night time.

Also, for example, even when the visibility of the image is deteriorated by inverting the gradation, character information can be read. As a result, there are some cases that a sufficient effect cannot be obtained in view of prevention as to peeping actions.

Also, in such a case that the narrow view angle condition is realized under such a condition that the liquid crystal molecules are aligned along the vertical direction with respect to the substrate which constitutes the liquid crystal cell, in an actual case, as to the vertically aligned liquid crystal, no phase difference is produced in such a light which is traveled at an azimuth angle parallel to a polarizing axis and at an azimuth angle perpendicular to the polarizing axis with respect to linearly polarized light which is entered to this liquid crystal, so that there are four directions along which the view angles cannot be controlled.

One of objects of the present invention is to solve the above-described problems of the conventional techniques, and to provide a view angle controlling element for controlling a view angle, or to provide a display device using this view angle control element, while the view angle controlling element limits transmissions of light at a predetermined azimuth angle and in an polar angle image, and further, even when the view angle controlling element is combined with such a display element as a liquid crystal display panel, there is no a deterioration of image qualities caused by moire.

To achieve the above-described objects, the present invention employs, for example, the below-mentioned means.

An optical element is constituted by a first polarizing layer, a second polarizing layer, and a liquid crystal layer arranged between these two polarizing layers. In the optical element, absorption axes of linearly polarized light of the first polarizing layer and the second polarizing layer are arranged so as to be located parallel to each other; the liquid crystal layer is made of hybrid-aligned discotic liquid crystal; and an alignment axis of the liquid crystal layer is located parallel to, or perpendicular to both absorption axes of the first polarizing layer and of the second polarizing layer.

Also, an optical element is constituted by a first polarizing layer, a second polarizing layer, and a liquid crystal layer arranged between these two polarizing layers. In the optical element, absorption axes of polarized light of the first polarizing layer and the second polarizing layer are located parallel to each other; the liquid crystal layer is made of hybrid-aligned nematic liquid crystal; and an alignment axis of the liquid crystal layer is located parallel to, or perpendicular to both absorption axes of the first polarizing layer and of the second polarizing layer. Further, an optically negative mono-axial medium is provided on the side under which liquid crystal molecules are vertically, or substantially vertically aligned, and an absolute value of a phase difference value "Rth" of the mono-axial medium is larger than 100 nm. It should be noted that in the above-explained optical element, two, or more layers of the liquid crystal layers may be stacked on each other in order to obtain a desirable optical characteristic.

Also, in such a case that this optical element is applied to a crystal liquid display device, while the optical element is arranged between an illuminating device and a liquid crystal display panel, a reflection type polarizing layer may be provided on the side of a light source for both, or at least one of the first polarizing layer and the second polarizing layer.

Alternatively, both, or at least one of the first polarizing layer and the second polarizing layer may be made of a reflection type polarizing layer.

Furthermore, a diffusing/reflecting means for diffusing/reflecting light returned to the illuminating device may be preferably provided.

Also, an optical element is constituted by a first polarizing layer, a second polarizing layer, and a liquid crystal layer arranged between these two polarizing layers. In the optical element, absorption axes of the two polarizing layers are intersected to each other at a right angle; the liquid crystal layer is made of rod-shaped liquid crystal molecules; alignment axes of the rod-shaped liquid crystal molecules are located parallel to, or perpendicular to absorption axes of the respective polarizing layers located in the vicinity of the alignment axes of the rod-shaped liquid crystal molecules and are twisted; and the rod-shaped liquid crystal molecules are fixed to such an alignment condition that an effective phase difference becomes 0 at a predetermined azimuth angle and along a predetermined polar angle direction.

Also, in an optical element equipped with a first polarizing layer, a second polarizing layer, a third polarizing layer, a first liquid crystal layer, and a second liquid crystal layer, the first liquid crystal layer is arranged between the first polarizing layer and the second polarizing layer; and the second liquid crystal layer is arranged between the second polarizing layer and the third polarizing layer. The first polarizing layer, the second polarizing layer, and the third polarizing layer are arranged in such a manner that an absorption axis of the first polarizing layer is located parallel to an absorption axis of the third polarizing layer, and an absorption axis of the second polarizing layer is located perpendicular to the absorption axis of the first polarizing layer and the absorption axis of the third polarizing layer; both the first liquid crystal layer and the second liquid crystal layer are made of rod-shaped liquid crystal molecules; and alignment axes of the rod-shaped liquid crystal molecules are located parallel to, or perpendicular to absorption axes of the respective polarizing layers located in the vicinity of the alignment axes of the rod-shaped liquid crystal molecules and are twisted; and the rod-shaped liquid crystal molecules are fixed to such an alignment condition that an effective phase difference becomes 0 at a predetermined azimuth angle and along a predetermined polar angle direction.

Also, in a display device equipped with the above-described optical element, an illuminating device, and a liquid crystal display panel, the liquid crystal display panel is provided with two polarizing layers and a liquid crystal layer. In this display device, since transmittance of light emitted from a back light is controlled, image light is formed. The optical element is arranged by that one polarizing layer for constituting this optical element may function as a polarizing layer for constituting the liquid crystal display panel.

Also, an optical element is provided with a first transparent substrate, a second transparent substrate located opposite to the first transparent substrate, and a liquid crystal layer between these transparent substrates. In the first and second transparent substrates, transparent electrodes and alignment films are provided on respective opposite planes thereof. While liquid crystal molecules of the liquid crystal layer correspond to nematic liquid crystal whose dielectric anisotropy is positive, the nematic liquid crystal is aligned under such a condition that liquid crystal molecules are vertically, or substantially vertically aligned with respect to a substrate plane on the side of the first transparent substrate, and also, are aligned parallel to, or substantially parallel with respect to a substrate plane on the side of the second transparent substrate. An optically negative mono-axial anisotropic medium is provided on the side of the first transparent substrate. Further, while polarizing layers are provided on both sides of the first transparent substrate and the second transparent substrate of the liquid crystal layer, absorption axes of these polarizing layers are located parallel to each other; and the alignment axis of the liquid crystal layer on the side of the second transparent substrate are located parallel to, or perpendicular to the absorption axes of the polarizing layers.

Also, in the optical element, a reflection type polarizing layer may be provided on the side of a light source for both, or at least one of the first polarizing layer and the second polarizing layer. Alternatively, both, or at least one of the first polarizing layer and the second polarizing layer may be made of a reflection type polarizing layer. In addition, while an illuminating device is provided on a rear plane of a view angle controlling element, a diffusing/reflecting means may be provided which diffuses/reflects such a light which is reflected by the reflection type polarizing layer and is returned to the illuminating device.

Also, an optical device is provided with a first transparent electrode, a second transparent substrate located opposite to the first transparent substrate, a liquid crystal layer between these substrates, a first polarizing layer, and a second polarizing layer, which are formed on the liquid crystal layer on both sides of the first transparent substrate and the second transparent substrate. The absorption axes of polarized light of the two polarizing layers are located perpendicular to each other; and the liquid crystal layer is made of nematic liquid crystal whose dielectric anisotropy is positive. The alignment axis of this nematic liquid crystal is twisted in such a manner that this alignment axis is located parallel to, or perpendicular to the absorption axes of the polarizing layers located in the proximity thereto. Further, the value of "Δnd" of the liquid crystal layer is larger than, or equal to 2000 nm.

Alternatively, this optical element may be stacked in a multilayer form. In this alternative case, two polarizing layers arranged between the twist-aligned liquid crystal layers may be realized by one polarizing layer. Further, at this time, the alignment directions of the liquid crystal molecules of the liquid crystal layers may be arranged in such a manner that these alignment directions are different from each other among the plural liquid crystal layers. Also, in a display device equipped with a liquid crystal display panel, an illuminating device arranged on a rear surface of the panel, and the above-described optical element, the liquid crystal display panel owns two polarizing layers, and a liquid crystal layer; and since transmittance of light emitted from the illuminating device is controlled, image light is formed. The view angle controlling element is arranged by that one of the polarizing films for constituting this element may function as the polarizing layer for constituting the liquid crystal display panel.

Also, a reflection type polarizing layer may be alternatively arranged on the light source side of the second polarizing layer. Otherwise, the second polarizing layer may be constituted as a reflection type polarizing layer. In addition, while an illuminating device is provided on a rear plane of the optical element, a diffusing/reflecting means may be provided which diffuses/reflects such a light which is reflected by the reflection type polarizing layer and is returned to the illuminating device.

It then becomes possible to provide the optical element, or the display device using this optical element, which limit transmissions of light at a predetermined azimuth angle and in a predetermined polar angle range, while the view angle is controlled. Further, even when this optical element is combined with such a display element as a liquid crystal display panel, there is no deterioration of the image quality caused by moire.

BRIEF DESCRIPTION OF THE DRAWINGS

FIG. 27 is an equi-transmittance diagram for representing an example of an optical characteristic of the view angle controlling element of the present invention.

DETAILED DESCRIPTION OF THE EMBODIMENTS

Referring now to drawings, various embodiment modes of the present invention will be described.

Embodiment 1

Figure 1:
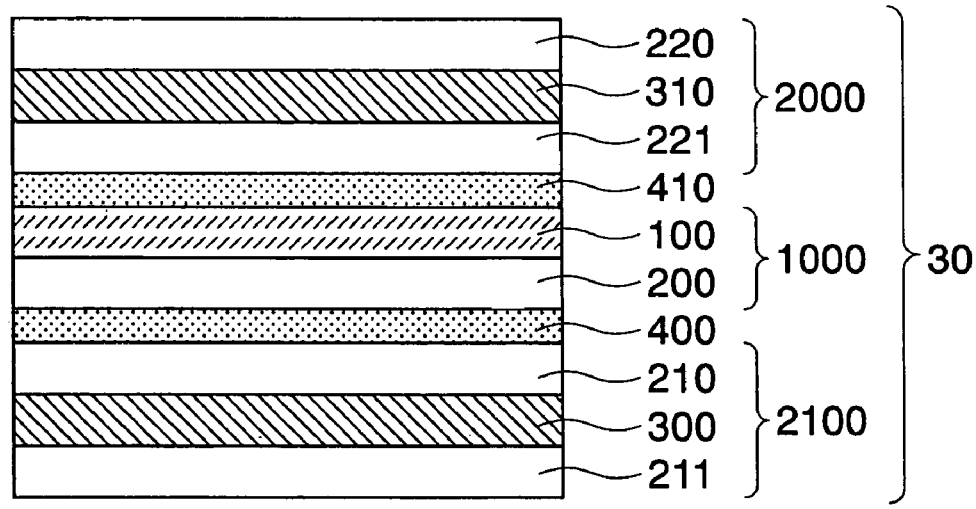
FIG. 1 is a schematic sectional view for explaining a view angle limiting element of the present invention.

FIG. 1 is a sectional view for indicating a portion of an optical element according to an embodiment 1 of the present invention. This optical element is capable of reducing an amount of light transmittance in specific azimuth and a specific view angle range. In the case that the above-described optical element is employed in a display device, this optical element is capable of limiting a view angle within which an image on a screen attached to the element can be seen by an operator. In this specification, an optical element having such a function will be referred to as a "view angle limiting element" hereinafter.

A view angle limiting element 30 of the embodiment 1 is constructed in such a manner that a liquid crystal film 1000 containing a discotic liquid layer 100 is stacked between a first polarizing film 2000 and a second polarizing film 2100.

A polarizer transmits therethrough one of linearly polarized light components within light entered to the own polarizer, and absorbs the other of these linearly polarized light components, while these linearly polarized light components are intersected with each other at a right angle.

As the first polarizing film 2000, the following structure may be employed. That is, a base film is stretched which is made of, for example, polyvinylalcohol and the like, to which such a material having dichroism as iodine and organic dye has been dyed, or has been absorbed. A polarizing layer 310 which expresses absorbing dichroism by aligning the material having the dichroism is sandwiched by 2 sheets of protection films 220 and 221 which are made of a triacetylcellulose film.

Similar to the above-described first polarizing film 2000, as the second polarizing film 2100, the following structure may be employed. That is, a base film is stretched which is made of, for example, polyvinylalcohol and the like. A polarizing layer 300 which expresses absorbing dichroism by aligning the material having the dichroism is sandwiched by 2 sheets of protection films 210 and 211 which are made of a triacetylcellulose film.

The liquid crystal film 1000 is constituted by a base film 200 and a liquid crystal layer 100 formed thereon.

The liquid crystal film 1000 is adhered to the first polarizing film 2000 by an adhesive layer 410, and is adhered to the second polarizing film 2100 by an adhesive layer 400. The adhesive layers 400 and 410 are constructed of a transparent acrylic adhesive agent.

Figure 2:
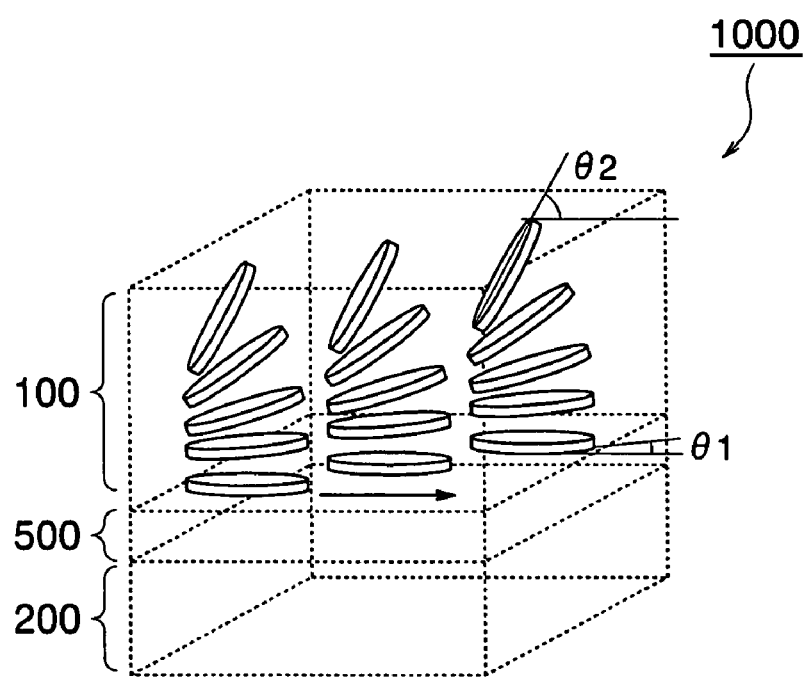
FIG. 2 is a schematic perspective view for explaining a liquid crystal film related to the view angle limiting element of the present invention.

FIG. 2 is a schematic diagram for explaining a structure of the liquid crystal film 1000. The liquid film 1000 is manufactured as follows: That is, while an alignment layer 500 made of polyimide, or the like is formed on an optically isotropic base film 200 made of triacetylcellulose, or the like and having a small phase difference along an inner plane direction, a discotic compound indicative of discotic liquid crystallinity and made of triphenylene derivatives, or the like are formed on the resulting alignment film 500. By a rubbing process operation or the like on the formed alignment film 500, the discotic compound is coated on the resulting alignment film 500, and then, a temperature is so controlled as to form a discotic nematic phase on the alignment film 500. Then, since the alignment condition is fixed, a non-fluidized liquid crystal layer 100 is formed.

The alignment of the liquid crystal layer 100 becomes a hybrid alignment in which an alignment angle is continuously changed within a thickness direction, since disk planes of discotic liquid crystal are aligned vertically, or substantially vertical with respect to a boundary plane of air in the vicinity of the air boundary, and the disk planes are aligned parallel, or substantially parallel to the plane of the base film 200 on the side of the base film 200.

Assuming now that an angle of a disk plane of the discotic liquid crystal on the side of the base film 200 with respect to the plane of the base film 200 is defined as "θ1", and also, an angle of the disk plane of the discotic liquid crystal on the opposite side of the base film 200 with respect to the plane of the base film 200 is defined as "θ2", the angle "θ1" is nearly equal to 2 to 5 degrees, and the angle "θ2" is nearly equal to 65 to 75 degrees.

An incline of a disk plane of the discotic liquid crystal with respect to the plane of the base film 200 is produced along the direction of the alignment process operation of the alignment film 500, and an axis located parallel to the alignment direction will be referred to as an "alignment axis" hereinafter. It should be understood that in order to non-fluidize the liquid crystal layer 100, a polymerization group is conducted to a side chain end of a discotic compound such as triphenylene derivatives, and the polymerization group is polymerized under hybrid alignment condition so as to fix the alignment condition.

Figure 3:
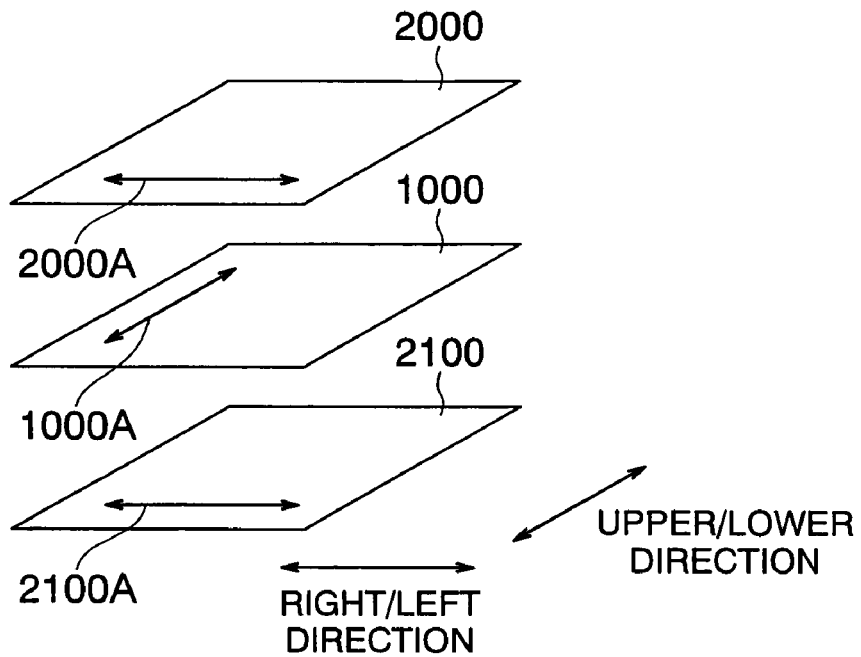
FIG. 3 is a schematic perspective view for explaining the view angle limiting element of the present invention.
Figure 4:
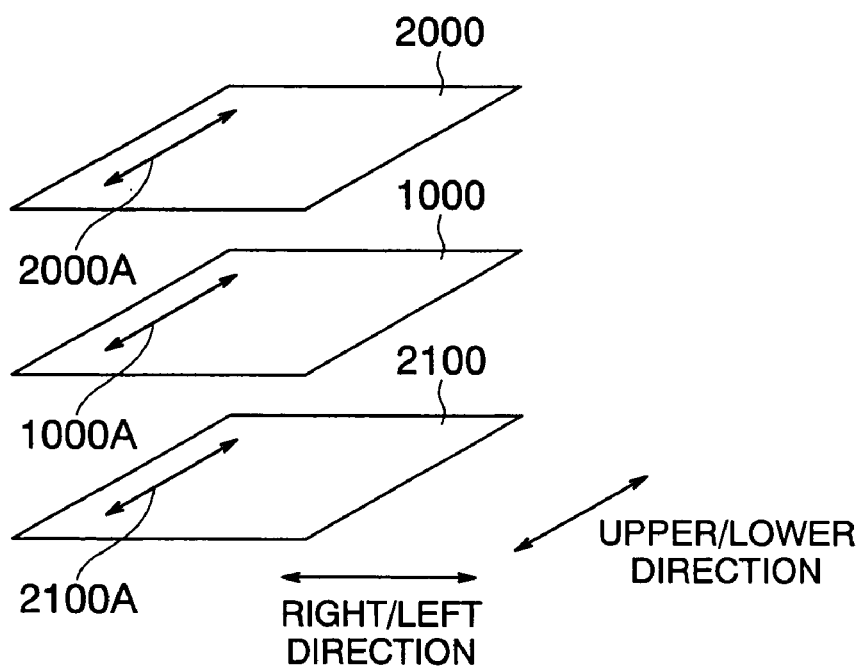
FIG. 4 is a schematic perspective view for explaining the view angle limiting element of the present invention.

Such a liquid crystal film has been manufactured in the product name of "WV film" from FUJI PHOTO FILM CO., LTD, and thus, may be used as the liquid crystal film which constitutes the view angle limiting element of the present invention. FIG. 3 and FIG. 4 are schematic diagrams for representing a relationship among an absorption axis 2000A of the polarizing layer 310 of the first polarizing film 2000, an alignment axis 1000A of the liquid crystal layer 100 of the liquid crystal film 1000, and an absorption axis 2100A of the polarizing layer 300 of the second polarizing film 2100.

As shown in these drawings, a view angle limiting element of this embodiment 1 is arranged in such a manner that while the absorption axis 2000A of the polarizing layer 310 of the first polarizing film 2000 is located parallel to the absorption axis 2100A of the polarizing layer 300 of the second polarizing film 2100, the alignment axis 1000A of the liquid crystal layer 100 of the liquid crystal film 1000 is located parallel (see FIG. 4) to, or is located perpendicular (see FIG. 3) to the absorption axes 2000A and 2100A of the polarizing layers 300 and 310.

In this case, light which is entered from the side of the second polarizing film 2100 (otherwise, first polarizing film 2000) passes through the second polarizing plate 2100 (or, first polarizing plate 2000), and thereafter, penetrates through the liquid crystal film 1000, and then, is entered to the first polarizing film 2000 (or, second polarizing film 2100).

In this case, in such an azimuth located perpendicular to the alignment axis 100A of the liquid crystal layer 100, a phase difference may be produced in such a light which travels through the liquid crystal film 1000 along an oblique direction, and the polarization condition is changed. As a result, this light is absorbed by the first polarizing film 2000 (or, second polarizing film 2100), so that transmittance is lowered.

On the other hand, in such an azimuth located parallel to the alignment axis 1000A of the liquid crystal layer 100, substantially no phase difference is produced in the light which travels through the liquid crystal film 1000 along the oblique direction, so that this light passes through the first polarizing film 2000 (or, second polarizing film 2100), while this light is not substantially absorbed by the first polarizing film 2000 (or, second polarizing film 2100).

That is to say, in the azimuth located perpendicular to the alignment axis 1000A of the liquid crystal layer 100, such an optical element can be realized in which the transmittance thereof becomes smaller in a range where a polar angle (namely, view angle) is large, as compared with that of the azimuth located parallel to the alignment axis 1000A of the liquid crystal layer 100. In other words, in the azimuth located perpendicular to the alignment axis 1000A of the liquid crystal layer 100, such a view angle limiting element can be realized, the view angle of which becomes narrower, as compared with that of the azimuth located parallel to the alignment axis 1000A of the liquid crystal layer 100.

As exemplified in FIG. 3 and FIG. 4, for the sake of convenience, if the alignment axis 1000A of the liquid crystal layer 100 of the liquid crystal film 1000 corresponds to such a direction parallel to an upper/lower direction, then such a view angle limiting element may be realized, whose view angle along a right/left direction becomes smaller than that of the upper/lower direction. It should be noted that both the right/left direction and the upper/lower direction correspond to both such a direction and another direction orthogonal to the direction.

In the case that such a view angle characteristic is applied to display devices of portable appliances such as a portable telephone, a notebook PC, and a PDA, and also to display devices of public-use appliances such as an ATM, this view angle characteristic may achieve an effect capable of avoiding peeping actions along a lateral direction.

Otherwise, if the alignment axis 1000A of the liquid crystal layer 100 of the liquid crystal film 1000 is set to such a direction parallel to the right/left direction, then such a view angle limiting element can be realized, whose view angle along the upper/lower direction becomes smaller than that of the right/left direction. In the case that such a view angle characteristic is applied to a monitor mounted on a vehicle, this view angle characteristic may achieve an effect capable of avoiding that image light falls on a windshield of the vehicle.

It should also be understood that although the above description has exemplified such a case that the liquid crystal layer 100 of the liquid crystal film 1000 is constituted by the hybrid-aligned discotic liquid crystal, the present invention is not limited thereto. For instance, as the liquid crystal layer 100 of the liquid crystal film 1000, such a liquid crystal may be alternatively employed in which rod-shaped liquid crystal molecules are hybrid-aligned, and then, are fixed.

Figure 9:
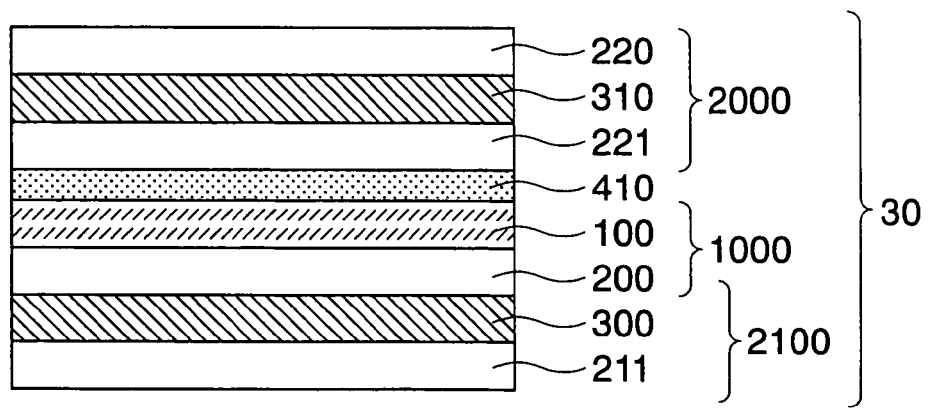
FIG. 9 is a schematic sectional view for explaining a view angle limiting element of the present invention.

Alternatively, portions of members which constitute the view angle limiting element may be commonly used. FIG. 9 is a sectional view for indicating a portion of another example as to the view angle limiting element of the present invention. This view angle limiting element of FIG. 9 is arranged in such a manner that in the limiting element explained in FIG. 1, the protection film 210 for constructing the second polarizing film 2100 is omitted; and the base film 200 for constituting the liquid crystal film 1000 may also have the function of the protection film for constituting the second polarizing film 2100. In this alternative case, while an optical characteristic of this alternative view angle limiting element is not largely changed from that of the above-explained embodiment 1, this alternative view angle limiting element may be made slim and in a light weight, and also in low cost, since the adhesive layer 400 and the protection film 210 are omitted.

Figure 10:
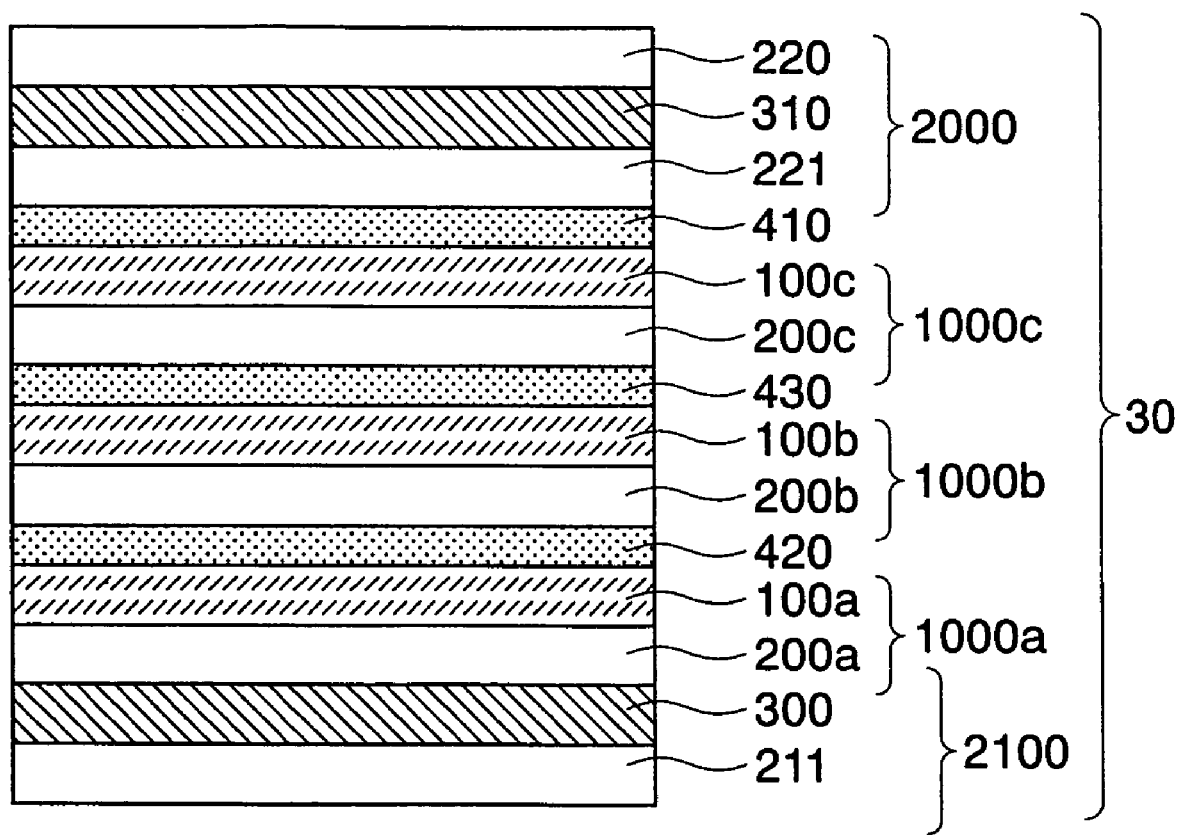
FIG. 10 is a schematic sectional view for explaining a view angle limiting element of the present invention.

Further, a plurality of the above-described liquid crystal layers 100 may be alternatively stacked on each other in order to obtain a desirable characteristic. FIG. 10 is a sectional view for representing a portion of another example of the view angle limiting element of the present invention. This view angle limiting element of FIG. 10 is arranged as follows: In the view angle limiting element shown in FIG. 9, both a liquid crystal film 1000b and another liquid crystal film 1000c are further stacked via transparent adhesive layers 420 and 430 between the liquid crystal film 1000 (indicated as "1000a" in FIG. 10) and the second polarizing film 2100.

The liquid crystal films 1000a, 1000b, and 1000c are constituted by a liquid crystal layer 10a, a base film 200a, a liquid crystal layer 100b, a base film 200b, a liquid crystal layer 100c, and a base film 200c, respectively.

In this alternative case, such a view angle characteristic which could not be obtained by a single layer of the liquid crystal film may be realized, for example, such a view angle characteristic that a view angle is made narrower may be realized.

Emodiment 2

Figure 5:
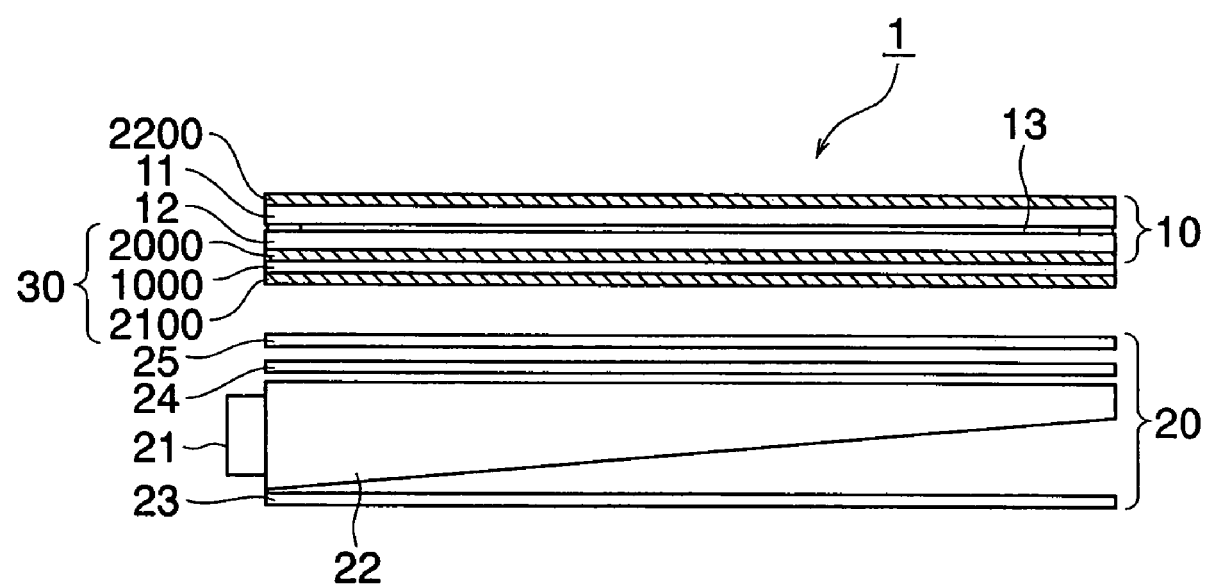
FIG. 5 is a schematic perspective view for explaining a display device of the present invention.

Next, a description is made of a display device according to an embodiment 2 of the present invention. FIG. 5 is a sectional view for partially showing a schematic structure of the display device according to the embodiment 2 of the present invention.

This display device is constituted by a liquid crystal display panel 10, an illuminating device 20 arranged on a rear surface of this liquid crystal display panel 10, and a view angle limiting element 30. This view angle limiting element 30 has been explained in the previous embodiment 1, and is arranged between the liquid crystal display panel 10 and the illuminating device 20.

The illuminating device 20 illuminates a display region of the liquid crystal display panel 10 from the rear surface side thereof. As the illuminating device 20, there are an edge light type (light guide type), a just-directly under type (reflection plate type), a plane-shaped light source type, and the like. As this illuminating device 20, an optimum illuminating type may be selected from the above-described illuminating types, and other illuminating types, by considering a use field, a use purpose, and a dimension of a display region. In this embodiment 2, although an edge light type back light will be explained, the present invention is not limited thereto.

The illuminating device 20 contains a light guide member, or light conducting member 22 having a transparent resin member, the opposite side of which is formed by a dotted printing with white pigment, a member with fine concave or convex form, a lens-shaped member or the like, a light source 21 arranged on an edge plane of the light guide member 22, a reflection seat 23 arranged on the rear surface side of the light guide member 22, and optical films 24 and 25. Such as a prism seat and a diffusion seat arranged on the front surface side of the light guide member 22. The light guide member 22 is made of a transparent resin, and a means for changing a propagation direction of light has been formed on the rear surface of this light guide member 22. This changing means owns a dot print by white pigment, a very fine concave/convex shape, or a lens shape.

As the light source 21, a rod-shaped light source such as a cold cathode-ray tube and a hold cathode-ray tube may be used, or such a dot-shaped light source as a light emitting diode (LED) may be used. In this embodiment 2, although such a case that an LED is employed as this light source 21 will be explained, the present invention is not limited thereto.

In the case that the LED is employed as the light source 21, in order to effectively enter light emitted from the light source 21 into the light conducting member 22, a reflector (not shown) may be preferably provided, or a shape of a mold resin formed around the light emitting portion may be properly modified.

In this structure, light which is emitted from the light source 21 and is entered into the light conducting member 22 is propagated through the light conducting member 22, while this propagated light is totally reflected. Among the light propagated through the light conducting member 22, a traveling direction of such a light which has been reached to the means for changing the traveling direction of the light is changed, and then, is projected from the rear surface side of the light conducting member 22. This changing means has been provided on the rear surface of this light conducting member 22. The light projected from the light conducting member 22 is illuminated via the view angle limiting element 30 onto the liquid crystal panel 10 after a distribution of projection angles and a luminous distribution within a plane have been adjusted by the optical film 24 such as the prism seat and the diffusion seat.

The liquid crystal display panel 10 employs either a transmission type liquid crystal display panel or a semi-transmission reflection type liquid crystal display panel, which displays thereon a picture by adjusting a transmission light amount of light emitted from the illuminating device 20.

The liquid crystal display panel 10 is preferably realized by employing such a liquid crystal display panel which is equipped with a polarizer, and is capable of producing a high contrast ratio picture by using a relatively low drive voltage, while a polarization state of light entered into a liquid crystal layer is controlled. In such a liquid crystal display panel, linearly polarized light is utilized as picture light.

As the liquid crystal display panel 10, for instance, a TN (Twisted Nematic) type display panel, an STN (Super Twisted Nematic) type display panel, an ECB (Electrical Controlled Birefringence) type display panel, and the like may be employed. Also, an IPS (In Plane Switching) type display panel having a feature of a wide view angle, and a VA (Vertical Aligned) type display panel having this feature may be employed.

Also, as the liquid crystal display panel 10, a semi-transmission reflection type liquid crystal display panel which utilizes the above-explained type may be alternatively employed.

In this embodiment 2, although a description is made of such a case that the IPS type display panel is employed as the liquid crystal display panel 10, the present invention is not limited only thereto.

The liquid crystal display panel 10 contains a display panel-purpose transparent substrate 11, and a transparent substrate 12. The transparent substrate 11 is made of flat, transparent, and optically isotropic glass, or plastic. A color filter (not shown), and an alignment film (not shown) made of a polyimide-series polymer have been stacked on the transparent substrate 11. An alignment film, an electrode for forming pixels, a signal electrode, and a switching element made of a thin-film transistor have been formed on the transparent substrate 12, while these structural elements are not shown.

Figure 6:
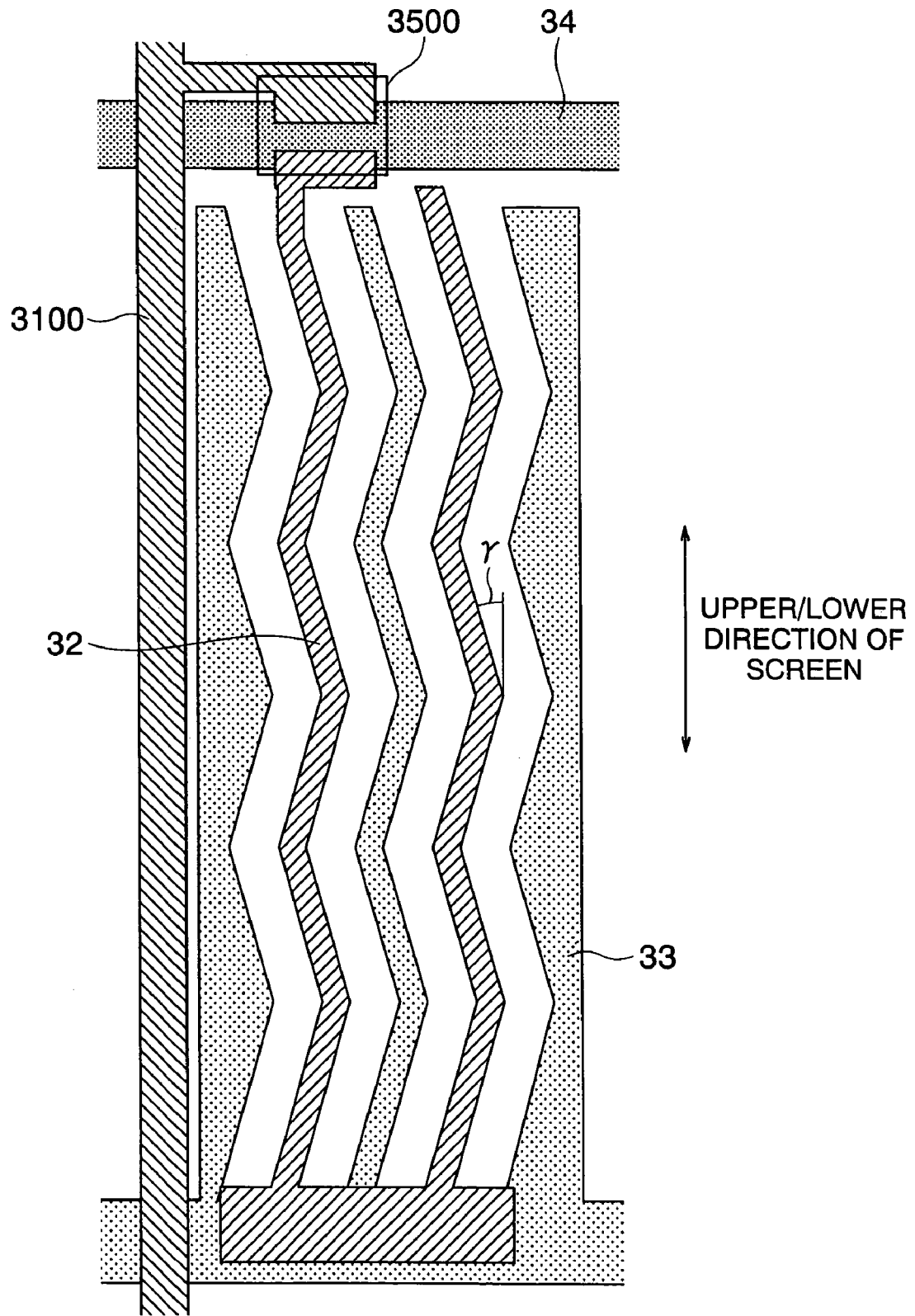
FIG. 6 is a schematic front view for explaining a structure of a pixel unit of the display device of the present invention.

FIG. 6 is a schematic front view for representing a structure of one pixel of the liquid crystal display panel 10 of this embodiment 2. One pixel of the liquid crystal display panel 10 has a common electrode 33 and a scanning signal electrode 34, which are formed on the transparent substrate 12; a picture signal electrode 3100 and a pixel electrode 32, which are formed via an insulating film on the upper layer; and a TFT (Thin-Film Transistor) 3500 which is made of either an amorphous Si film or a polycrystal Si film, and functions as a switching element.

Also, the pixel electrode 32 is partially overlapped with the common electrode 33 so as to form a holding capacitance. The common electrode 33 and the pixel electrode 32 divide one pixel into 4 pixel regions, and constitute a zig-zag shape while a substantially constant interval is maintained between these electrodes 32 and 33. Also, an inclined angle "Y" of the zig-zag shape of the common electrode 33 and the pixel electrode 32 with respect to the upper/lower direction of the screen of the liquid crystal display panel 10 is nearly equal to +10 degrees and −10 degrees. Further, a protection layer is formed on these upper layer, and an alignment film is formed on this upper layer.

Referring back to FIG. 5, two sheets of the transparent substrates 11 and 12 form an inner space in such a manner that while alignment film forming planes thereof are faced to each other, peripheral portions thereof are adhered to each other by a sealing material under such a condition that a predetermined gap is formed between these transparent substrates 11 and 12 by using a spacer (not shown). Then, nematic liquid crystal whose dielectric anisotropic is positive is filled into this inner space, and then, this space is sealed, so that the liquid crystal layer 13 is provided.

As to the liquid crystal layer 13, an alignment direction of a liquid crystal molecular long axis thereof is defined by performing the alignment process with respect to the alignment films formed on two sheets of the transparent substrates 11 and 12. The liquid crystal alignment direction of the liquid crystal layer 13 is defined as a so-called "homogeneous alignment", namely there is no twist between two sheets of these transparent substrates 11 and 12.

A third polarizing film 2200 and a first polarizing film 2000 are provided on a front plane of the transparent substrate 11 and a rear plane of the transparent substrate 12, respectively.

Figure 7:
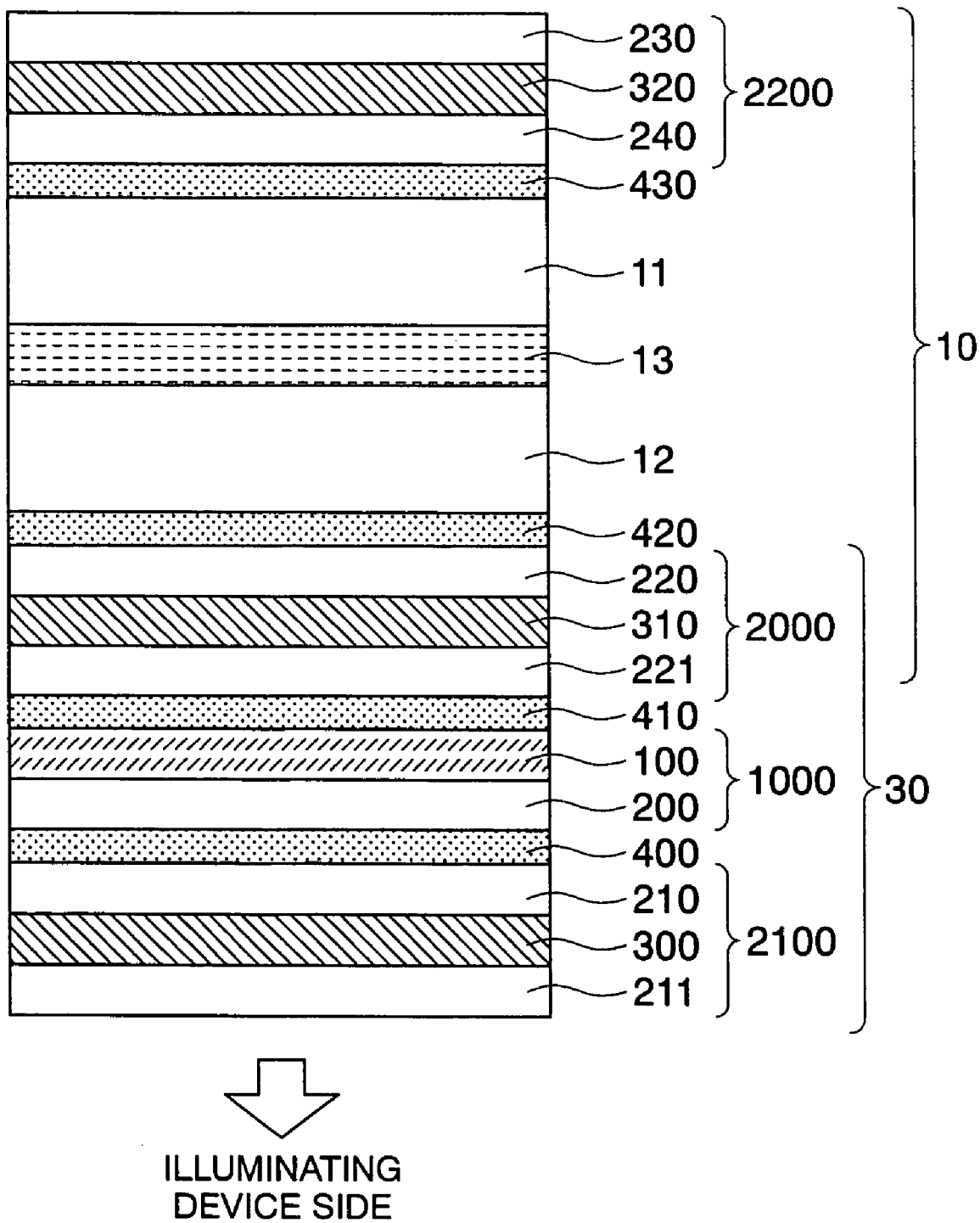
FIG. 7 is a schematic sectional view for describing the display device of the present invention.

FIG. 7 is a schematic sectional view for explaining a longitudinal sectional structure of the display device according to this embodiment 2. In this longitudinal sectional structure, more specifically, major structural members are illustrated which are related to optical operations of both the liquid crystal display panel 10 and the view angle limiting element 30.

In this display device, the view angle limiting element 30 and the liquid crystal display panel 10 are arranged in this order from the illuminating device side, and the first polarizing film 2000 which constitutes the view angle limiting element 30 may commonly function as such a polarizer which is arranged on the illuminating device of the liquid crystal display panel 10.

It should also be understood that since the view angle limiting element 30 has been explained in the above-described embodiment, the same reference numerals shown in the previous embodiment will be employed as those for denoting the same portions, and detailed descriptions thereof are omitted.

The view angle limiting element 30 is adhered to the display panel-purpose transparent substrate 12 which constitutes the liquid crystal display panel 10 by an adhesive layer 420. As the adhesive layer 420, a transparent adhesive agent such as an acrylic series may be employed. Also, the display panel-purpose liquid crystal layer 13 is provided between the transparent substrates 11 and 12, and the third polarizing film 2200 is adhered to the front surface side of the transparent substrate 11 by an adhesive layer 430.

Similar to the first polarizing film 2000, as the third polarizing film 2200, the following structure may be employed. That is, a base film is stretched which is made of, for example, polyvinylalcohol and the like. A polarizing layer 320 which expresses absorbing dichroism by aligning the material having the dichroism is sandwiched by 2 sheets of protection films 230 and 240 which are made of a triacetylcellulose film.

Figure 8:
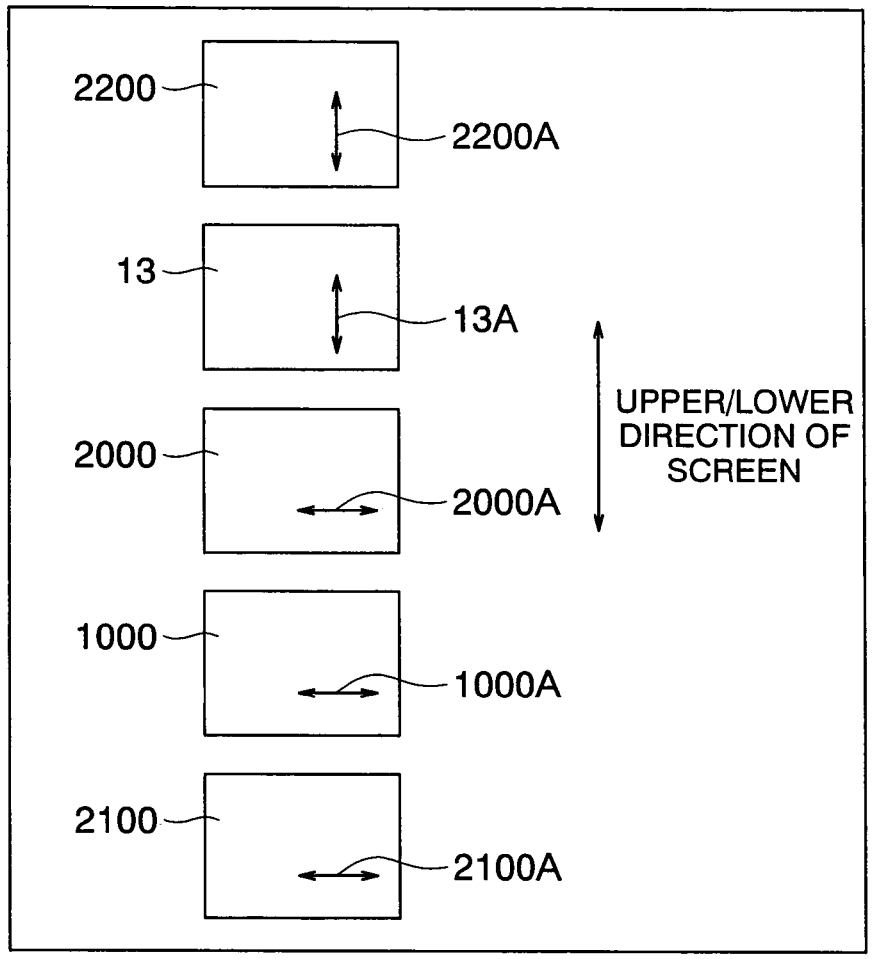
FIG. 8 is an explanatory diagram for explaining a relationship of optical axes of an optical member related to the display device of the present invention.

FIG. 8 is a diagram for representing one example as to optical axes such as absorption axes of polarizers, an alignment axis of the display panel-purpose liquid crystal layer, and an alignment axis of the liquid crystal layer which constitutes the liquid crystal film related to the display device of this embodiment 2.

In this embodiment 2, as represented in FIG. 8, the following case will now be explained. That is, both an alignment axis 13A of the display panel-purpose liquid crystal layer 13 and an absorption axis 2200A of linearly polarized light of the third polarizing film 2200 are located parallel to the upper/lower direction of the screen; and the absorption axis 200A of the linearly polarized light of the first polarizing film 2000, the absorption axis 2100A of the second polarizing film 2100, and the alignment axis 1000A of the liquid crystal film 1000 are located perpendicular to the upper/lower direction of the screen.

After light emitted from the illuminating device 20 passes through the second polarizing film 2100, this light penetrates through the liquid crystal film 1000, and then, is entered to the first polarizing film 2000.

In this case, in such an azimuth intersected with the alignment axis 1000A of the liquid crystal layer 100 of the liquid crystal film 1000 at a right angle, a phase difference is produced in light which is traveled through the liquid crystal film 1000 along the oblique direction, and thus, the polarization condition thereof is changed, so that a portion of this light is absorbed by the first polarizing film 2000. On the other hand, in such an azimuth located parallel to the alignment axis 1000A of the liquid crystal layer 100 of the liquid crystal film 1000, since substantially no phase difference is produced in light which is traveled through the liquid crystal film 1000 along the oblique direction, the polarization condition thereof is essentially maintained, and this light passes through the first polarizing film 2000 without being essentially absorbed.

The light penetrated through the first polarizing film 2000 passes through the liquid crystal layer 13, and then, is entered to the third polarizing film 2200. In this case, since such a voltage corresponding to picture information supplied from a picture information generating unit (not shown) is applied to the common electrode 33 and the pixel electrode 32, the polarization condition of the light which passes through the liquid crystal layer 13 is controlled, and an amount of light which passes through the third polarizing film 2200 is adjusted, so that desirable picture light can be produced. In this case, such a display device can be realized that in the azimuth located perpendicular to the alignment axis 1000A of the liquid crystal layer 100 of the liquid crystal film 1000, in a region having a large polar angle, namely a large view angle, a screen of this display device is dark and visibility thereof is deteriorated, as compared with that of the azimuth located parallel to the alignment axis 1000A of the liquid crystal layer 100. In the case of the optical axes arrangement exemplified in FIG. 8, a leakage of the picture light along the upper/lower direction of the screen can be reduced. As a result, when this optical structure is applied to a monitor mounted on a vehicle, such a display device capable of avoid that image light of this monitor falls on a windshield of the vehicle can be realized.

Also, in the display device of the embodiment 2, both the polarizer which contains the polarizing layer for constructing the view angle limiting element 30, and the polarizer which contains the polarizing layer for constructing the liquid crystal display panel 10 are used as one polarizer.

In this case, both the light which is effectively utilized in the view angle limiting element 30 and the light which is effectively utilized in the liquid crystal display panel 10 are the same linearly polarized light, and a total number of the polarizing layers which cause the optical loss is decreased. As a result, such a display device capable of having a brighter representation can be realized. Otherwise, if the same bright representation is made, then such a display device operable under lower electric power can be realized.

Furthermore, there is no such an array within the plane of the view angle limiting element 30, while this array owns a regularity which causes moire among pixel arrays of the liquid crystal display panel 10. As a result, the display device can realize such a display having a deterioration of an image quality caused by this moire.

Figure 11:
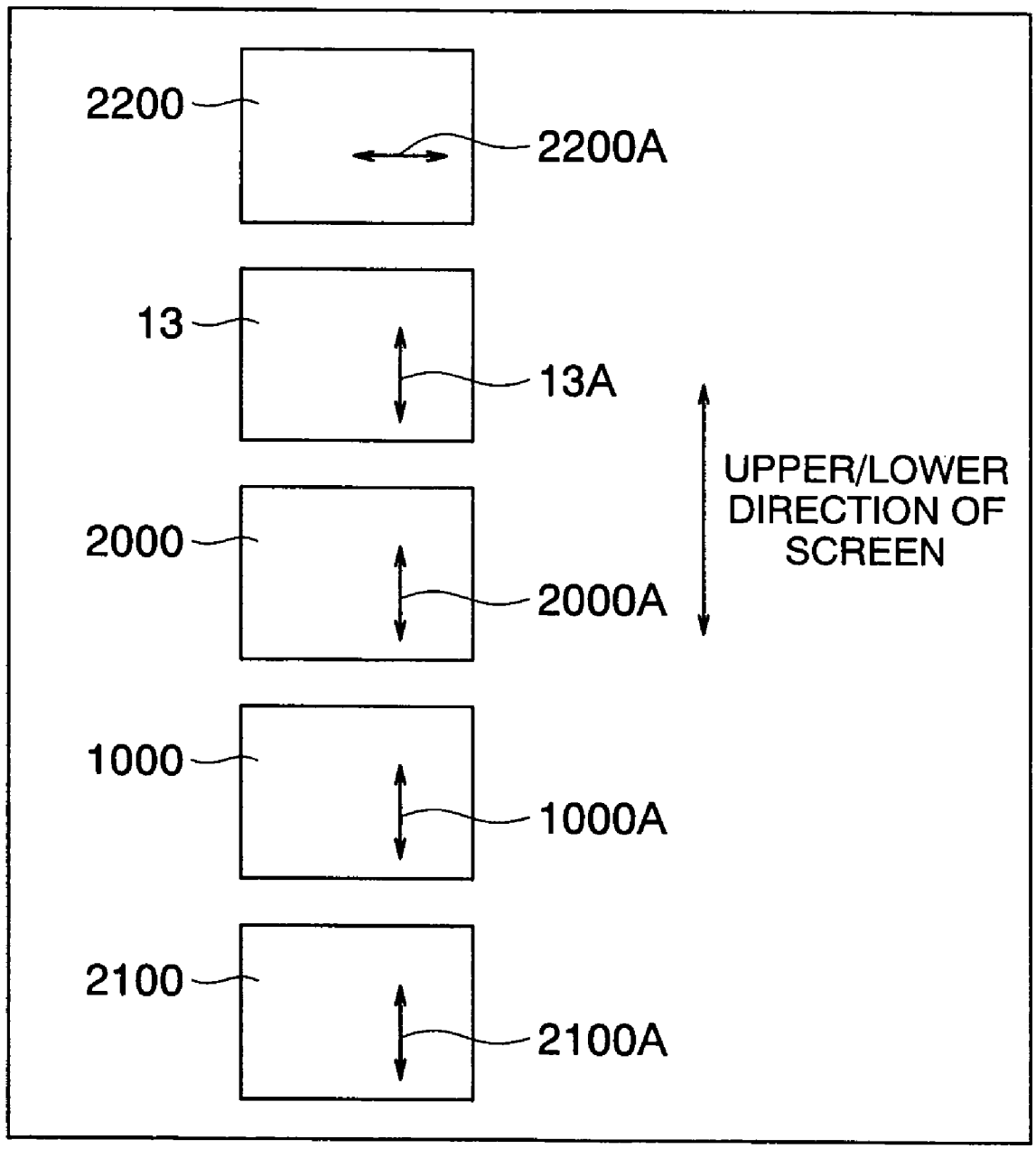
FIG. 11 is a schematic sectional view for explaining a view angle limiting element of the present invention.

FIG. 11 is a diagram for representing another example as to optical axes such as absorption axes of polarizers, an alignment axis of the display panel-purpose liquid crystal layer, and an alignment axis of the liquid crystal layer which constitutes the liquid crystal film related to the display device of this embodiment 2. In this embodiment 2, as represented in FIG. 11, the following case will now be explained. That is, an alignment axis 13A of the display panel-purpose liquid crystal layer 13, an absorption axis 2000A of linearly polarized light of the first polarizing film 2000, an absorption axis 2100A of the second polarizing film 2100, and an alignment axis 1000A of the liquid crystal layer 100 of the liquid crystal film 1000 are located parallel to the upper/lower direction of the screen; and the absorption axis 2200A of the linearly polarized light of the third polarizing film 2200 is located perpendicular to the upper/lower direction of the screen.

In this case, the picture light along the right/left direction of the screen can be made dark. As a result, in the case that this optical structure is applied to display devices of portable appliances such as a portable telephone, a notebook PC, and a PDA, and also to display devices of public-use appliances such as an ATM, this optical structure may achieve an effect capable of avoiding peeping actions along a lateral direction.

It should also be understood that although this embodiment 2 has described such a case that the view angle limiting element 30 is arranged between the liquid crystal display panel 10 and the illuminating apparatus 20, the present invention is not limited thereto. For example, the view angle limiting element 30 may be alternatively arranged on the front surface side of the liquid crystal display panel 10.

Figure 15:
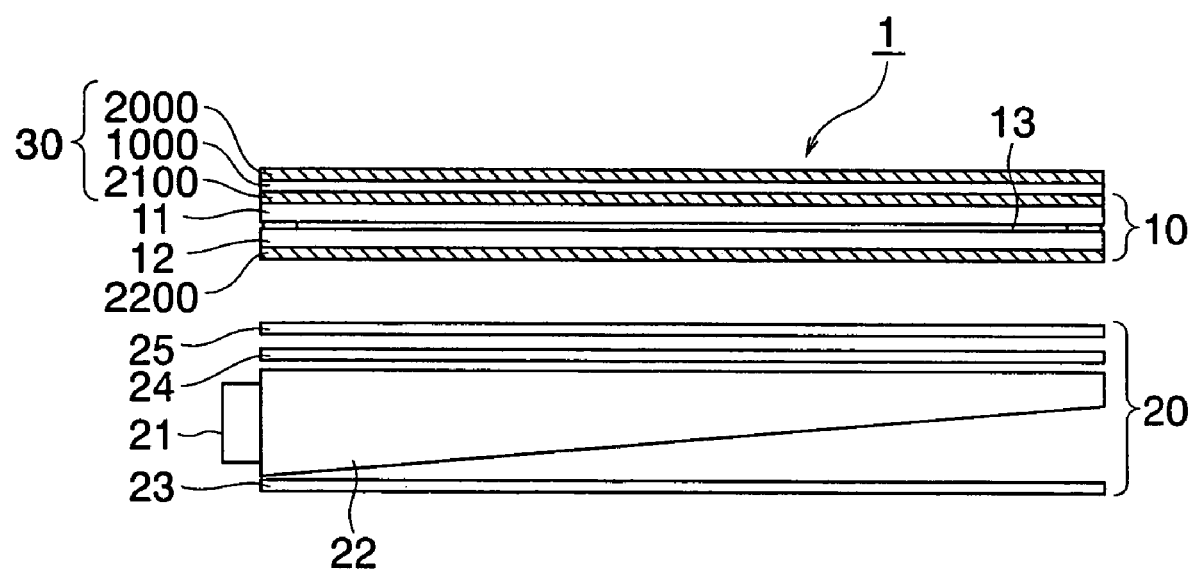
FIG. 15 is a schematic sectional view for explaining a display device of the present invention.

FIG. 15 is a sectional view for showing a portion of a schematic structure as to an embodiment of such a display device according to the present invention. This display device is arranged by a liquid crystal display panel 10, an illuminating device 20 arranged on the rear surface of this liquid crystal display panel 10, and a view angle limiting element 30 which has explained in the previous embodiment 1 and is arranged on the front surface side of the liquid crystal display panel 10. It should be understood that the same reference numerals shown in the above-explained embodiment 1 will be employed as those for denoting the same optical members, and thus, detailed explanations thereof are omitted.

Figure 16:
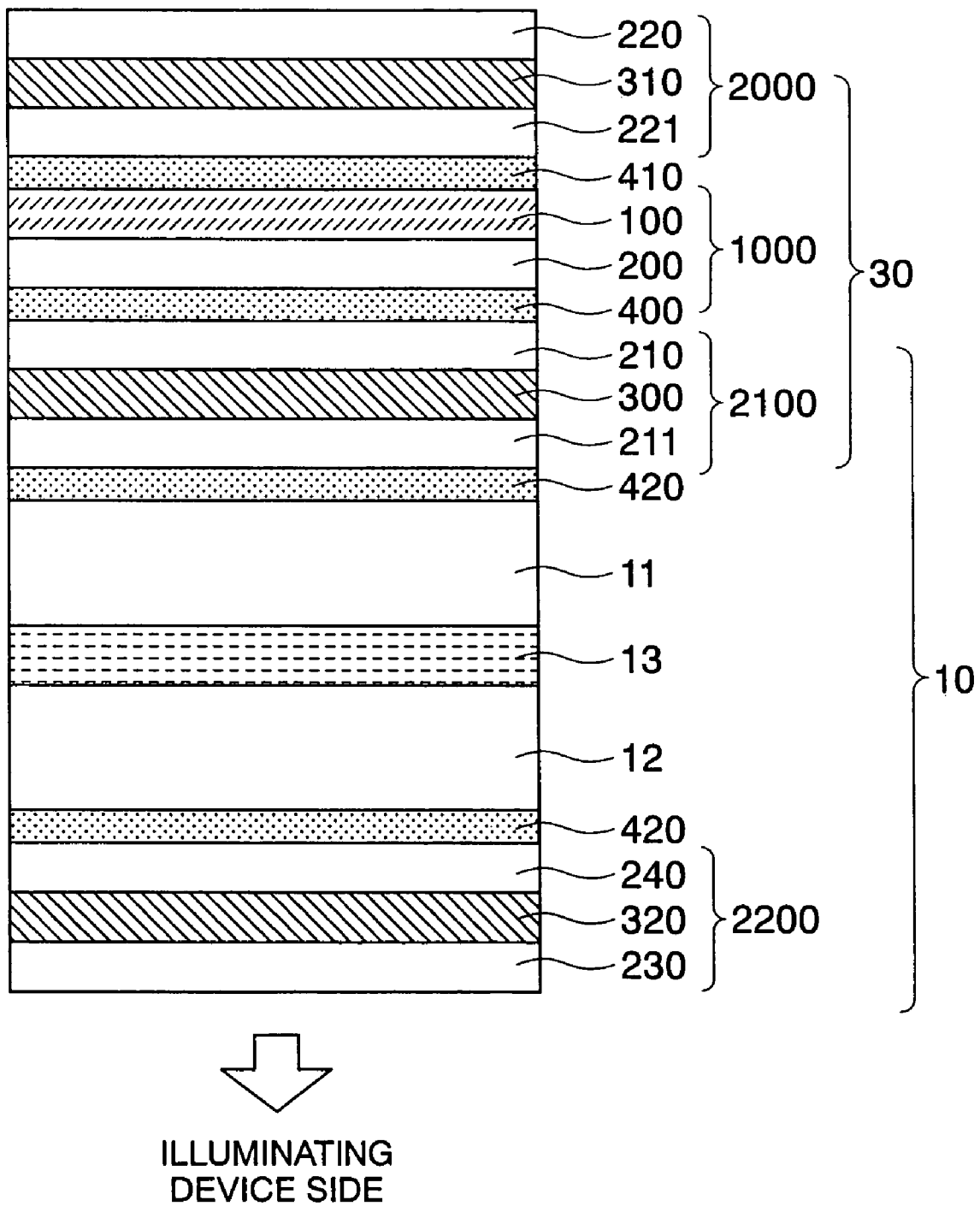
FIG. 16 is a schematic sectional view for explaining a display device of the present invention.

FIG. 16 is a schematic sectional view for explaining a longitudinal sectional structure of this display device, and more specifically, illustrates major structural members which are related to optical operations of both the liquid crystal display panel 10 and the view angle limiting element 30. In this display device, the liquid crystal display panel 10 and the view angle limiting element 30 are arranged in this order from the illuminating device side. The second polarizing film 2100 for constituting the view angle limiting element 30 may also be used as another polarizer which is arranged on the opposite side of the illuminating device 20 of the liquid crystal display panel 10. The view angle limiting element 30 is adhered to the display panel-purpose transparent substrate 11 for constructing the liquid crystal display panel 10 by an adhesive layer 420.

Figure 17:
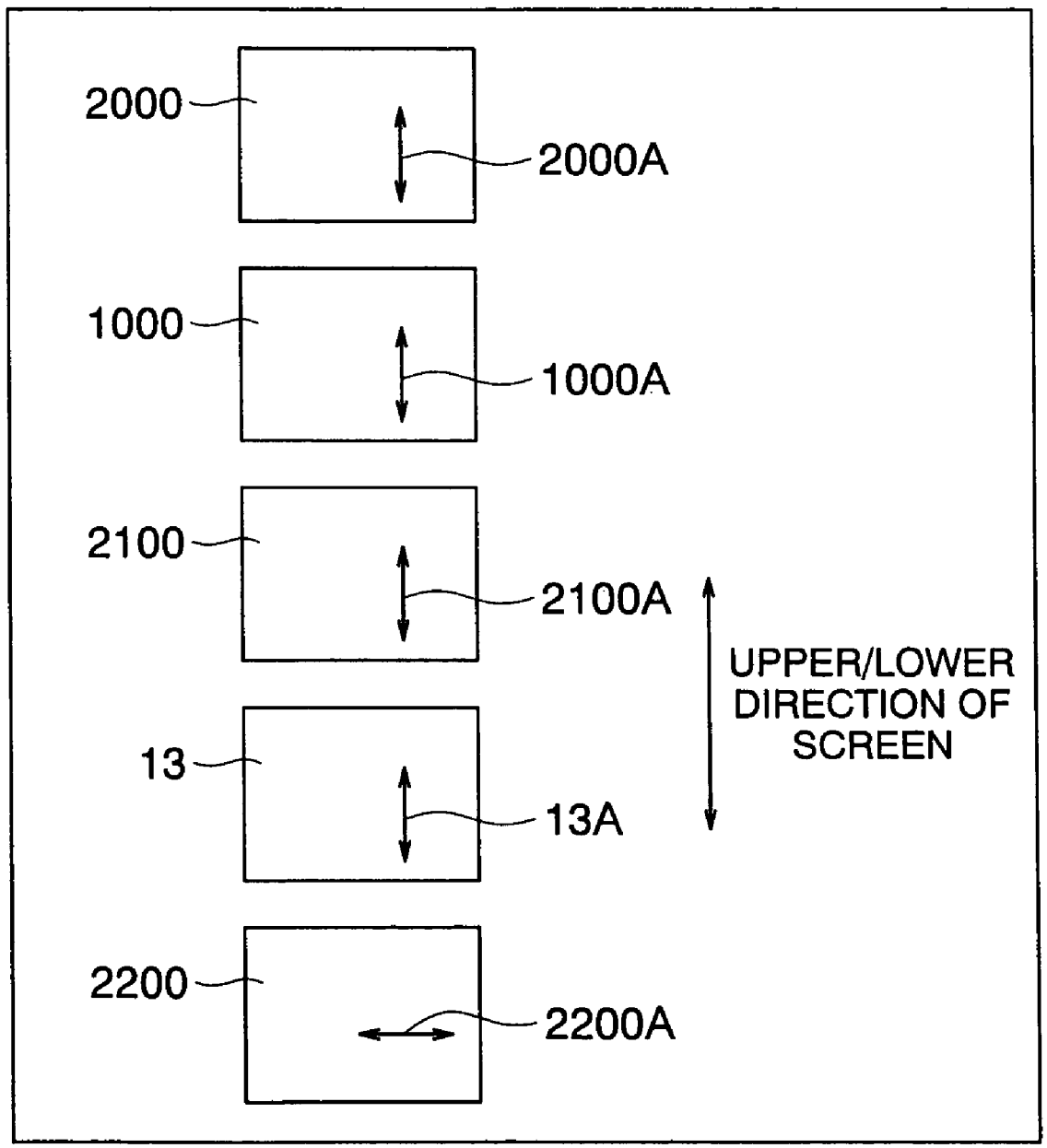
FIG. 17 is an explanatory diagram for explaining a relationship of optical axes of an optical member related to the display device of the present invention.

FIG. 17 is a diagram for representing one example as to optical axes such as absorption axes of polarizers, an alignment axis of the display panel-purpose liquid crystal layer, and an alignment axis of the liquid crystal layer which constitutes the liquid crystal film related to this display device.

In this case, as represented in FIG. 17, the following case will now be explained. That is, an alignment axis 13A of liquid crystal layer 13 of the liquid crystal display panel 10, an absorption axis 2100A of linearly polarized light of the second polarizing film 2100, an alignment axis 1000A of the liquid crystal layer 100 of the liquid crystal film 1000, and also, an absorption axis 2000A of linearly polarized light of the first polarizing film 2000 are located parallel to the upper/lower direction of the screen; and the absorption axis 2200A of the third polarizing film 2200 is located perpendicular to the upper/lower direction of the screen.

Also, even in this case, a similar display characteristic to that of the above-described embodiment may be obtained due to the effect of the view angle limiting element 30. In other words, such a display device can be realized that in the azimuth located perpendicular to the alignment axis 1000A of the liquid crystal layer 100 of the liquid crystal film 1000, in a region having a large polar angle, namely a large view angle, a screen of this display device is dark and visibility thereof is deteriorated, as compared with that of the azimuth located parallel to the alignment axis 1000A of the liquid crystal layer 100.

In this case, in particular, when a semi-transmission reflection type liquid crystal display panel is employed as the liquid crystal display panel 10, such a display device can be realized by which the view angle can be limited not only in the transparent display mode, but also, the reflection display mode.

Emodiment 3

Figure 12:
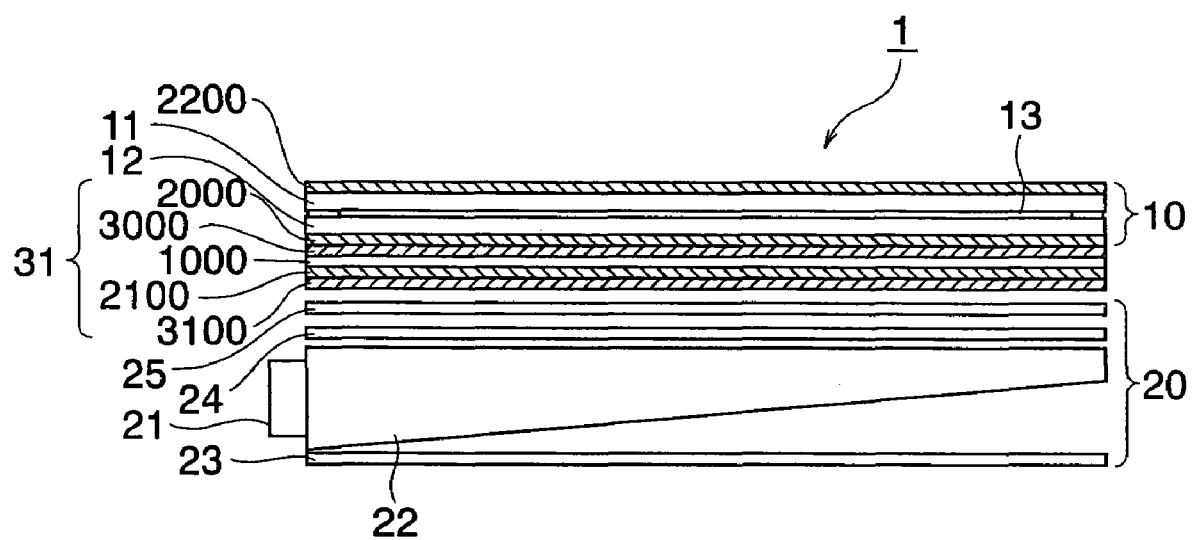
FIG. 12 is a schematic sectional view for explaining a display device of the present invention.
Figure 13:
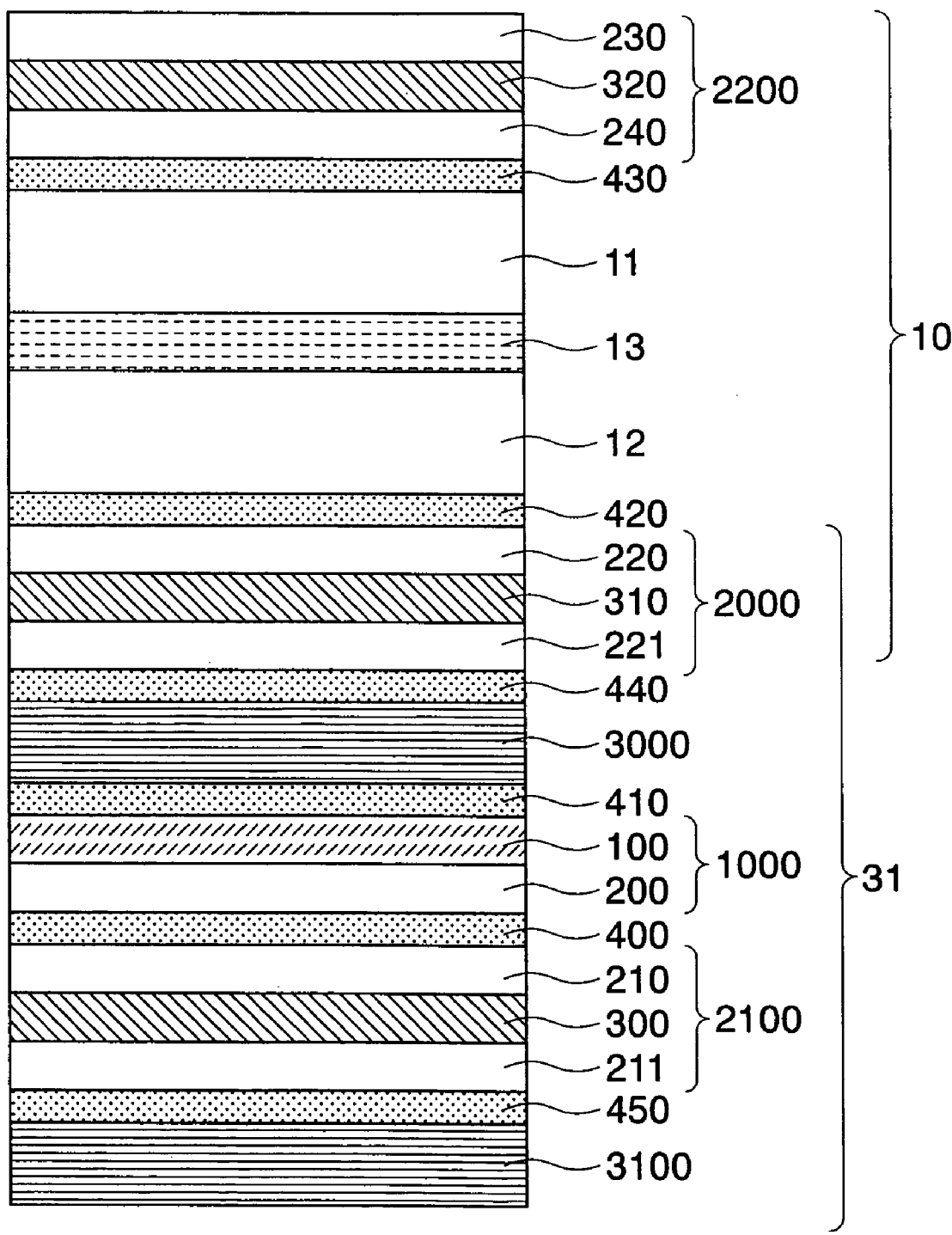
FIG. 13 is a schematic sectional view for explaining a display device of the present invention.

Next, a description is made of a display device according to another embodiment 3 of the present invention. FIG. 12 is a sectional view for partially showing a schematic structure of the display device according to this embodiment 3 of the present invention.

This display device is constituted by a liquid crystal display panel 10, an illuminating device 20 arranged on a rear surface of this liquid crystal display panel 10, and a view angle limiting element 31. This view angle limiting element 31 is arranged between the liquid crystal display panel 10 and the illuminating device 20.

The display device of this embodiment 3 is featured by that in the above-described embodiment 2 explained with reference to FIG. 5, a reflection type polarizing film is newly provided with the view angle limiting element 31. As a result, the same reference numerals shown in the above-described embodiment will be employed as those for denoting the same optical elements, and thus, detailed descriptions thereof are omitted.

As to the display device of this embodiment 3, in the display device of the above-explained embodiment 2, a reflection type polarizing film 3000 is arranged between the first polarizing film 2000 and the liquid crystal film 1000, and another reflection type polarizing film 3100 is arranged on the rear surface side of the second polarizing film 2100.

FIG. 16 is a schematic sectional view for explaining a longitudinal sectional structure of this display device, and more specifically, illustrates major structural members which are related to optical operations of both the liquid crystal display panel 10 and the view angle limiting element 31.

This display device is featured by that the view angle limiting element 31 and the liquid crystal display panel 10 are arranged in this order from the illuminating device side. The first polarizing film 2000 for constituting the view angle limiting element 31 may also be used as another polarizer which is arranged on the side of the illuminating device 20 of the liquid crystal display panel 10.

It should be noted that as to the view angle limiting element 31, the first reflection type polarizing film 3000 is arranged between the first polarizing film 2000 and the liquid crystal film 1000, and these structural members are adhered thereto by a transparent adhesive layer 440 and another transparent adhesive layer 410, respectively. Also, the second reflection type polarizing film 3100 is adhered by another transparent adhesive layer 450 on the illuminating device side of the second polarizing film 2100.

As the reflection type polarizing films 3000 and 3100, such a reflection type polarizing film is employed which can separate linearly polarized light components intersected to each other at a right angle by way of a reflection and a transmission.

As such reflection type polarizing films, a birefringence reflection type polarization film formed by stacking polymer films having different birefringence characteristics on each other in plural layers may be employed; such an optical member manufactured by arranging phase difference films on both a front surface and a rear surface of a cholestic liquid crystal film may be employed; a dielectric multilayer film manufactured by stacking dielectric materials having different refractive indexes on each other may be used; or a polarization filter made by a metal wire grid may be employed.

In the case of this birefringence reflection type polarization film, such a film has been marketed in the product name of "DBEF" from 3M Company, while this "DBEF" film transmits therethrough a predetermined polarized light component within light entered into this film, and reflects a linearly polarized light component whose polarization axis is intersected with the first-mentioned linearly polarized light component at a right angle. Thus, this DBEF film may be used as the reflection type polarizing films. As to the polarization filter made by the metal wire grid, metal line-shaped patterns having electric conductivities such as silver, aluminium, and chrome are formed on a transparent base member in a pitch of approximately 1500 Angstrom. If the transparent base member is a flat plate, then a flat plate type of reflection type polarizing film may be realized.

Figure 14:
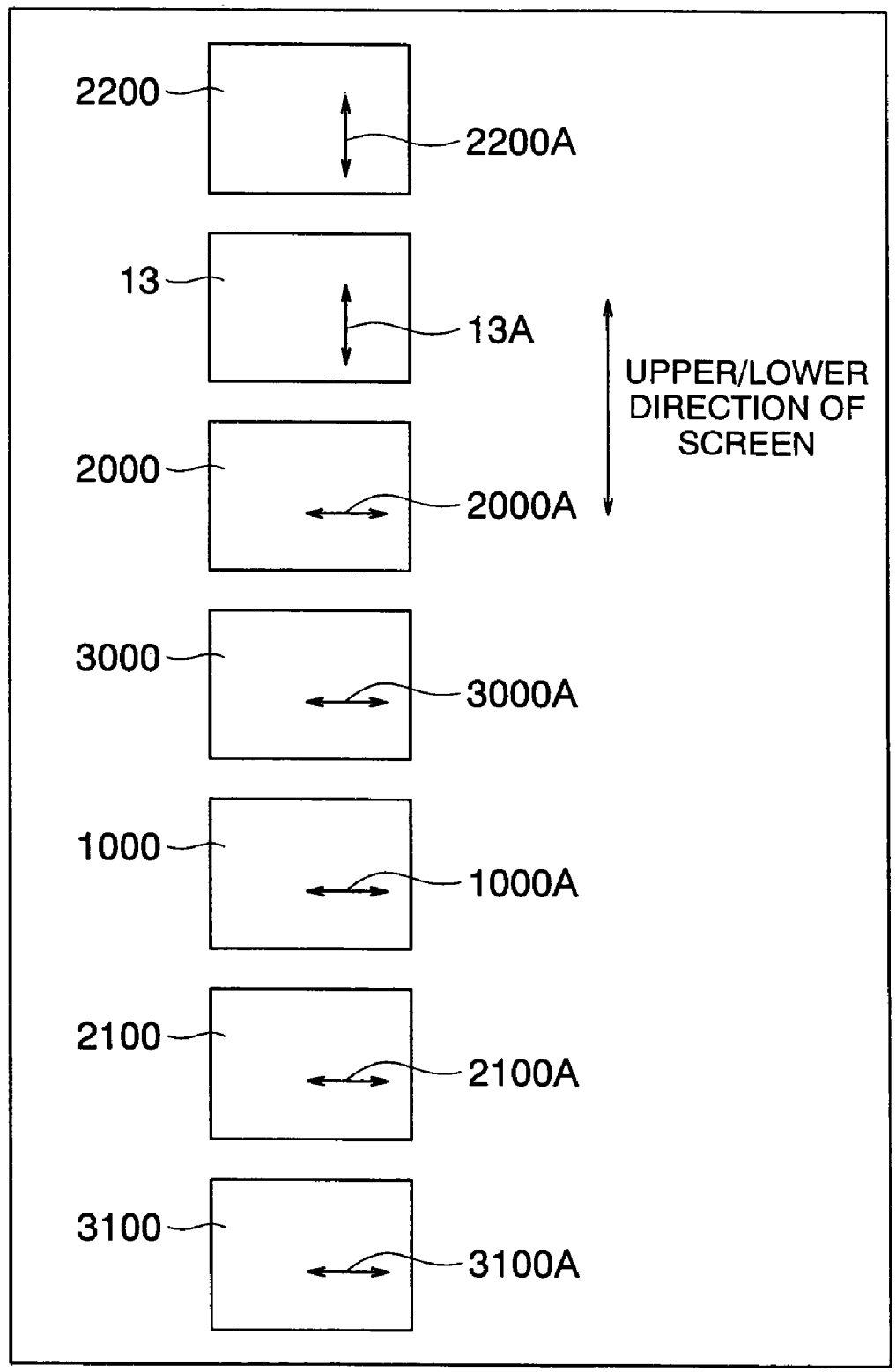
FIG. 14 is an explanatory diagram for explaining a relationship of optical axes of an optical member related to the display device of the present invention.

FIG. 14 is a diagram for representing one example as to optical axes such as absorption axes of polarizers, an alignment axis of the display panel-purpose liquid crystal layer, and an alignment axis of the liquid crystal layer which constitutes the liquid crystal film related to the display device of this embodiment 3.

In this embodiment 3, as represented in FIG. 14, the following case will now be explained. That is, both an alignment axis 13A of the display panel-purpose liquid crystal layer 13 and an absorption axis 2200A of linearly polarized light of the third polarizing film 2200 are located parallel to the upper/lower direction of the screen; and the absorption axis 2000A of the linearly polarized light of the first polarizing film 2000, the absorption axis 2100A of the second polarizing film 2100, a reflection axis 3000A of linearly polarized light of the first reflection type polarizing film 3000, and a reflection axis 3100A of linearly polarized light of the second reflection type polarizing film 3100 are located perpendicular to the upper/lower direction of the screen.

In general, light emitted from the illuminating device 20 corresponds to non-polarized light. As a consequence, among such light which is emitted from the illuminating device 20 and then is entered into the second reflection type polarizing film 3100, linearly polarized light which corresponds to the reflection axis 3100A of the second reflection type polarizing film 3100 is reflected, whereas such a linearly polarized light whose polarization direction is intersected to the first-mentioned linearly polarized light penetrates through this second reflection type polarizing film 3100.

The light which is reflected from the second reflection type polarizing film 2100 is returned to the illuminating device 20, and then, when this returned light is reflected on the illuminating device 20, the polarization condition thereof is changed, and thereafter, this reflected light is again entered into the second reflection type polarizing film 3100. In this case, while a portion of this entered light is reflected on the second reflection type polarizing film 3100, the remaining light thereof penetrates through the second reflection type polarizing film 3100. Since a series of the above-described light traveling operation is repeatedly carried out, a major portion of the light emitted from the illuminating device 20 may pass through the second reflection type polarizing film 3100.

The light which passes through the second reflection type polarizing film 3100 penetrates through both the second polarizing film 2100 and the liquid crystal film 1000, and then, is entered to the first reflection type polarizing film 3000.

In this case, in such an azimuth intersected with the alignment axis 1000A of the liquid crystal layer 100 of he liquid crystal film 1000 at a right angle, a phase difference is produced in light which is traveled through the liquid crystal film 1000 along the oblique direction, and thus, the polarization condition thereof is changed, so that a portion of this light is reflected on the first reflection type polarizing film 3000, and thus, the light which penetrates through this first reflection type polarizing film 3000 is decreased.

On the other hand, in such an azimuth located parallel to the alignment axis 1000A of the liquid crystal layer 100 of the liquid crystal film 1000, since substantially no phase difference is produced in light which is traveled through the liquid crystal film 1000 along the oblique direction, the polarization condition thereof is essentially maintained, and this light passes through the first reflection type polarizing film 3000 without being essentially reflected, and also, passes through the first polarizing film 2000.

The light penetrated through the first polarizing film 2000 passes through the liquid crystal layer 13, and then, is entered to the third polarizing film 2200. In this case, since such a voltage corresponding to picture information supplied from a picture information generating unit (not shown) is applied to the common electrode 33 and the pixel electrode 32, the polarization condition of the light which passes through the liquid crystal layer 13 is controlled, and an amount of light which passes through the third polarizing film 2200 is adjusted, so that desirable picture light can be produced.

That is to say, such a display device can be realized that in the azimuth located perpendicular to the alignment axis 1000A of the liquid crystal layer 100 of the liquid crystal film 1000, in a region having a large polar angle, a screen of this display device is dark, as compared with that of the azimuth located parallel to the alignment axis 1000A of the liquid crystal layer 100.

It should also be noted that when the light which has been reflected on the first reflection type polarizing film 3000 again passes through the liquid crystal film 1000, a phase difference is produced, and the polarization condition thereof is changed, and then, this light passes through both the second polarizing film 2100 and the second reflection type polarizing film 3100, and thereafter, is returned to the illuminating device 20.

Since the illuminating device 20 is equipped with a member which diffuses and reflects light such as a diffusion seat, a portion of such a light which is returned to the illuminating device 20 is again reflected toward the front surface direction of the liquid crystal display panel 10 so as to be reused. As a result, there is such an effect that luminance along the front surface direction may be improved.

In the case of the optical axes arrangement exemplified in FIG. 14, a leakage of the picture light along the upper/lower direction of the screen can be reduced. As a result, when this optical structure is applied to a monitor mounted on a vehicle, such a display device capable of avoid that image light of this monitor falls on a windshield of the vehicle can be realized.

Also, in the display device of the embodiment 3, the reflection type polarizing films are provided in the view angle limiting element 31, so that the amount of the light which is absorbed by the polarizers to cause the light loss can be reduced. As a result, while the utilization efficiency of the light is high, such a display device capable of having a brighter representation can be realized. Otherwise, if the same bright representation is made, then such a display device operable under lower electric power can be realized.

As apparent from the above-described embodiment 3, such a display device that the picture light is dark along the right/left direction of the screen can be realized by changing the absorption axes of the polarizers, the alignment axis of the display panel-purpose liquid crystal layer, the alignment axis of the liquid crystal layer which constitutes the liquid crystal film, which are related to the display device.

Also, both the first polarizing film 2000 and the second polarizing film 2100, or any one of these polarizers 2000 and 2100 may be alternatively omitted in the display device. Even in this alternative case, the view angle limiting element may function. However, generally speaking, since a polarization degree of a reflection type polarizing film is lower than a polarization degree of an absorption type polarizer, a light shielding effect of this reflection type polarizing film becomes small. Nevertheless, in this alternative case, since optical members which absorb light are reduced, a brighter display device may be realized.

Emodiment 4

Figure 18:
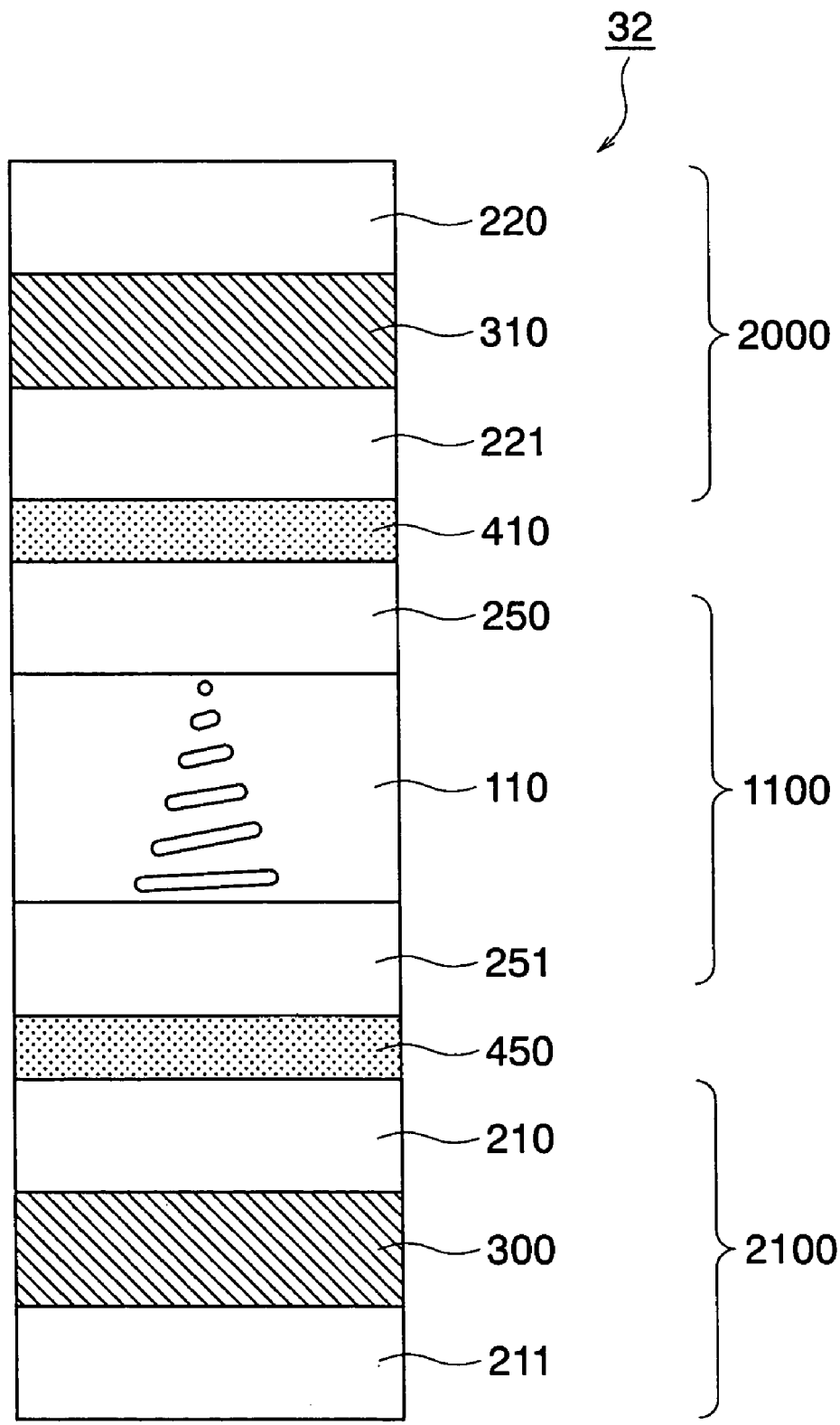
FIG. 18 is a schematic sectional view for explaining a view angle limiting element of the present invention.

Next, a description is made of a display device according to another embodiment 4 of the present invention. FIG. 18 is a sectional view for partially showing a schematic structure of a view angle limiting device 32 according to the embodiment 4 of the present invention. This view angle limiting element 32 corresponds to such an element structure that in the view angle limiting element 30 explained with reference to FIG. 1, the structure of the liquid crystal layer 1000 is mainly changed. Accordingly, the same reference numerals employed in the above-described embodiment 1 will be basically employed as those for denoting the same structural elements, and detailed explanations thereof are omitted.

The view angle limiting element 32 of this embodiment 4 is provided with a first polarizing film 2000, a second polarizing film 2100, and a liquid crystal film 1100 arranged between the first and second polarizing films 2000 and 2100.

The liquid crystal film 1100 is constituted by transparent base films 250 and 251, and a liquid crystal layer 110 formed between these transparent base films 250 and 251.

The liquid crystal film 1100 is adhered to the first polarizing film 2000 by using an adhesive layer 410, and also, adhered to the second polarizing film 2100 by employing an adhesive layer 450. These adhesive layers 410 and 450 are constructed of a transparent adhesive agent such an acrylic series.

Figure 19:
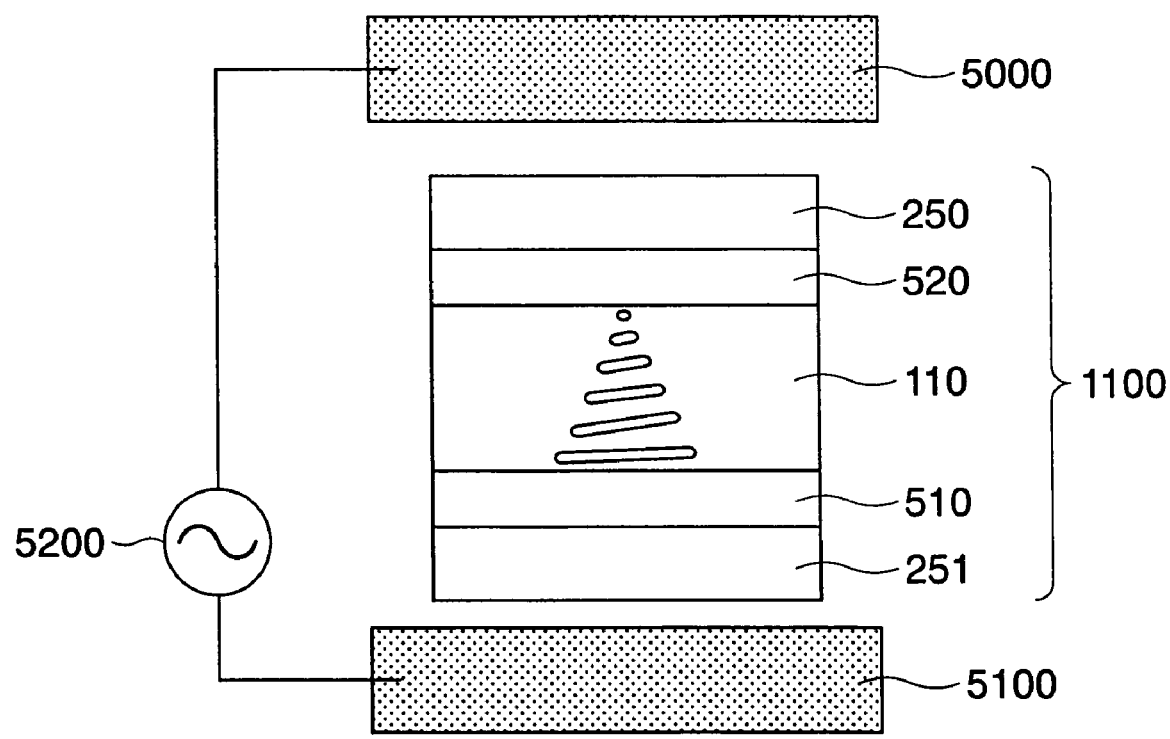
FIG. 19 is a schematic sectional view for describing a liquid crystal film related to the view angle limiting element of the present invention.

FIG. 19 is schematic diagram for explaining a structure of the liquid crystal film 1100. This drawing illustratively shows the above-described structure of the liquid crystal film 1100 in combination with electrodes 5000, 5100, and a power supply 5200 in the case that a polarization condition of the liquid crystal layer 110 is fixed.

The liquid crystal film 1100 is arranged as follows: That is, alignment films 520 and 510 made of polyimide, or the like are provided on both the base film 250 and the base film 251 respectively, which are made of triacetylcellulose, or the like, have a small phase difference along an inner plane direction, and substantially isotropic; and a liquid crystal layer 110 made of rod-shaped liquid crystal molecules is provided between these alignment films 520 and 510.

The liquid crystal layer 110 owns such an alignment of a liquid crystal molecules are twisted by an angle of 90 degrees between two sheets of the base films 250 and 251 by performing the alignment process operation with respect to the alignment films 520 and 510.

In order to non-fluidize the liquid crystal molecules, this liquid crystal layer 110 owns the following important aspect. That is, a polymer group is conducted to a side chain of a liquid crystal compound; the power supply 5200 is connected between the electrodes 5000 and 5100; and under such a condition that a predetermined voltage is applied to the liquid crystal layer 110, the liquid crystal compound is polymerized so as to fix the alignment condition.

Since an electric field strength when the alignment condition of the liquid crystal layer 110 is fixed is controlled, a view angle characteristic of the view angle limiting element 32 can be changed.

Figure 20:
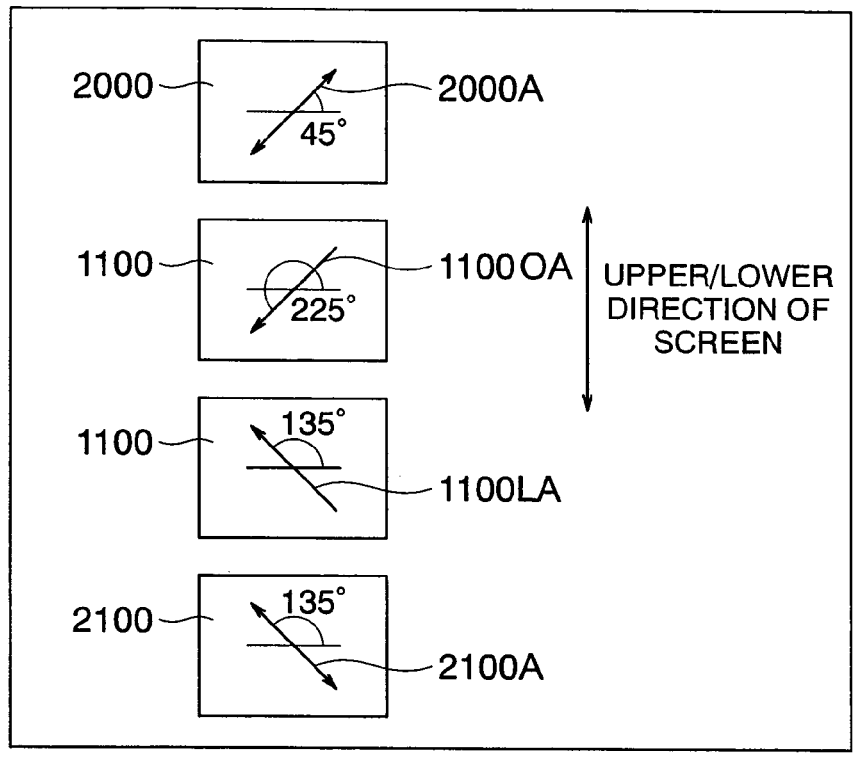
FIG. 20 is an explanatory diagram for explaining a relationship of optical axes of an optical member related to the view angle limiting element of the present invention.

FIG. 20 is a schematic diagram for representing a relationship among an absorption axis 2000A of the polarizing layer 310 of the first polarizing film 2000, an alignment axis 1100OA of the liquid crystal layer 100 of the liquid crystal film 1100 on the side of the first polarizing film 2000 and another alignment axis 1100LA of this liquid crystal film 1000 on the side of the second polarizing film 2100, and an absorption axis 2100A of the polarizing layer 300 of the second polarizing film 2100.

As shown in these drawings, the view angle limiting element 32 of this embodiment 4 is arranged in such a manner that while the absorption axis 2000A of the polarizing layer 310 of the first polarizing film 2000 is located perpendicular to the absorption axis 2100A of the polarizing layer 300 of the second polarizing film 2100, the alignment axes 1100OA and 1100LA of the liquid crystal layer 100 of the liquid crystal film 1000 are located parallel to the absorption axes 2000A and 2100A of the polarizing layers 300 and 310.

In this case, as shown in the drawing, for the sake of convenience, assuming now that an azimuth angle along a right-side direction of the screen is equal to 0 degree, when angles are defined along the counterclockwise direction, the absorption axis 2000A of the polarizing layer 310 of the first polarizing film 2000 corresponds to 45 degrees; the alignment axis 1100OA of the liquid crystal layer 100 of the liquid crystal film 1100 on the side of the first polarizing film 2000 corresponds to 225 degrees, and the alignment axis 1100LA of the liquid crystal layer 100 of the liquid crystal film 1100 on the side of the second polarizing film 2100 corresponds to 135 degrees; and the absorption axis 2100 of the polarizing layer 300 of the second polarizing film 2100 corresponds to 135 degrees.

In this case, when such a light which is entered from the side of the second polarizing film 2100 (or, first polarizing film 2000) to the liquid crystal layer 100 of the liquid crystal film 1000 passes through this liquid crystal layer 100 along the front plane direction, namely, along such a direction that both the azimuth angle and the polar angle are equal to 0 degree, the polarization plane of this light is rotated by an angle of 90 degrees, and then, this light passes though the first polarizing film 2000 (or second polarizing film 2100).

On the other hand, a portion of such a light which is entered from the side of the second polarizing film 2100 (or, first polarizing film 2000) to the liquid crystal layer 100 of the liquid crystal film 1000 is absorbed by the first polarizing film 2000 (or second polarizing film 2100) within such a range of both a predetermined azimuth angle and a predetermined polar angle that an effective phase difference of the liquid crystal layer 110 is equal to zero, or becomes small.

In other words, the view angle limiting element 32 can be realized which can shield light within the range of the predetermined azimuth angle and the predetermined polar angle.

Figure 21:
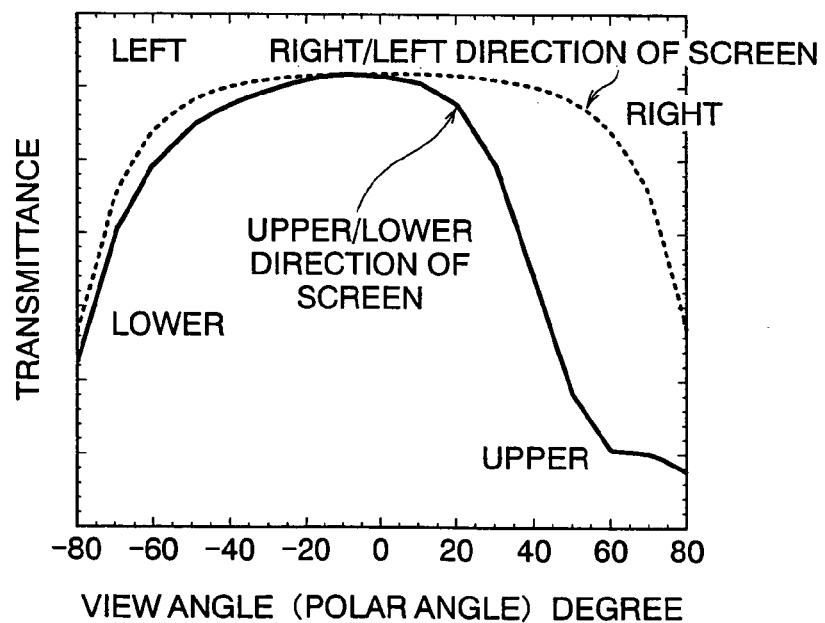
FIG. 21 is a graph for graphically indicating a relationship between a view angle and transmittance, which are used to explain an optical characteristic of the view angle limiting element of the present invention.

For instance, if the following structure is made, then a view angle limiting element having such a characteristic exemplified in FIG. 21 may be realized. That is, in the optical axes arrangement exemplified in FIG. 20, while such a nematic liquid crystal compound is employed whose dielectric constant anisotropy "$\Delta\epsilon$" is equal to 9.9, and also, a liquid crystal layer for constituting a liquid crystal film is employed whose refractive index anisotropy "$\Delta n$" is equal to 0.1, when an alignment condition is fixed under such a condition that a film thickness of this liquid crystal layer is equal to 20 μm, a pretilt angle is nearly equal to 3 degrees, and an electric field strength is equal to 70 KV/m, the above-mentioned characteristic of FIG. 21 may be obtained.

In other words, such a view angle limiting element may be realized which can widen view angles along the right/left direction and the lower direction, and also, can reduce an amount of light emitted from the screen only along the upper direction. In the case that such a view angle characteristic is applied to a monitor mounted on a vehicle, this view angle characteristic may achieve an effect capable of avoiding that image light falls on a windshield of the vehicle.

Figure 22:
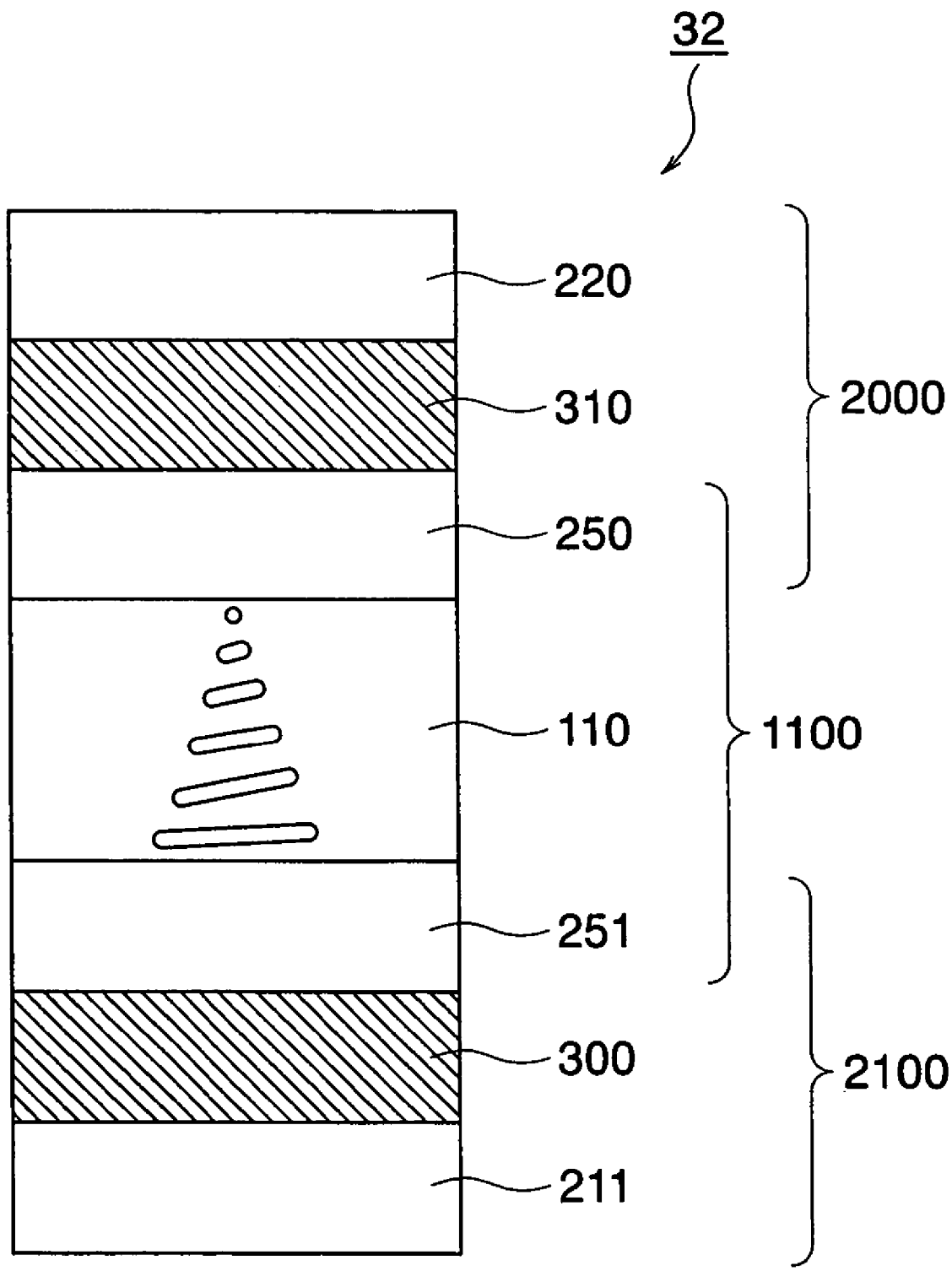
FIG. 22 is a schematic sectional view for explaining a view angle limiting element of the present invention.

It should also be understood that portions of members which constitute the view angle limiting element may be commonly used. FIG. 22 is a sectional view for indicating a portion of another example as to the view angle limiting element 32 of the present invention. This view angle limiting element 32 of FIG. 22 is arranged in such a manner that in the limiting element 32 explained in FIG. 18, the protection film 210 for constructing the second polarizing film 2100 and the protection film 221 which constitutes the first polarizing film 2000 are omitted, and both the base films 250 and 251 which constitute the liquid crystal film 1100 may have the function of the protection films for the first and second polarizing films 2000 and 2100. In this alternative case, while an optical characteristic of this alternative view angle limiting element 32 is not largely changed from that of the above-explained embodiment, this alternative view angle limiting element 32 may be made slim and in a light weight, and also in low cost, since the adhesive layer 400 and the protection films 210 and 221 are omitted.

Further, a plurality of the above-described view angle limiting elements 32 may be alternatively stacked on each other in order to obtain a desirable characteristic. In this alternative case, since two sheets of polarizers (polarizing layers) arranged between the liquid crystal films which constitute the plural view angle limiting elements 32 may be replaced by a single polarizer, such a view angle limiting element may be made slim, in low weight and low cost, as compared with that of such a case that two sets of the view angle limiting elements 32 are simply stacked on each other.

Concretely speaking, in a view angle limiting element equipped with a first polarizing layer, a second polarizing layer, a third polarizing layer, a first liquid crystal layer, and a second liquid crystal layer, the first liquid crystal layer is arranged between the first polarizing layer and the second polarizing layer; the second liquid layer is arranged between the second polarizing layer and the third polarizing layer; absorption axes of both the first polarizing layer and the third polarizing layer are located parallel to each other; and the absorption axis of the second polarizing layer is located perpendicular to the axes of both the first polarizing layer and the third polarizing layer.

While both the first liquid layer and the second liquid layer are made of rod-shaped liquid crystal molecules, the alignment axes of these first and second liquid crystal layers are twisted in such a manner that the alignment axes are located parallel to, or perpendicular to the absorption axes of the polarizing layers which are located in proximity to each other. Furthermore, the liquid crystal molecules are fixed to such an alignment condition that an effective phase difference becomes 0 at a predetermined azimuth angle and a predetermined polar angle.

In this case, such an optical element can be realized, the transmittance of which is low at the predetermined azimuth angle and the predetermined polar angle where the effective phase differences of the two liquid crystal layers become 0. In other words, it is possible to realize such a view angle limiting element capable of shielding the light at the two predetermined azimuth angle and polar angle.

In this alternative case, such a view angle characteristic which could not be obtained by employing only one layer of the liquid crystal film, for example, a view angle characteristic having a narrower view angle may be realized. Also, it is possible to realize such a view angle limiting element capable of limiting transmission of light in a range of plural azimuth angles and plural polar angles.

Emodiment 5

Figure 23:
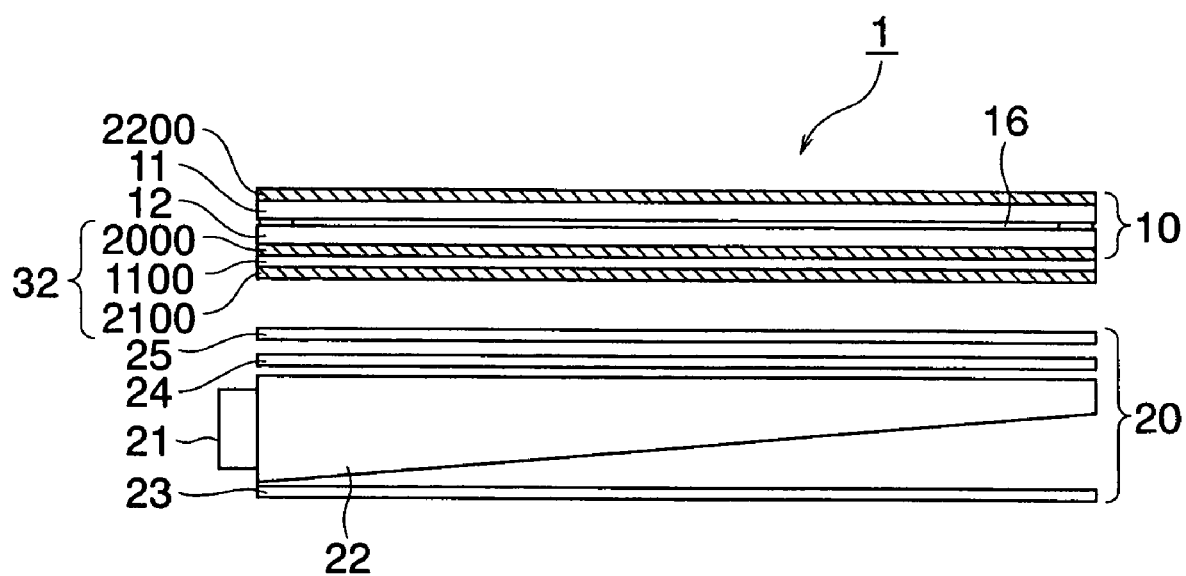
FIG. 23 is a schematic sectional view for explaining a display device of the present invention.

Next, a description is made of a display device according to an embodiment 5 of the present invention. FIG. 23 is a sectional view for partially showing a schematic structure of the display device according to the embodiment 5 of the present invention.

This display device is constituted by a liquid crystal display panel 10, an illuminating device 20 arranged on a rear surface of this liquid crystal display panel 10, and a view angle limiting element 32. This view angle limiting element 32 has been explained in the previous embodiment 4, and is arranged between the liquid crystal display panel 10 and the illuminating device 20. As a consequence, the same reference numerals shown in the above-explained embodiment 4 will be employed as those for denoting the same structural members of this embodiment 5, and detailed explanations thereof are omitted.

The liquid crystal display panel 10 employs either a transmission type liquid crystal display panel or a semi-transmission reflection type liquid crystal display panel, which displays thereon a picture by adjusting a transmission light amount of light emitted from the illuminating device 20.

The liquid crystal display panel 10 is preferably realized by employing such a liquid crystal display panel which is equipped with a polarizer, and is capable of producing a high contrast ratio picture by using a relatively low drive voltage, while a polarization state of light entered into a liquid crystal layer is controlled. In such a liquid crystal display panel, linearly polarized light is utilized as picture light.

As the liquid crystal display panel 10, for instance, a TN (Twisted Nematic) type display panel, an STN (Super Twisted Nematic) type display panel, an ECB (Electrical Controlled Birefringence) type display panel, and the like may be employed. Also, an IPS (In Plane Switching) type display panel having a feature of a wide view angle, and a VA (Vertical Aligned) type display panel having this feature may be employed.

Also, as the liquid crystal display panel 10, a semi-transmission reflection type liquid crystal display panel which utilizes the above-explained type may be alternatively employed.

In this embodiment 5, a description is made of such a case that an active matrix drive type display panel is employed as the liquid crystal display panel 10, while this active matrix drive type display panel is equipped with a switching element such as a thin-film transistor every pixel, and employs the TN type mode as the display mode thereof. However, the present invention is not limited only thereto.

The liquid crystal display panel 10 contains a display panel-purpose transparent substrate 11, and a transparent substrate 12. The transparent substrate 11 is made of flat, transparent, and optically isotropic glass, or plastic. A color filter (not shown), a transparent electrode, and an alignment film (not shown) made of a polyimide-series polymer have been stacked on the transparent substrate 11. An alignment film, an electrode for forming pixels, a signal electrode, a scanning electrode, and a switching element made of a thin-film transistor have been formed on the transparent substrate 12, while these structural elements are not shown.

Two sheets of the transparent substrates 11 and 12 form an inner space in such a manner that while alignment film forming planes thereof are faced to each other, peripheral portions thereof are adhered to each other by a sealing material under such a condition that a predetermined gap is formed between these transparent substrates 11 and 12 by using a spacer (not shown). Then, nematic liquid crystal whose dielectric anisotropic is positive is filled into this inner space, and then, this space is sealed, so that the liquid crystal layer 13 is provided.

As to the liquid crystal layer 16, an alignment direction of a liquid crystal molecular long axis thereof is defined by performing the alignment process with respect to the alignment films formed on two sheets of the transparent substrates 11 and 12. The liquid crystal layer 16 is made of such a twist nematic liquid crystal that an alignment direction of liquid crystal molecules is continuously twisted at an angle of 90 degrees between the two sheets of the transparent substrates 11 and 12. A third polarizing film 2200 and a first polarizing film 2000 are provided on a front plane of the transparent substrate 11 and a rear plane of the transparent substrate 12, respectively.

In this display device, the view angle limiting element 32 and the liquid crystal display panel 10 are arranged in this order from the illuminating device side, and the first polarizing film 2000 which constitutes the view angle limiting element 32 may commonly function as such a polarizer which is arranged on the illuminating device of the liquid crystal display panel 10.

It should also be understood that since the view angle limiting element 32 has been explained in the above-described embodiment, the same reference numerals shown in the previous embodiment will be employed as those for denoting the same portions, and detailed descriptions thereof are omitted.

The view angle limiting element 32 is adhered to the transparent substrate 12 which constitutes the liquid crystal display panel 10 by an adhesive layer. As the adhesive layer, a transparent adhesive agent such as an acrylic series may be employed. Also, the liquid crystal layer 13 is provided between the transparent substrates 11 and 12, and the third polarizing film 2200 is adhered to the front surface side of the transparent substrate 11 by an adhesive agent.

Figure 24:
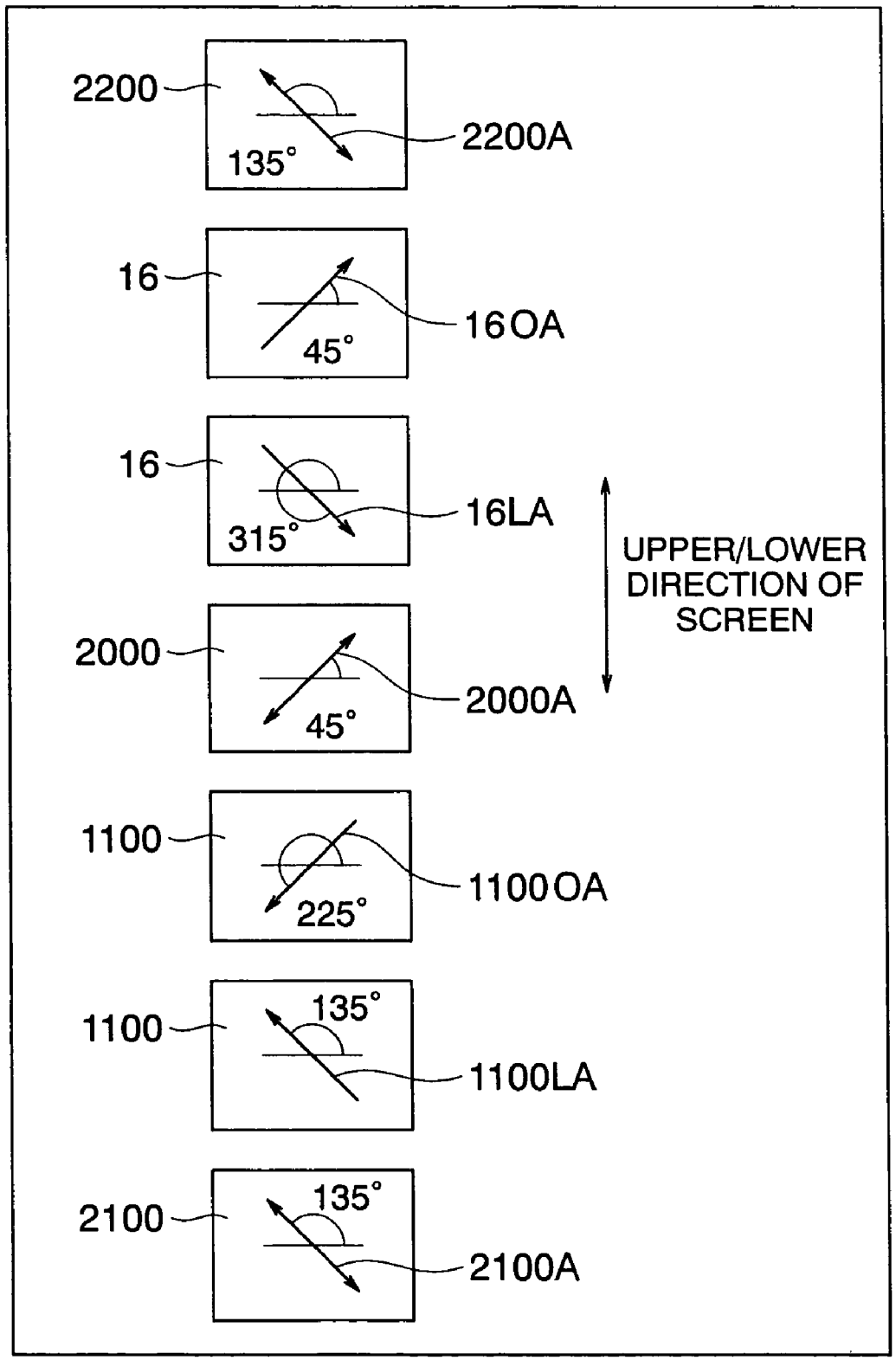
FIG. 24 is an explanatory diagram for explaining a relationship as to optical axes of an optical member related to the display device of the present invention.

FIG. 24 is a diagram for representing one example as to optical axes such as absorption axes of polarizers, an alignment axis of the display panel-purpose liquid crystal layer, and an alignment axis of the liquid crystal layer which constitutes the liquid crystal film related to the display device of this embodiment 5.

In this case, as shown in the drawing, for the sake of convenience, assuming now that an azimuth angle along a right-side direction of the screen is equal to 0 degree, and angles are defined along the counterclockwise direction. As shown in this drawing, this display device is arranged as follows: That is, the absorption axis 2200A of the polarizing layer of the third polarizing film 2200, the absorption axis 2100A of the polarizing layer of the second polarizing film 2100, and the alignment axis 1100LA of the liquid crystal layer of the liquid crystal film 1100 on the side of the second polarizing film 2100 correspond to 135 degrees; an alignment axis 16OA of the liquid crystal layer 16 on the side of the third polarizing film 2200 and the absorption axis 2000A of the polarizing layer of the first polarizing film 2000 correspond to 45 degrees; an alignment axis 16LA of the liquid crystal layer 16 on the side of the first polarizing film 2000 corresponds to 315 degrees; and the alignment axis 1100OA of the liquid crystal layer of the liquid crystal film 1100 corresponds to 225 degrees.

After light emitted from the illuminating device 20 passes through the second polarizing film 2100, this light penetrates through the liquid crystal film 1000, and then, is entered to the first polarizing film 2000.

When the light which will pass through the liquid crystal layer 110 of the liquid crystal film 1000 penetrates through this liquid crystal layer 110, the polarization plane thereof is rotated by an angle of 90 degrees along the front plane direction, namely in such a range that both the azimuth angle and the polar angle are 0 degree and near this range. As a result, this light penetrates through the first polarizing film 2000.

On the other hand, among such light which passes through the second polarizing film 2100 and is entered to the liquid crystal layer 110 of the liquid crystal film 1000, such a light is absorbed by the first polarizing film 2000, which is traveled in such a range of a predetermined azimuth angle and a predetermined polar angle where the effective phase difference of the liquid crystal layer 110 becomes 0, or becomes small.

The light penetrated through the first polarizing film 2000 passes through the liquid crystal layer 16, and then, is entered to the third polarizing film 2200. In this case, since such a voltage corresponding to picture information supplied from a picture information generating unit (not shown) is applied via the pixel electrode 32 to the liquid crystal layer 16, the polarization condition of the light which passes through the liquid crystal layer 16 is controlled, and an amount of light which passes through the third polarizing film 2200 is adjusted, so that desirable picture light can be produced.

In the display device of this embodiment 5, since the optical axes are arranged as exemplified in FIG. 24, such a display device may be realized which can widen view angles along the right/left direction and the lower direction, and also, can reduce an amount of light emitted from the screen only along the upper direction. In the case that such a view angle characteristic is applied to a monitor mounted on a vehicle, this view angle characteristic may achieve an effect capable of avoiding that image light falls on a windshield of the vehicle.

Also, in the display device of the embodiment 5, both the polarizing film which contains the polarizing layer for constructing the view angle limiting element 32, and the polarizer which contains the polarizing layer for constructing the liquid crystal display panel 10 are used as one polarizing film.

In this case, both the light which is effectively utilized in the view angle limiting element 32 and the light which is effectively utilized in the liquid crystal display panel 10 are the same linearly polarized light, and a total number of the polarizing layers which cause the optical loss is decreased. As a result, such a display device capable of having a brighter representation can be realized. Otherwise, if the same bright representation is made, then such a display device operable under lower electric power can be realized.

Furthermore, there is no such an array within the plane of the view angle limiting element 32, while this array owns a regularity which causes moire among pixel arrays of the liquid crystal display panel 10. As a result, the display device can realize such a display having a deterioration of an image quality caused by this moire.

Emodiment 6

Figure 25:
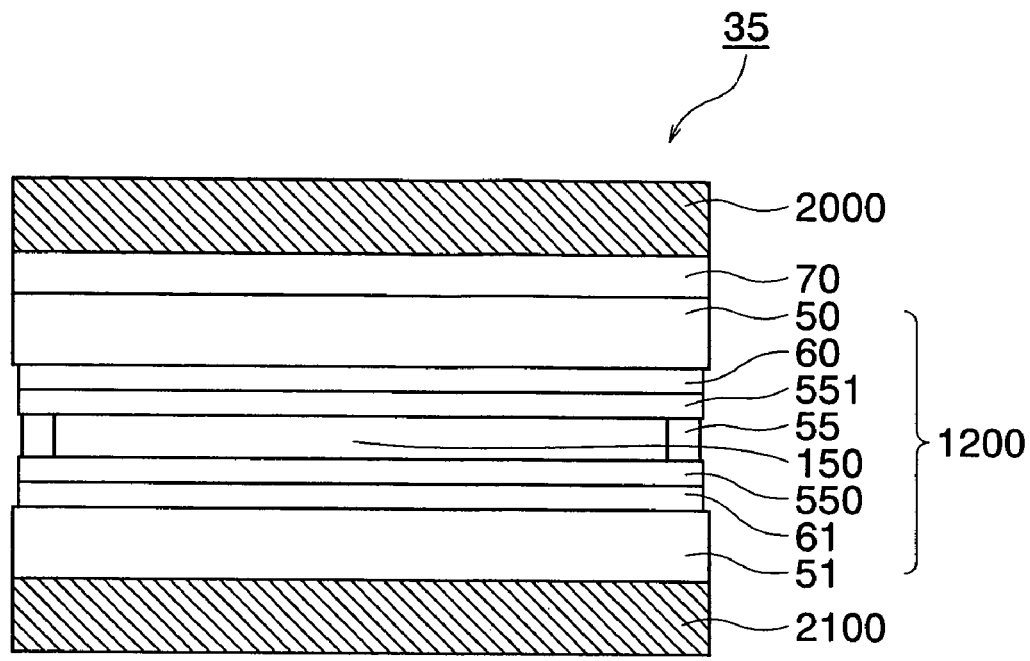
FIG. 25 is a schematic sectional view for explaining a view angle controlling element of the present invention.

Referring now to drawings, a description is made of a view angle controlling element 35 according to an embodiment 6 of the present invention. FIG. 25 is a schematic sectional view for explaining an example of the view angle controlling element 35 of the present invention.

The view angle controlling element 35 is constituted by a first transparent substrate 50 and a second transparent substrate 51 which are made of either glass or plastic which is flat, transparent, and optically isotropic; a polarization condition switching means 1200 equipped with a liquid crystal layer 150; a phase difference plate 70 which is made of a monoaxial anisotropic medium which is optically negative; a first polarizing film 2000, and a second polarizing film 2100.

A transparent electrode 60 and an alignment film 550 made of a polyimide-series polymer have been stacked on the second transparent substrate 51. Similar to the second transparent substrate 51, a transparent electrode 61 and an alignment film 551 have been stacked on the first transparent substrate 50.

As the transparent electrodes 60 and 61, such a transparent electric conducting material may be employed which contains as a major material, such an indium oxide as indium-zinc-oxide (will also be referred to as "IZO"), and indium-tin-oxide (will also be referred to as "ITO").

It should be noted that since the transparent electrodes 60 and 61 which have been formed on the two transparent substrates 50 and 51 are connected via a wiring line (not shown) and a switching element to a power supply, at least two predetermined voltages can be selectively applied to the transparent electrodes 60 and 61.

In other words, it is so arranged that while a predetermined potential difference is produced between the transparent electrodes 60 and 61, a plurality of electric fields having predetermined strengths may be selectively applied to the liquid crystal layer 150.

Two sheets of the transparent substrates 50 and 51 are arranged in such a manner that the plane where the transparent electrodes 60 and 61 have been formed is faced to the plane where the alignment film 550 and 551, and further, these two transparent substrates 50 and 51 are connected via a spacer (not shown) so as to form a constant gap. Then, a peripheral portion of this gap is sealed by a sealing material 55 in a frame shape, so that a space is formed. The liquid crystal layer 150 is constructed by filling nematic liquid crystal whose dielectric anisotropic is positive into this space.

The alignment film 551 which is formed on the first transparent substrate 50 is formed as such a vertical alignment film that liquid crystal molecules are aligned along the vertical direction with respect to the substrate plane, whereas the alignment film 550 which is formed on the second transparent substrate 51 is formed as such an alignment film that this alignment film 550 is processed by way of a rubbing process operation, or the like under such a condition that liquid crystal molecules are slightly inclined by angles of 2 to 4 degrees from the substrate plane. As a result, the following hybrid alignment is made. That is, in the liquid crystal layer 150 of this view angle controlling element 35, the liquid crystal molecules are aligned at a right angle, or an angle near the right angle with respect to the substrate plane on the side of the first transparent substrate 50, and are aligned parallel, or slightly aligned with respect to the substrate plane on the side of the second transparent substrate 51, so that the alignment angle is continuously changed along the thickness direction.

A phase difference plate 70 made of an optically negative mono-axial anistropic medium is provided on the first transparent substrate side of the polarization condition switching means 1200. As this phase difference plate 70, a film made of triacetylcellulose may be used which is used as a protection film of a polarizing film.

An optical nature of the phase difference plate 70 may be featured by a phase difference value "Rth" of a thickness direction which is defined by the below-mentioned formula (1).

$$Rth = (nz - (nx+ny)/2)d \qquad (1)$$

In this formula (1), symbol "nz" indicates a refractive index along the thickness direction; symbol "nx" and "ny" show major refractive indexes along the inner plane direction; and symbol "d" denotes a thickness. In the phase difference plate 70, values of "nx" and "ny" are substantially similar with each other. It is then possible to use a so-called C-plate member. In general, a phase difference value "Rth" of a triacetylcellulose film which is employed as a protection film of a polarizer is nearly equal to −40 nm. Further, such a triacetylcellulose film is present, the phase difference value "Rth" of which is given by Rth=−80 to −120 nm which is 2 to 3 times larger than Rth=−40 nm. Phase difference values "Rth" which are required for the phase difference plate 70 are different from each other, depending upon a characteristic which is required for a view angle controlling element. In order to realize such an "Rth" whose absolute value is larger, a thickness of a triacetylcellulose film is increased; a plurality of films are stacked on each other; such a film is employed which is made of a polymer material except for triacetylcellulose, and the absolute value of "Rth" of this polymer material is large; or a cholestelic liquid crystal layer is employed.

In the case that the cholestelic liquid crystal layer is employed, a pitch may be properly adjusted in order that a wavelength range of selective reflection expressed by this cholestelic liquid crystal layer is not present in a visible wavelength range. If light is entered to the cholestelic liquid crystal layer in an oblique direction, then the wavelength range of the selective reflection is shifted to the short wavelength side. As a result, it is desirable to set as follows: That is, while the wavelength range of the selective reflection is set to the ultraviolet range, even when the light is entered along the oblique direction, the light in the visible wavelength range is not reflected.

A first polarizing film 2000 and a second polarizing film 2100 are provided outside the phase difference plate 70 and the second transparent substrate 51 respectively. As these first and second polarizing films 2000 and 2100, the above-explained polarizing film may be employed.

It should also be understood that the first transparent substrate 50 may be adhered to the phase difference plate 70, the phase difference plate 70 may be adhered to the first polarizing film 2000, and the second transparent substrate 51 may be adhered to the second polarizing film 2100 via such a transparent adhesive agent as acrylic series, respectively.

Figure 26:
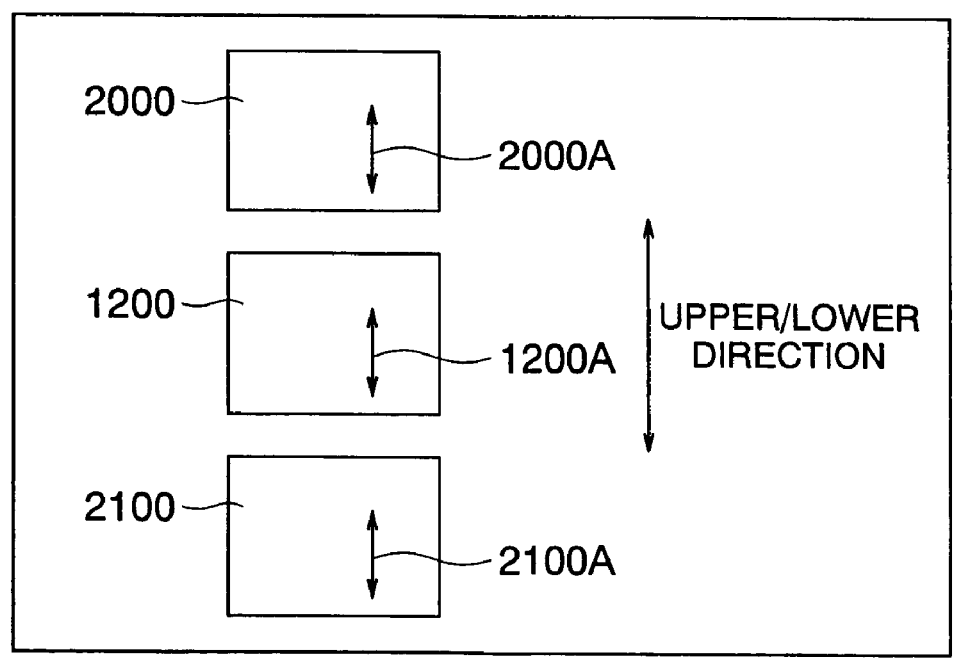
FIG. 26 is an explanatory diagram for explaining a relationship as to optical axes of an optical member related to the view angle controlling element of the present invention.

FIG. 26 is a diagram for representing one example as to optical axes such as absorption axes of polarizers, and an alignment axis of the liquid crystal layer related to the view angle controlling element 35 of this embodiment 5.

In this embodiment 5, as represented in FIG. 26, the absorption axis 2000A of the first polarizing film 2000, the alignment axis 1200A of the liquid crystal layer 150 of the polarization condition switching means 1200 on the side of the second transparent substrate 51, and the absorption axis 2100A of the second polarizing film 2100 are defined along such a direction located parallel to the upper/lower direction, for the sake of convenience. In this case, when any one of voltages from 0 V to 3 V is applied to the liquid crystal layer 150, in such an azimuth perpendicular to the alignment axis 1200A of the liquid crystal layer 150 and in a region in the vicinity of this azimuth, transmittance is lowered along the oblique direction, namely in such a region that an polar angle is large, and a view angle becomes narrow. To the contrary, when a voltage higher than, or equal to 7 V is applied to the liquid crystal layer 150, transmittance is increased in the same azimuth along the oblique direction, namely, in the range where the polar angle is large, and a view angle becomes wide.

In this case, in such a direction parallel to the alignment axis of the liquid crystal layer 150, there is no change in transmittance even in the oblique direction irrespective of a change in the voltages applied to the liquid crystal layer 150.

Figure 28:
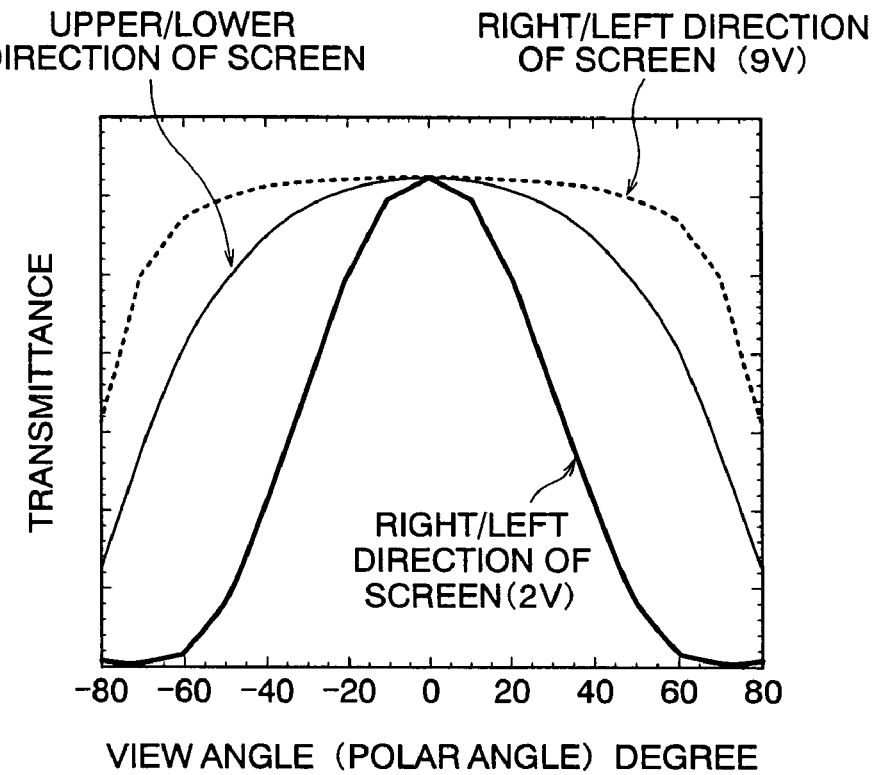
FIG. 28 is a graph for graphically indicating a relationship between a view angle and transmittance, which are used to explain an optical characteristic of the view angle controlling element of the present invention.

For instance, if the following structure is made, then a view angle controlling element having such characteristics exemplified in FIG. 27 and FIG. 28 may be realized. That is, while such a nematic liquid crystal compound for constituting the liquid crystal layer 150 is employed whose dielectric constant anisotropy "Δϵ" is equal to 5.2, and also, whose refractive index anisotropy "Δn" is equal to 0.095, when an alignment condition is fixed under such a condition that a film thickness of this liquid crystal layer 150 is equal to 8 μm, and "Rth" of the phase difference plate 70 is −500 nm.

FIG. 27 is an equi-transmittance diagram for representing a view angle characteristic as to the view angle controlling element 35, and shows such a condition that an AC voltage applied via the transparent electrode 60 and the transparent electrode 61 to the liquid crystal layer 150 of the polarization condition switching means 1200 is selected to be 2 V and 9 V. It should be understood that FIG. 27 standardizes transmittance at the view angle (polar angle)=0 degree as 100%, and describes transmittance values from 90% to 20% every 10%.

Also, in FIG. 28, an abscissa indicates a view angle (polar angle), and an ordinate shows transmittance. FIG. 28 is a diagram for representing view angle dependent characteristics of transmittance along both the upper/lower direction and the right/left direction, for the sake of convenience.

As shown in these drawings, in such a case that the liquid crystal layer 150 of the polarization condition switching means 1200 is driven by the AC voltage of 2 V, the transmittance is lowered since the view angle is increased in the right/left direction. On the other hand, in such a case that the liquid crystal layer 150 of the polarization condition switching means 1200 is driven by the AC voltage of 9 V, the high transmittance can be realized in a wide view angle range.

In other words, since the voltage applied to the liquid crystal layer 150 of the polarization condition switching means 1200, namely the drive voltage is changed, such a view angle controlling element can be realized which can narrow, or widen the view angle along the direction perpendicular to the alignment axis of the liquid crystal layer 150.

In such a case that the phase difference plate 70 is realized by triacetylcellulose, the protection film of the first polarizing film 2000 and the phase difference plate 70 may be commonly used, so that both a protection film and an adhesive layer may be omitted, and thus, such a view angle controlling element may be made thinner and in lighter weight.

Emodiment 7

Figure 29:
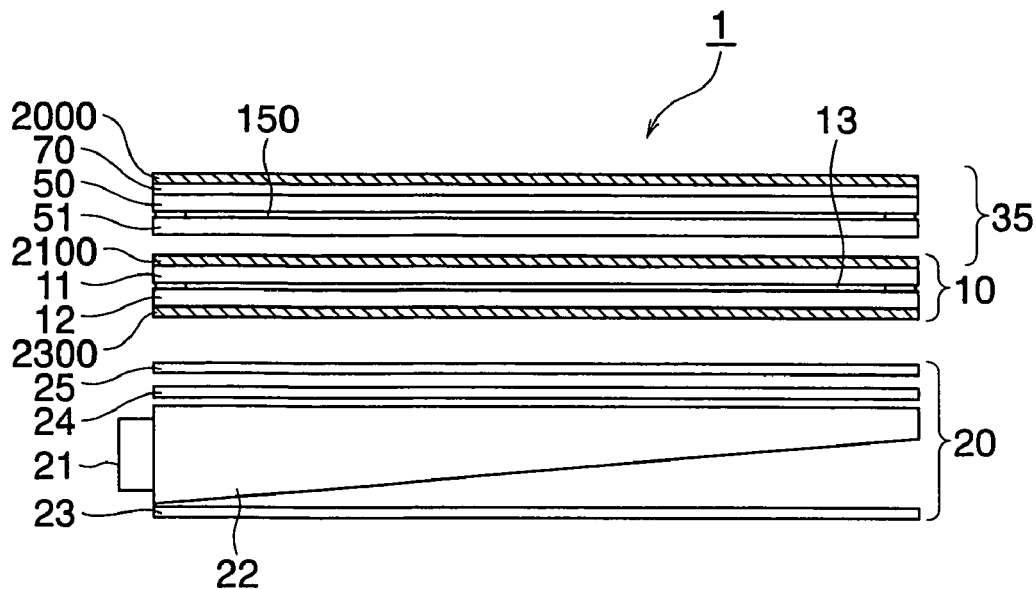
FIG. 29 is a schematic sectional view for explaining a display device of the present invention.

Next, a description is made of a display device according to another embodiment 7 of the present invention with reference to drawings. FIG. 29 is a sectional view for partially showing a schematic structure of the display device according to the embodiment 7 of the present invention.

This display device is constituted by a liquid crystal display panel 10, an illuminating device 20 arranged on a rear surface of this liquid crystal display panel 10, and a view angle controlling element 35. This view angle controlling element 35 has been explained in the previous embodiment 4, and is arranged on the front surface side of the liquid crystal display panel 10. As a consequence, the same reference numerals shown in the above-explained embodiment 6 will be employed as those for denoting the same structural members having the same functions in this embodiment 7, and detailed explanations thereof are omitted.

This embodiment 7 will explain that as the liquid crystal display panel 10, an IPS type display panel is employed similar to the above-explained embodiment 6 with reference to FIG. 5, but the present invention is not limited only thereto.

In the display device of this embodiment 7, the liquid crystal display panel 10 and the view angle controlling element 35 are arranged in this order from the side of the illuminating device 20. The second polarizing film 2100 which constitutes the view angle controlling element 35 may also function as a polarizing film which is arranged on the front surface side of the liquid crystal display panel 10.

As a consequence, the second polarizing film 2100 may be adhered to the transparent substrate 11 of the liquid crystal display panel 10, and may be arranged to be separated from the second transparent substrate 51 of the view angle controlling element 35. However, in order to reduce unwanted boundary plane reflections, an adhesive agent may be alternatively provided between the second transparent substrate 51 and the second polarizing film 2100, or a gap between these optical members 51 and 2100 may be alternatively filled by a transparent medium whose refractive index is nearly equal to the refractive indexes of these optical members.

Also, a third polarizing film 2300 is adhered to the transparent substrate 12 for constructing the liquid crystal display panel 11 by using an adhesive agent.

Figure 30:
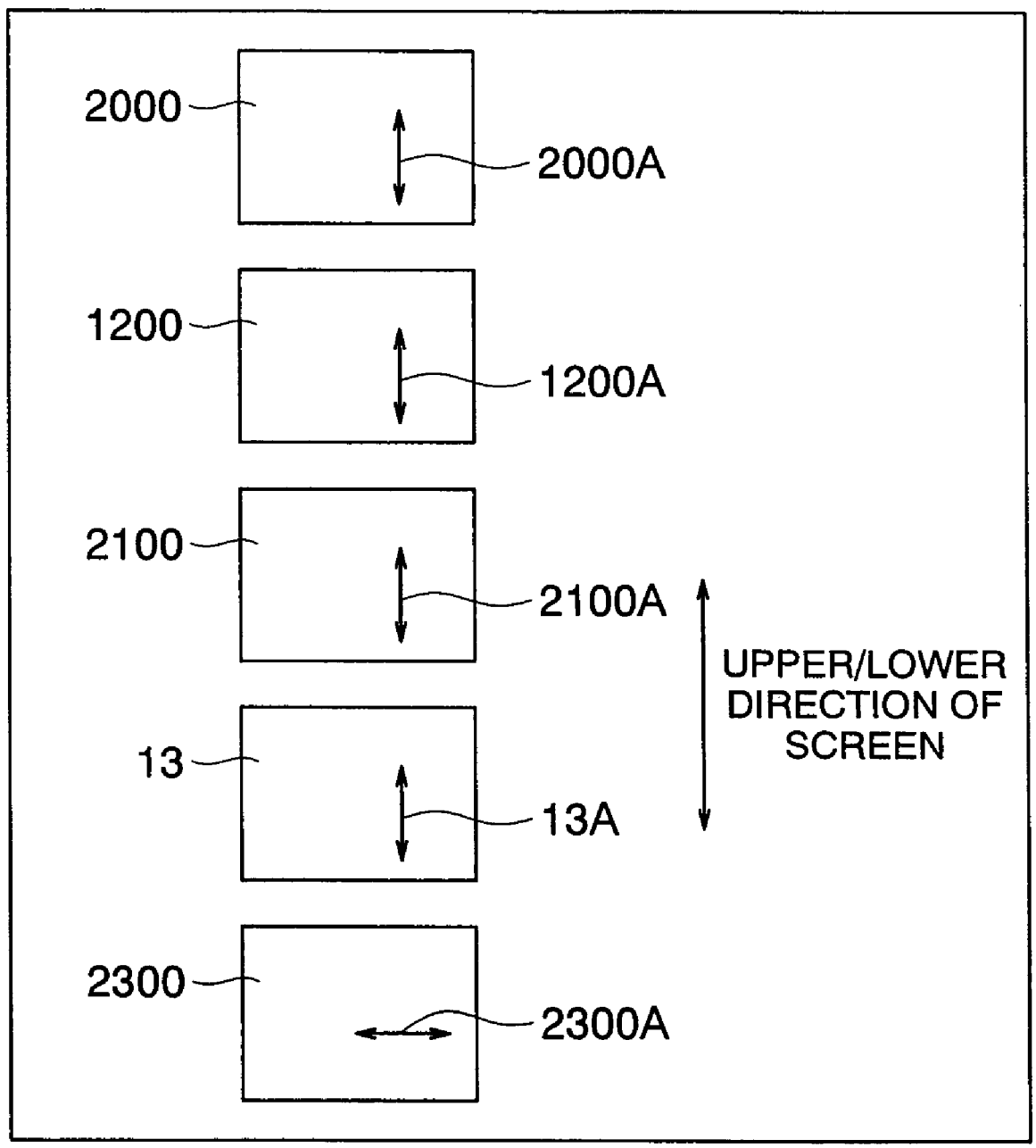
FIG. 30 is an explanatory diagram for explaining a relationship as to optical axes of an optical member related to the view angle controlling element of the present invention.

FIG. 30 is a diagram for explaining a relationship as to optical axes such as absorption axes of polarizing films, an alignment axis of a liquid crystal layer of liquid crystal layer, and an alignment axis of a liquid crystal layer of the polarization condition switching means related to the display device of this embodiment 7.

In this embodiment 7, as represented in FIG. 30, an absorption axis 2000A of the first polarizing film 2000, an alignment axis 1200A of the liquid crystal layer 150 of the polarization condition switching means 1200, an absorption axis 2100A of the second polarizing film 2100, and an alignment axis 13A of the liquid crystal display panel 10 are arranged parallel to the upper/lower direction of the screen, whereas the absorption axis 2300A of the third polarizing film 2300 is arranged perpendicular to the upper/lower direction of the screen.

In this case, light which is emitted from the illuminating device 20 is entered into the third polarizing film 2200 which constitutes the liquid crystal display panel 10.

The light penetrated through the third polarizing film 2200 passes through the liquid crystal layer 13, and then, is entered to the second polarizing film 2100. In this case, since such a voltage corresponding to picture information supplied from a picture information generating unit (not shown) is applied, the polarization condition of the light which passes through the liquid crystal layer 13 is controlled, and an amount of light which passes through the second polarizing film 2100 is adjusted, so that desirable picture light can be produced.

The picture light which has passed through the second polarizing film 2100 penetrates through the polarization condition switching means 1200 which constitutes the view angle controlling means 35, and also, the phase difference plate 70, and then, is entered into the first polarizing film 2000.

In this case, when any one of voltages from 0 V to 3 V is applied to the liquid crystal layer 150, in such an azimuth perpendicular to the alignment axis 1200A of the liquid crystal layer 150 on the side of the second polarizing film 2100 and in a region in the vicinity of this azimuth, transmittance is lowered along the oblique direction, namely in such a region that an polar angle is large, and a view angle becomes narrow. To the contrary, when a voltage higher than, or equal to 7 V is applied to the liquid crystal layer 150, transmittance is increased in the same azimuth along the oblique direction, namely, in the range where the polar angle is large, and a view angle becomes wide.

In this case, in such a direction parallel to the alignment axis of the liquid crystal layer 150, there is no change in transmittance even in the oblique direction irrespective of a change in the voltages applied to the liquid crystal layer 150.

In other words, since the voltage applied to the liquid crystal layer 150 of the polarization condition switching means 1200, namely the drive voltage is changed, such a view angle along the direction perpendicular to the alignment axis of the liquid crystal layer 150 can be narrowed, or widened.

In the case of such an optical axis arrangement exemplified in FIG. 30, brightness of the picture light along the right/left direction of the screen is arbitrarily darkened, so that visibility can be deteriorated. In such a case that the switching operation of such view angle characteristics is applied to display devices of portable appliances such as a portable telephone, a notebook PC, and a PDA, and also to display devices of public-use appliances such as an ATM, this view angle characteristic switching operation may achieve an effect capable of avoiding peeping actions along a lateral direction.

Also, in the display device of this embodiment 7, both the polarizing film for constituting the view angle controlling element 35 and the polarizing film for constituting the liquid crystal display panel 10 are realized by a single polarizing film. In this case, both the light which is effectively utilized in the view angle controlling element 35 and the light which is effectively utilized in the liquid crystal display panel 10 correspond to the same linearly polarized light, and a total number of the polarizing layers which cause the optical loss is decreased. As a result, such a display device capable of having a brighter representation can be realized. Otherwise, if the same bright representation is made, then such a display device operable under lower electric power can be realized.

It should also be understood that in the display device of this embodiment 7, the view angle controlling element 35 has been arranged on the front surface side of the liquid crystal display panel 10. In this case, when a semi-transparent reflection type display panel is applied as this liquid crystal display panel 10, such a display device may be realized by which the view angles may be switched not only in the transmission display mode, but also in the reflection display mode.

Also, such an explanation has been made that in the display device of this embodiment 7, the view angle controlling element 35 has been arranged on the front surface side of the liquid crystal display panel 10, but the present invention is not limited only thereto. That is to say, the view angle controlling element 35 may be alternatively arranged between the liquid crystal display device 10 and the illuminating device 20.

In this alternative case, a reflection type polarizing film may be arranged on the light source side of both the first polarizing film and the second polarizing film which constitute the view angle controlling element 35, or at least any one of these polarizing films. Otherwise, both of these first and second polarizing films, or at least any one of them may be made of the reflection type polarizing film. Further, a diffusing/reflecting means may be provided in the illuminating device 20, which diffuses and reflects such a light which is reflected from the reflection type polarizing film and is returned to the illuminating device 20.

In this alternative case, a portion of the light emitted from the illuminating device 20 is reflected by the reflection type polarizing film, and is again returned to the illuminating device 20. The light returned to the illuminating device 20 is reflected to be again utilized. In this case, since a portion of the reused light is returned to the front plane direction, the following effect may be achieved. That is, when the view angle is narrowed by the view angle controlling element 35, illuminance along the front plane direction may be improved.

Emodiment 8

Figure 31:
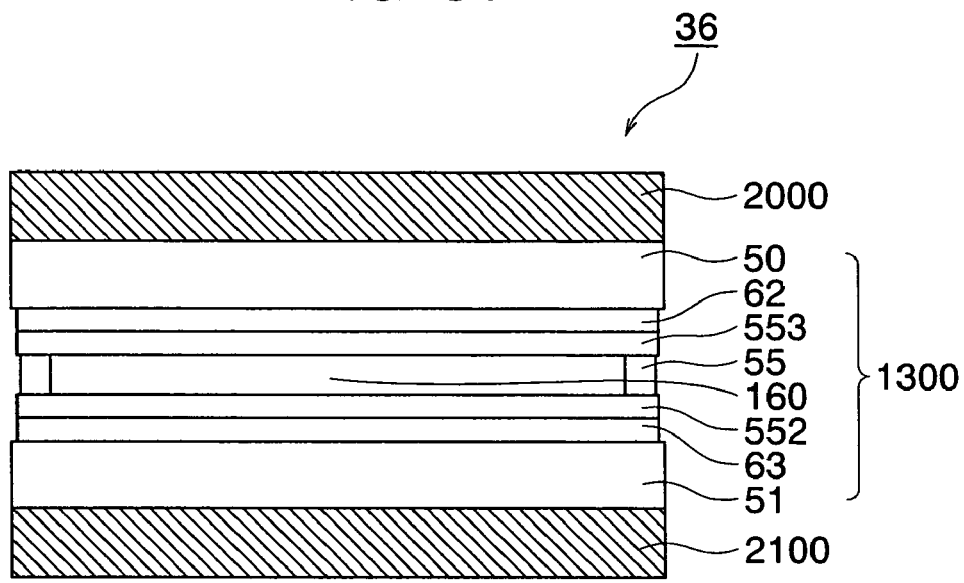
FIG. 31 is a schematic sectional view for explaining a display device of the present invention.

Referring now to drawings, a description is made of a view angle controlling element 36 according to another embodiment 8 of the present invention. FIG. 31 is a schematic sectional view for explaining an example of the view angle controlling element 36 of the present embodiment 8. This view angle controlling element 36 is featured by that in the view angle controlling element 35 explained in the above-described embodiment 6, an alignment condition of liquid crystal molecules of a liquid crystal layer is changed and a direction of an absorption axis of a polarizer is changed, and further, the phase difference plate 70 is omitted. It should be noted that the same reference numerals shown in the above-described embodiment 6 will be employed as those for denoting the same structural elements in this embodiment 8, and detailed descriptions thereof are omitted.

The view angle controlling element 36 is constituted by a first transparent substrate 50 and a second transparent substrate 51; a polarization condition switching means 1300 equipped with a liquid crystal layer 160; a first polarizing film 2000; and a second polarizing film 2100.

A transparent electrode 62 and an alignment film 553 made of a polyimide-series polymer have been stacked on the first transparent substrate 50. A transparent electrode 63 and an alignment film 552 have been stacked on the second transparent substrate 51.

It should be noted that since the transparent electrodes 62 and 63 which have been formed on the two transparent substrates 50 and 51 are connected via a wiring line (not shown) and a switching element to a power supply, at least two predetermined voltages can be selectively applied to the transparent electrodes 62 and 63.

In other words, it is so arranged that while a predetermined potential difference is produced between the transparent electrodes 62 and 63, a plurality of electric fields having predetermined strengths may be selectively applied to the liquid crystal layer 160.

Two sheets of the transparent substrates 50 and 51 are arranged in such a manner that the plane where the transparent electrodes 62 and 63 have been formed is faced to the plane where the alignment films 552 and 553, and further, these two transparent substrates 50 and 51 are connected via a spacer (not shown) so as to form a constant gap. Then, a peripheral portion of this gap is sealed by a sealing material 55 in a frame shape, so that a space is formed. The liquid crystal layer 160 is constructed by filling nematic liquid crystal whose dielectric anisotropic is positive into this space.

In this embodiment 8, a so-called "TN liquid crystal element" is arranged in such a manner that since the alignment films 553 and 552 which are formed on the two transparent substrates 50 and 51 are processed by such an alignment process as a rubbing process, liquid crystal molecule long axes of the liquid crystal layer 160 are continuously twisted by an angle of 90 degrees between these two transparent substrates 50 and 51.

A first polarizing film 2000 and a second polarizing film 2100 are provided outside the first transparent substrate 50 and the second transparent substrate 51 respectively. As these first and second polarizing films 2000 and 2100, the above-explained polarizing film may be employed.

It should also be understood that the first transparent substrate 50 may be adhered to the first polarizing film 2000, and the second transparent substrate 51 may be adhered to the second polarizing film 2100 via such a transparent adhesive agent as acrylic series.

Figure 32:
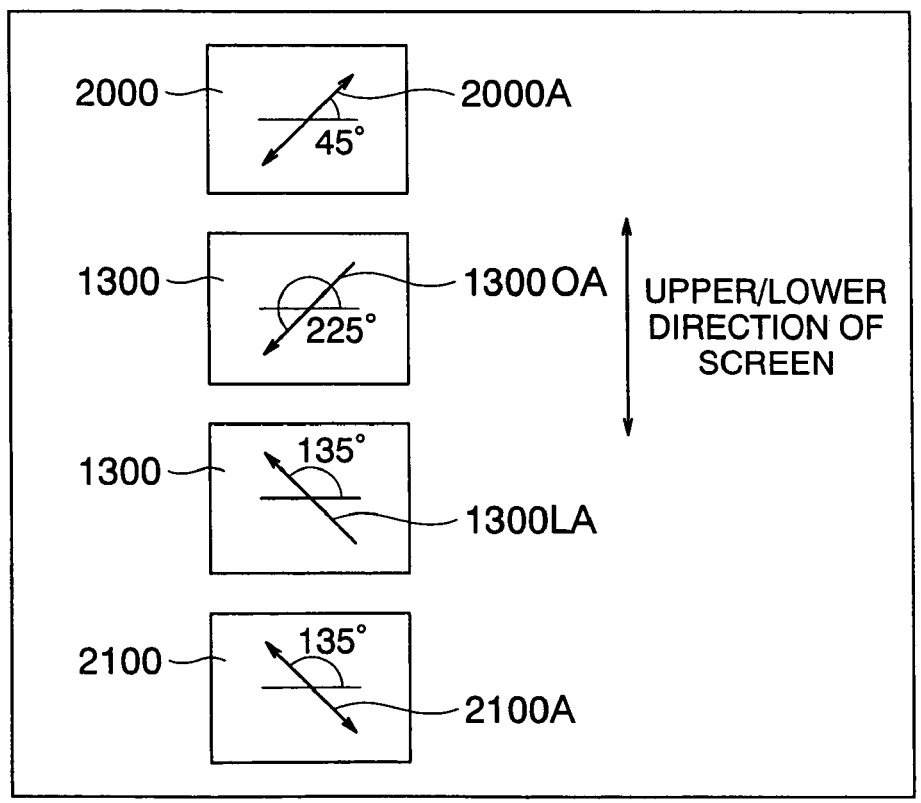
FIG. 32 is an explanatory diagram for explaining a relationship as to optical axes of an optical member related to the view angle controlling element of the present invention.

FIG. 32 is a diagram for representing one example as to optical axes such as absorption axes of polarizing films, and an alignment axis of the liquid crystal layer related to the view angle controlling element of this embodiment 8. As shown in this drawing, a view angle controlling element of this embodiment 8 is arranged in such a manner that while the absorption axis 2000A of the polarizing layer 310 of the first polarizing film 2000 is located perpendicular to the absorption axis 2100A of the polarizing layer 300 of the second polarizing film 2100, an alignment axis of a liquid crystal layer of the polarization condition switching means 1300 is located parallel to the absorption axes of the polarizers which are located in the vicinity thereto.

In this case, as shown in the drawing, for the sake of convenience, assuming now that an azimuth angle along a right-side direction of the screen is equal to 0 degree, when angles are defined along the counterclockwise direction, an alignment axis 1300OA of the liquid crystal layer 160 of the polarization condition switching means 1300 on the side of the first polarizing film 2000 corresponds to 225 degrees, and both an alignment axis 1300LA of the liquid crystal layer 160 of the polarization condition switching means 1300 on the side of the second polarizing film 2100 corresponds to 135 degrees; and the absorption axis 2100 of the polarizing layer 300 of the second polarizing film 2100 corresponds to 135 degrees.

In such a case that a drive voltage is not applied to the liquid crystal layer 160 of the polarization condition switching means 1300, when such a light which passes through the second polarizing film 2100 and then is entered to the polarization condition switching means 1300 penetrates through this liquid crystal layer 160, polarization planes of major light portions thereof are rotated by an angle of 90 degrees, and then, these major light portions pass through the first polarizing film 2000. As a result, transmittance may become large over a wide view angle range.

On the other hand, when the drive voltage is applied to the liquid crystal layer 160 of the polarization condition switching means 1300, among such a light which passes through the second polarizing film 2100 and then is entered to the polarization condition switching means 1300, a major light component of light which is traveled at a predetermined azimuth angle and a predetermined polar angle is absorbed by the first polarizing film 2000, under which the effective phase difference of the liquid crystal layer 160 becomes 0, or nearly equal to 0.

In other words, when no drive voltage is applied to the liquid crystal layer 160, the wide view angle can be obtained, whereas when the drive voltage is applied to the liquid crystal layer 160, the view angle limiting element can be realized which can shield light within the range of the predetermined azimuth angle and the predetermined polar angle.

Figure 33:
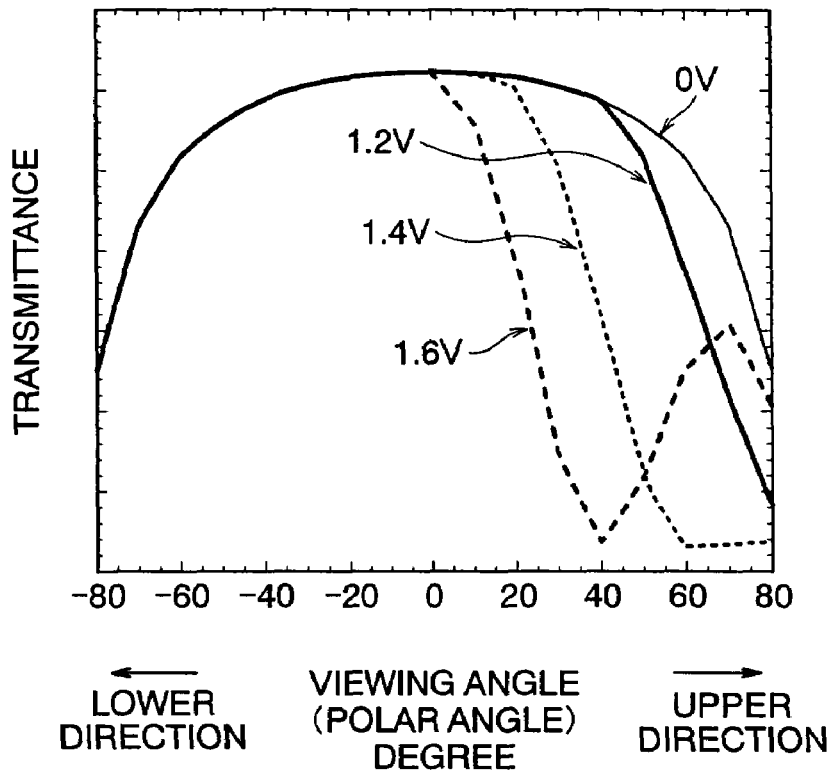
FIG. 33 is a graph for graphically indicating a relationship between a view angle and transmittance, which are used to explain an optical characteristic of the view angle controlling element of the present invention.

For instance, if the following structure is made, then a view angle controlling element having such a characteristic exemplified in FIG. 33 may be realized. That is, while such a nematic liquid crystal compound is employed whose dielectric constant anisotropy "Δε" is equal to 9.9, and also, a liquid crystal layer for constituting a liquid crystal film is employed whose refractive index anisotropy "Δn" is equal to 0.1, when an alignment condition is fixed under such a condition that a film thickness of this liquid crystal layer 160 is equal to 29 μm, and a pretilt angle is nearly equal to 3 degrees, the above-mentioned characteristic of FIG. 33 may be obtained.

Also, in FIG. 33, an abscissa indicates a view angle namely, an polar angle, and an ordinate shows transmittance. FIG. 32 is a diagram for representing a view angel dependent characteristic of transmittance along the upper/lower direction, for the sake of convenience.

As shown in these drawings, when a voltage is applied to the liquid crystal layer 160 of the polarization condition switching means 1300, there is substantially no change in transmittance along the right/left direction and the lower direction. However, the transmittance only along the upper direction can be reduced in a predetermined view angle range in response to the drive voltage for this liquid crystal layer 160.

In other words, such a view angle controlling element can be realized by which the view angle along both the right/left direction and the lower direction is made wider, and the brightness of the screen is switched in response to only the upper direction, if required. In the case that such a view angle characteristic is applied to a monitor mounted on a vehicle, this view angle characteristic may achieve an effect capable of avoiding that image light falls on a windshield of the vehicle.

It could be confirmed that as a result of investigation, under such a condition that the transmittance along the front plane direction is not substantially changed, in order to control the transmittance at a predetermined azimuth angle and along a predetermined polar angle direction, it is desirable to set a value of "Δnd" of the liquid crystal layer 160 to be larger than, or equal to 2000 nm. This "Δnd" value of 2000 nm is approximately 4 times larger than such a fact that a "Δnd" value of the liquid crystal layer 160 is nearly equal to 400 to 500 nm in such a case that the TN display mode is applied to the liquid crystal display panel, namely, this "Δnd" value of 2000 nm cannot be easily conceived.

Also, if the "Δnd" value of the liquid crystal layer 160 is excessively increased, then a minimum value of such a transmittance is increased which could be obtained at a predetermined azimuth angle and a predetermined polar angle under which the transmittance is wanted to be controlled, so that a sufficiently effective light shielding effect cannot be achieved. As a consequence, it is preferable to set the "Δnd" value of the liquid crystal layer 160 to be smaller than, or equal to 5000 nm.

In other words, when the TN liquid crystal is employed as explained in this embodiment 8, it is desirable that the "Δnd" value of the liquid layer 160 of the view angle controlling element 36 is selected to be larger than, or equal to 2000 nm, and smaller than, or equal to 5000 nm. More specifically, in order that in such an azimuth angle and an polar angle direction where transmittance is not required to be controlled, a change in the transmittance when a predetermined voltage is applied to the liquid crystal layer 160 is made smaller, and further, a minimum value of such a transmittance is made smaller, which is obtained in such an azimuth angle and an polar angle direction where transmittance is wanted to be controlled, the "Δnd" value of the liquid crystal layer 160 is preferably selected to be from 2500 nm to 3500 nm.

It should also be understood that in order to reduce a change of the transmittance along the front plane direction, the drive voltage for the liquid crystal layer 160 is preferably set to be lower than, or equal to AC 3 V, and more preferably set to be lower than, or equal to 2 V. In this case, a frequency must be selected to such a frequency value by which a flicker phenomenon does not appear, but also, a display of the liquid crystal display panel 10 is not deteriorated. Concretely speaking, this frequency may be preferably selected to be higher than, or equal to 60 Hz.

Emodiment 9

Figure 34:
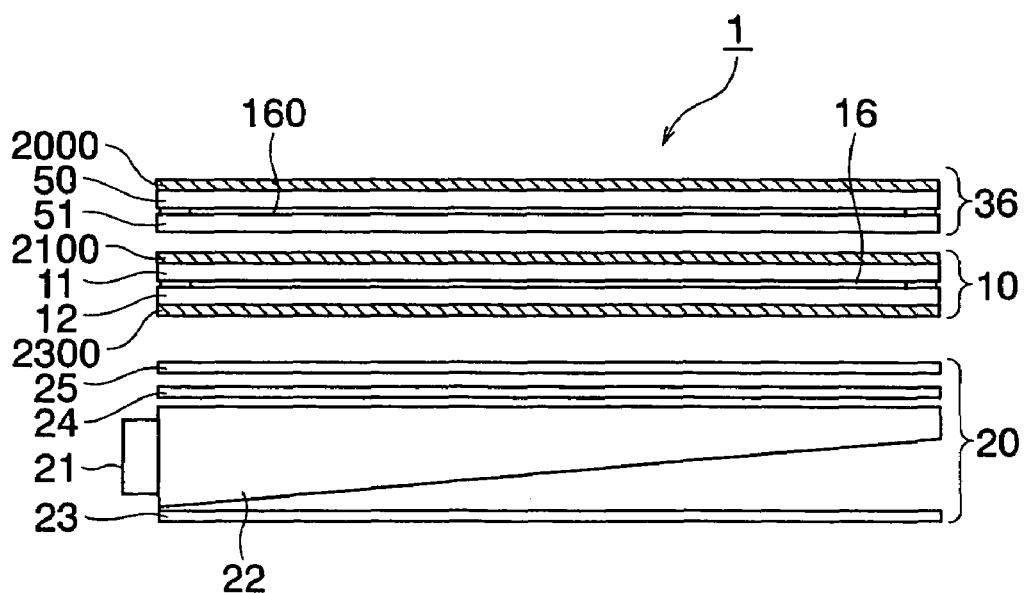
FIG. 34 is a schematic sectional view for explaining a display device of the present invention.

Next, a description is made of a display device 1 according to another embodiment 9 of the present invention with reference to drawings. FIG. 34 is a sectional view for partially showing a schematic structure of the display device 1 according to the embodiment 9 of the present invention.

This display device 1 is constituted by a liquid crystal display panel 10, an illuminating device 20 arranged on a rear surface of this liquid crystal display panel 10, and a view angle controlling element 36. This view angle controlling element 36 has been explained in the previous embodiment 8, and is arranged on the front surface side of the liquid crystal display panel 10. As a consequence, the same reference numerals shown in the above-explained embodiment 8 will be employed as those for denoting the same structural members having the same functions in this embodiment 9, and detailed explanations thereof are omitted.

This embodiment 9 will explain that as the liquid crystal display panel 10, a TN type display panel is employed similar to the above-explained embodiment 5 with reference to FIG. 23, but the present invention is not limited only thereto.

In the display device 1 of this embodiment 9, the liquid crystal display panel 10 and the view angle controlling element 36 are arranged in this order from the side of the illuminating device 20. The second polarizing film 2100 which constitutes the view angle controlling element 36 may also function as a polarizing film which is arranged on the front surface side of the liquid crystal display panel 10.

As a consequence, the second polarizing film 2100 may be adhered to the transparent substrate 11 of the liquid crystal display panel 10, and may be arranged to be separated from the second transparent substrate 51 of the view angle controlling element 36.

Also, a third polarizing film 2300 is adhered to the transparent substrate 12 for constructing the liquid crystal display panel 10 by using an adhesive agent.

Figure 35:
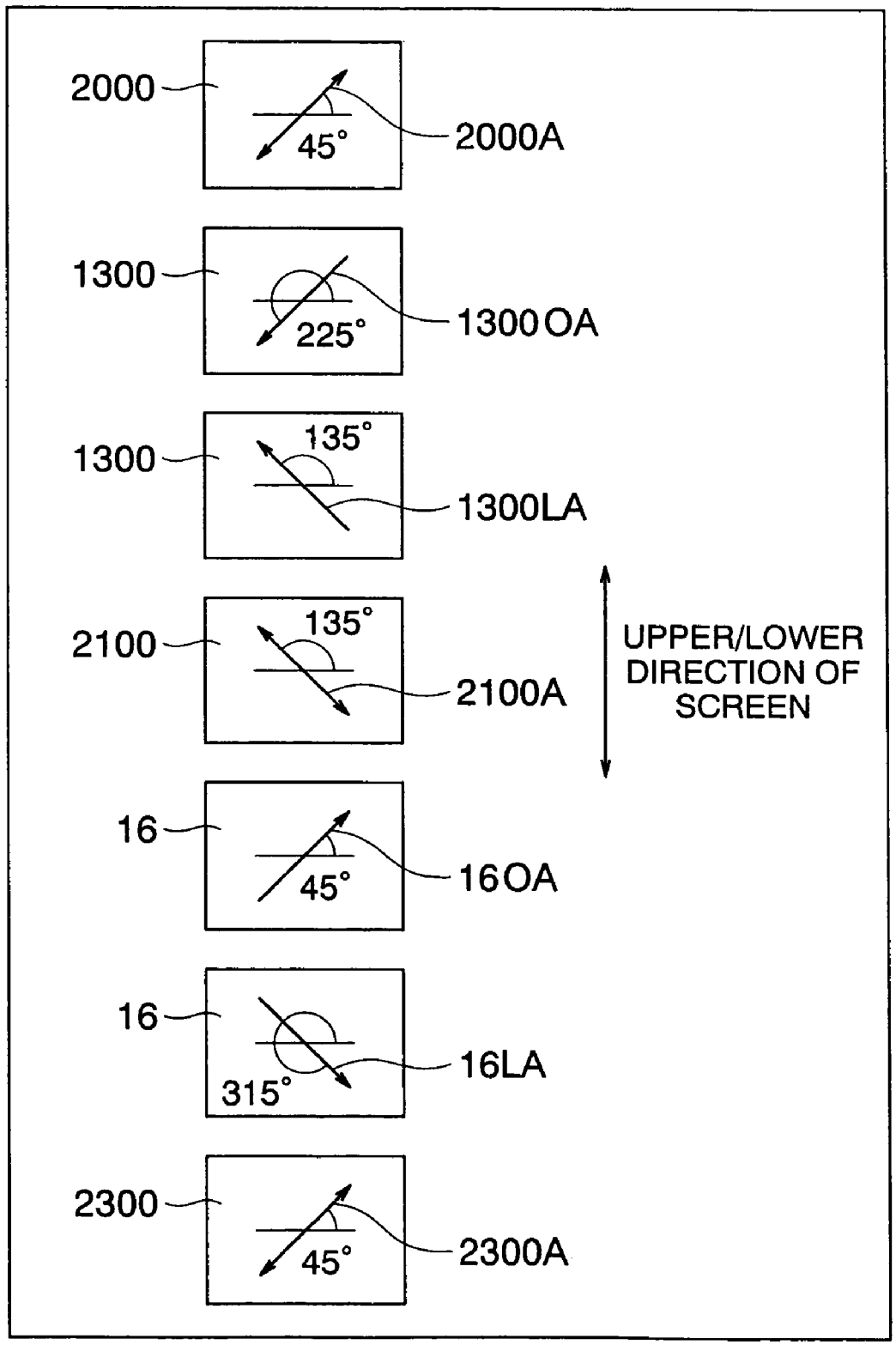
FIG. 35 is an explanatory diagram for explaining a relationship as to optical axes of an optical member related to a display device of the present invention.

FIG. 35 is a diagram for explaining a relationship as to optical axes such as absorption axes of polarizing films, an alignment axis of a liquid crystal layer of a liquid crystal display panel, and an alignment axis of a liquid crystal layer of the polarization condition switching means related to the display device of this embodiment 9.

In this case, as shown in FIG. 35, for the sake of convenience, assuming now that an azimuth angle along a right-side direction of the screen is equal to 0 degree, when angles are defined along the counterclockwise direction, the absorption axis 2000A of the polarizing layer 310 of the first polarizing film 2000 corresponds to 45 degrees; an alignment axis 1300OA of a liquid crystal layer of a polarization condition switching means 1300 on the side of the first polarizing film 2000 corresponds to 225 degrees; another alignment axis 1300LA of the liquid crystal layer of he polarization condition switching means 1300 on the side of the second polarizing film 2100 and an absorption axis 2100A of a polarizing layer 300 of the second polarizing film 2100 correspond to 135 degrees.

Also, an alignment axis 160OA of a liquid crystal layer 16 of the crystal liquid display panel 10 on the second polarizing film 2100 corresponds to 45 degrees; another alignment axis 16LA of the liquid crystal layer 16 of the liquid crystal display panel 10 on the side of the third polarizing film 2300 corresponds to 315 degrees; and an absorption axis 2300A of the third polarizing film 2300 corresponds to 45 degrees.

In this case, such a light which has been emitted from the illuminating device 20 and then has passed through the third polarizing film 2300 for constituting the liquid crystal display panel 10 passes through the liquid crystal layer 16, and then, is entered to the second polarizing film 2100. In this case, since such a voltage corresponding to picture information supplied from a picture information generating unit (not shown) is applied to the liquid crystal layer 16, the polarization condition of the light which passes through the liquid crystal layer 16 is controlled, and an amount of light which passes through the second polarizing film 2100 is adjusted, so that desirable picture light can be produced.

The picture light which has passed through the second polarizing film 2100 penetrates through the polarization condition switching means 1300 which constitutes the view angle controlling means 36, and then, is entered into the first polarizing film 2000.

When a drive voltage is not applied to the liquid crystal layer 160 of the polarization condition switching means 1300, in such a case that the light which has passed through the second polarizing film 2100 and has entered to the polarization condition switching means 1300 penetrates through the liquid crystal layer 160, polarized planes of major light components thereof are rotated by an angle of 90 degrees, and penetrates through the first polarizing film 2000. As a result, high transmittance may be achieved over a wide view angle range.

On the other hand, when a drive voltage is applied to the liquid crystal layer 160 of the polarization condition switching means 1300, among the light which has passed through the second polarizing film 2100 and has entered to the polarization condition switching means 1300, such a light which is traveled in a predetermined azimuth angle and along a predetermined polar angle direction where an effective phase difference of the liquid crystal layer 160 becomes 0, or nearly equal to 0, is absorbed by the first polarizing film 2000.

That is to say, such a display device 1 can be realized by which in such a case that the drive voltage is not applied to the liquid crystal layer 160, the wide view angle can be obtained, whereas when the drive voltage is applied to the liquid crystal layer 160, the picture light can be darkened in the predetermined azimuth angle and the predetermined polar angle direction.

In accordance with this embodiment 8, such a display device 1 can be realized which is capable of controlling brightness of the picture light along the upper direction on the screen. In the case that such a view angle characteristic is applied to a monitor mounted on a vehicle, this view angle characteristic may achieve an effect capable of avoiding that image light falls on a windshield of the vehicle.

Figure 36:
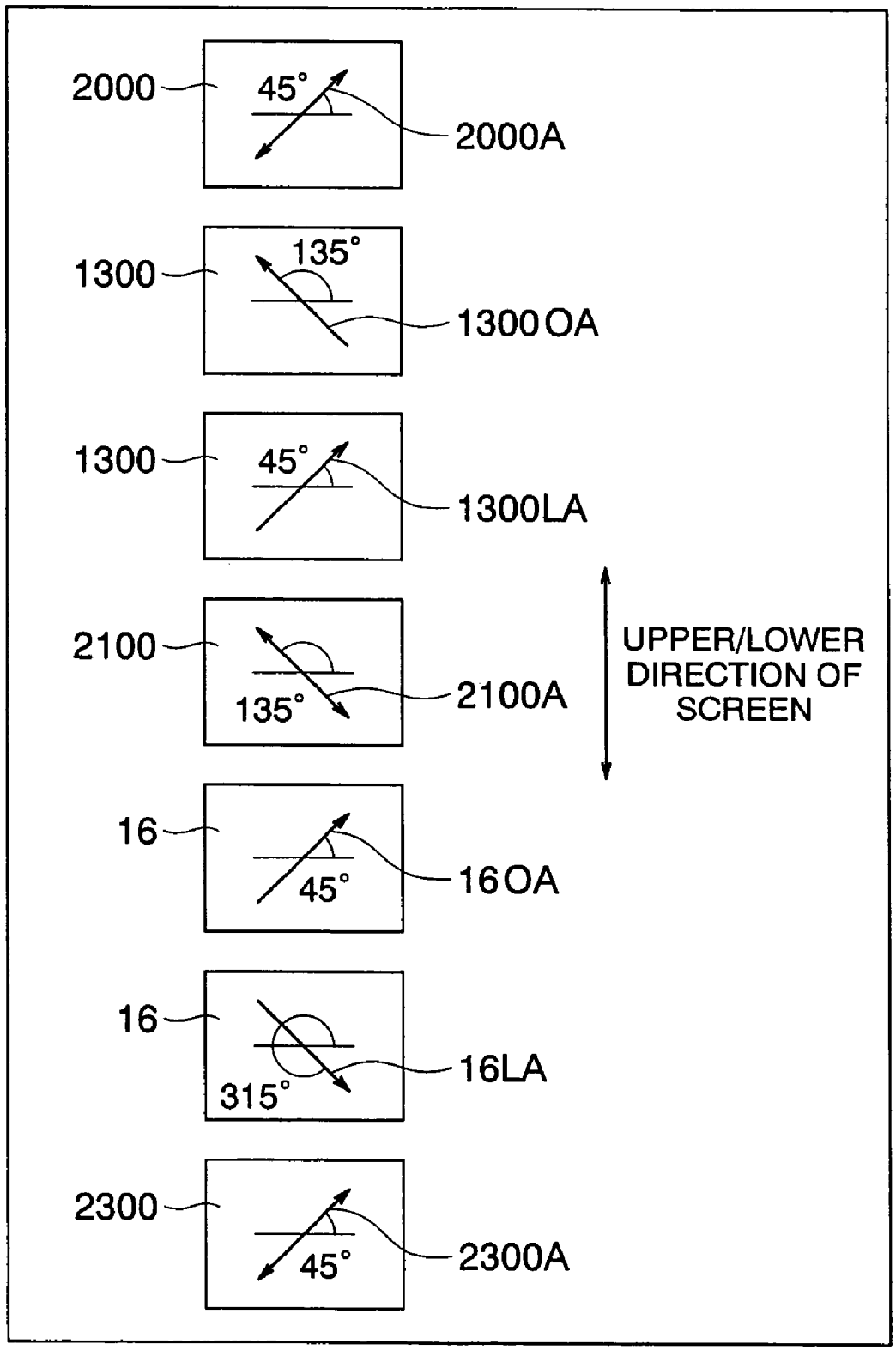
FIG. 36 is an explanatory diagram for explaining a relationship as to optical axes of an optical member related to a display device of the present invention.

Also, another display device may be realized. That is, in this display device, since the optical axis of the liquid crystal layer 16 of the view angle controlling element 36 is changed, when the screen is observed from a predetermined polar angle direction, brightness of a picture displayed on this screen can be switched at an azimuth angle corresponding to the right direction of this screen. For instance, as represented in FIG. 36, assuming now that an azimuth angle along a right-side direction of the screen is equal to 0 degree, when angles are defined along the counterclockwise direction, the absorption axis 2000A of the polarizing layer 310 of the first polarizing film 2000 corresponds to 45 degrees; the alignment axis 1300OA of the liquid crystal layer of the polarization condition switching means 1300 on the side of the first polarizing film 2000 corresponds to 135 degrees; another alignment axis 1300LA of the liquid crystal layer of the polarization condition switching means 1300 on the side of the second polarizing film 2100 corresponds to 45 degrees; and the absorption axis 2100A of the polarizing layer 300 of the second polarizing film 2100 corresponds to 135 degrees. Also, the alignment axis 16OA of the liquid crystal layer 16 of the crystal liquid display panel 10 on the second polarizing film 2100 corresponds to 45 degrees; another alignment axis 16LA of the liquid crystal layer 16 of the liquid crystal display panel 10 on the side of the third polarizing film 2300 corresponds to 315 degrees; and the absorption axis 2300A of the third polarizing film 2300 corresponds to 45 degrees.

In this case, such a display device may be realized in this display device, when the screen is observed from a right oblique direction, one condition that a bright picture can be observed, and another condition that a picture becomes dark and a sufficiently high visibility cannot be obtained can be switched in an arbitrary manner.

In the case that such a view angle characteristic is applied to a monitor mounted on a vehicle, if an automobile is equipped with a right-sided steering wheel, then the visibility on the driver's seat can be switched in response to a drive condition of this automobile. For example, while a automobile is stopped, a screen can be observed from both a driver's seat and a driver assistant's seat. On the other hand, although a picture can be observed from the driver assistant's seat while the automobile is driven, which is the same condition while the automobile is stopped, such a condition that the picture cannot be satisfactorily observed from the driver's seat can be realized.

In other words, in such a case that a picture of a TV, or a DVD is being displayed on a monitor mounted on an automobile, this picture can be observed by any viewers other than the driver, but this picture can be hardly observed by this driver. As a result, this display device can increase concentration power of this driver so as to conduct safty drive.

It should also be noted that in the display device of this embodiment 9, both the polarizing film for constituting the view angle controlling element 36 and the polarizing film for constituting the liquid crystal display panel 10 are realized by a single polarizing film. In this case, both the light which is effectively utilized in the view angle controlling element 36 and the light which is effectively utilized in the liquid crystal display panel 10 correspond to the same linearly polarized light, and a total number of the polarizing layers which cause the optical loss is decreased. As a result, such a display device capable of having a brighter representation can be realized. Otherwise, if the same bright representation is made, then such a display device operable under lower electric power can be realized.

It should also be understood that in the display device of this embodiment 9, the view angle controlling element 36 has been arranged on the front surface side of the liquid crystal display panel 10. In this case, when a semi-transparent reflection type display panel is applied as this liquid crystal display panel 10, such a display device may be realized by which the view angles may be switched not only in the transmission display mode, but also in the reflection display mode.

Also, such an explanation has been made that in the display device of this embodiment 9, the view angle controlling element 36 has been arranged on the front surface side of the liquid crystal display panel 10, but the present invention is not limited only thereto. That is to say, the view angle controlling element 36 may be alternatively arranged between the liquid crystal display device 10 and the illuminating device 20.

Emodiment 10

Figure 37:
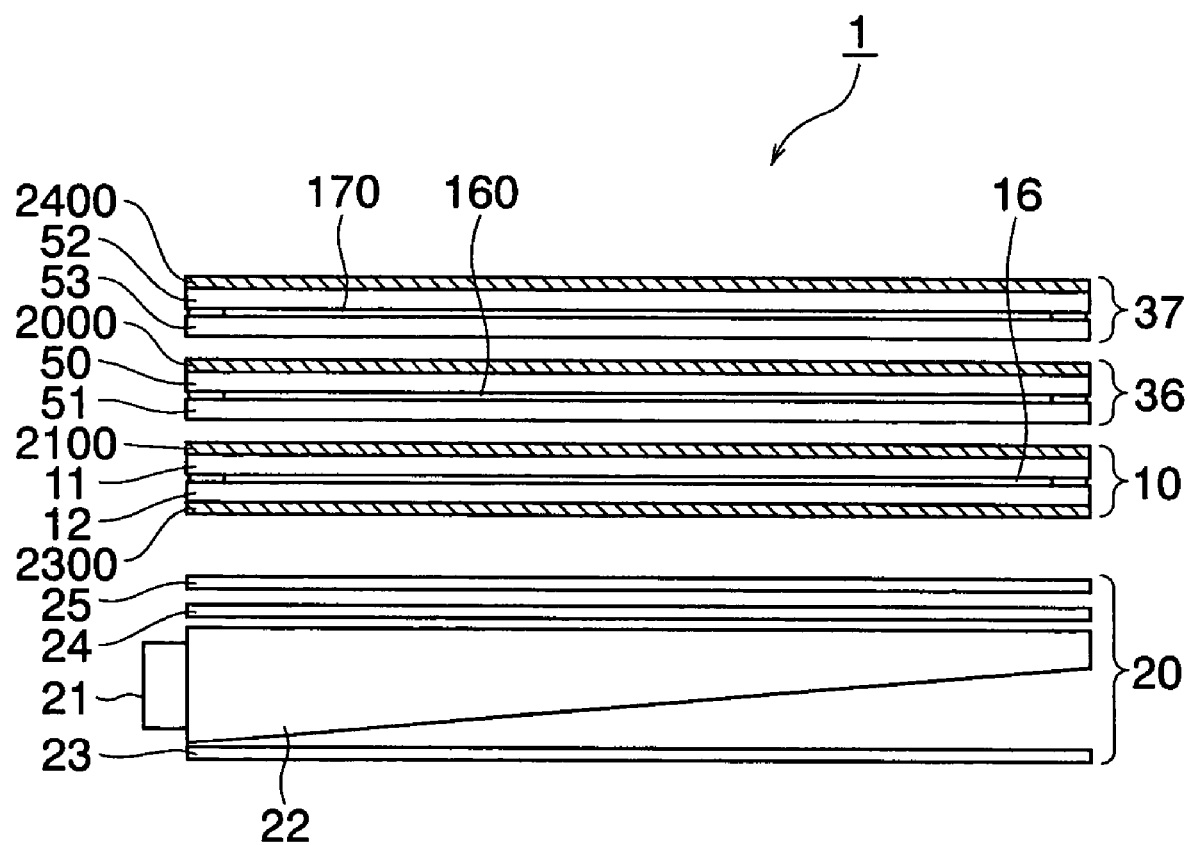
FIG. 37 is a schematic sectional view for describing a display device of the present invention.

Next, a description is made of a display device 1 according to another embodiment 10 of the present invention with reference to drawings. FIG. 37 is a sectional view for partially showing a schematic structure of the display device 1 according to the embodiment 10 of the present invention.

The display device 1 of this embodiment 10 is featured by additionally employing a view angle controlling element 37 on the front surface side of the display device explained in the previous embodiment 9. That is, the display device 1 of this embodiment 10 is constituted by a liquid crystal display panel 10, an illuminating device 20 arranged on a rear surface of this liquid crystal display panel 10, a view angle controlling element 36, and another view angle control element 37. This view angle controlling element 36 is arranged on the front surface side of the liquid crystal display panel 10. The view angle controlling element 37 is arranged on this front surface side of the liquid crystal display panel 10. As a consequence, the same reference numerals shown in the above-explained embodiment 9 will be employed as those for denoting the same structural members having the same functions in this embodiment 10, and detailed explanations thereof are omitted.

In the display device 1 of this embodiment 10, the liquid crystal display panel 10, the view angle controlling element 36, and the view angle controlling element 37 are arranged in this order from the side of the illuminating device 20.

The view angle controlling element 37 owns the same base structure as that of the view angle controlling element 36. That is, this view angle controlling element 37 is arranged by two sheets of transparent substrates 52 and 53 on which transparent electrodes and alignment films are formed; a liquid crystal layer 170 filled between these transparent substrates 52 and 53, and polarizing films which are arranged on the front surface side of the transparent substrate 52, and the rear surface side of the transparent substrate 53. It should be understood that both an alignment axis of the liquid crystal layer 170 for constituting the view angle controlling element 37, and an absorption axis of a polarizing layer of a polarizing film 2400 are different from those of the view angle controlling element 36.

Also, in this embodiment 10, the second polarizing film 2100 which constitutes the view angle controlling element 36 may also function as a polarizing film which is arranged on the front surface side of the liquid crystal display panel 10. The first polarizing film 2000 which constitutes the view angle controlling element 36 may also function as a polarizing film which is arranged on the rear surface side of the view angle controlling element 37.

In this embodiment 10, the first polarizing film 2000 is adhered to the transparent substrate 50 which constitutes the view angle controlling element 36 by an adhesive agent, and also, the second polarizing film 2100 is adhered to the transparent substrate 11 which constitutes the liquid crystal display panel 10 by an adhesive agent. Also, a third polarizing film 2300 is adhered to the transparent substrate 12 for constructing the liquid crystal display panel 10 by using an adhesive agent, and the polarizing film 2400 is adhered to the transparent substrate 52 which constitutes the view angle controlling element 37 by an adhesive agent. However, the present invention is not limited to the transparent substrates to which these polarizing films are adhered.

Figure 38:
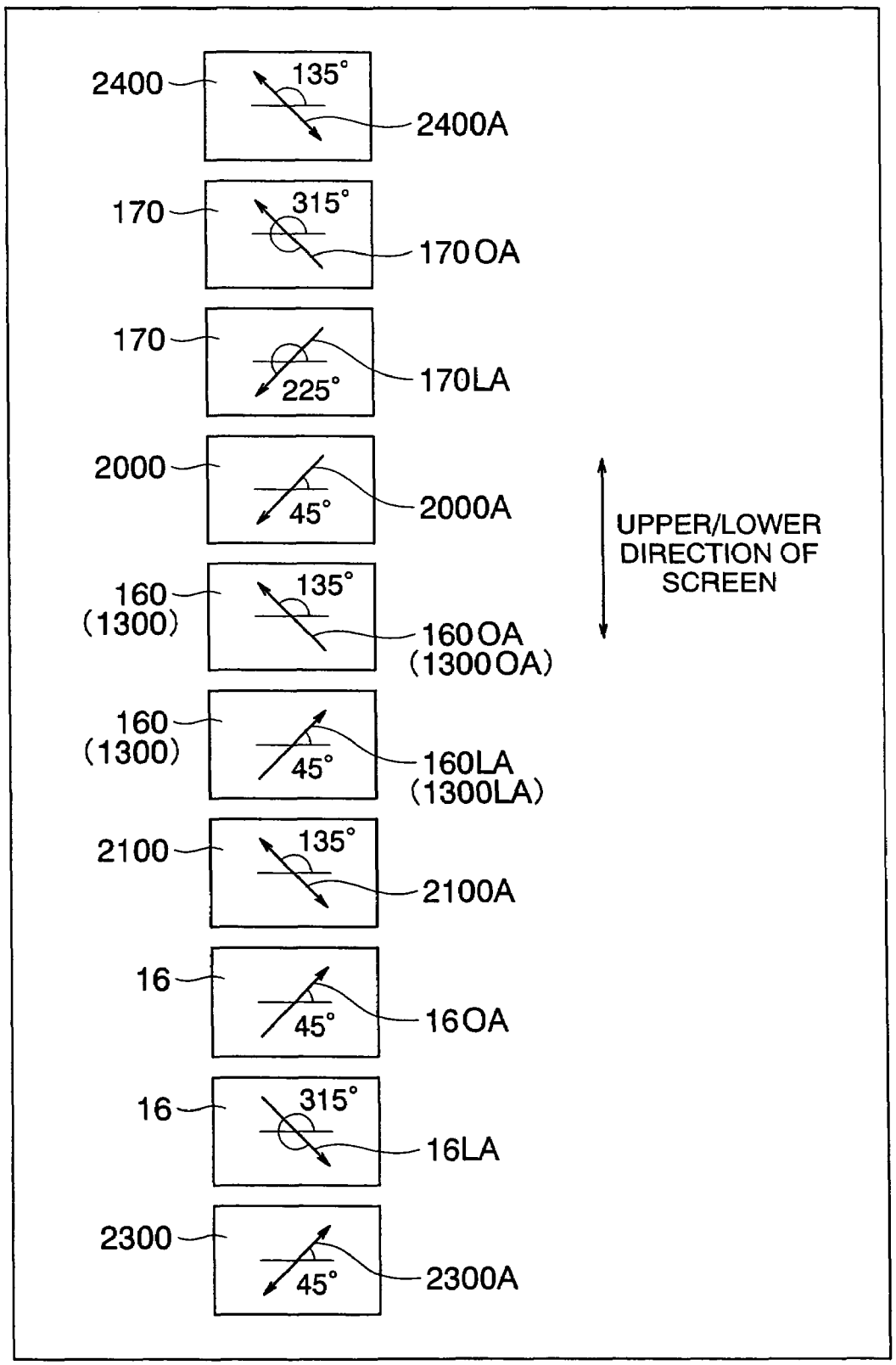
FIG. 38 is an explanatory diagram for explaining a relationship as to optical axes of an optical member related to a display device of the present invention.

FIG. 38 is a diagram for representing one example as to optical axes such as absorption axes of polarizers, an alignment axis of the liquid crystal layer of the liquid crystal display panel, and alignment axes of the liquid crystal layers of the view angle controlling elements related to the display device 1 of this embodiment 10.

As shown in FIG. 38, in the display device 1 of this embodiment 10, absorption axes of the polarizing films for both the liquid crystal display panel 10 and the view angle controlling element 36 are the same as those of the above-explained embodiment 9 with reference to FIG. 36. Also, an alignment axis 170LA of the liquid crystal layer 170 of the view angle controlling element 37 on the side of the first polarizing film 2000 is set to 225 degrees, and an alignment axis 170OA of this liquid crystal layer 170 on the side of the polarizing film 2400 is set to 315 degrees. Also, an absorption axis 2400A of the polarizing layer of the polarizing film 2400 is set to 135 degrees.

It should also be understood that in FIG. 38, the expressions as to symbols of the alignment axes of the liquid crystal layers of the view angle controlling element 36 are different from those of FIG. 36, namely, the alignment axis of the liquid crystal layer 160 on the side of the first polarizing film 2000 is expressed as 160OA whereas the alignment axis 160LA of the liquid crystal layer 160 on the side of the second polarizing film 2100 is expressed as 160LA. These symbols indicate the same symbols shown in FIG. 36, namely, the alignment axis 130OA of the liquid crystal layer of the polarization condition switching means 1300 which constitutes the view angle controlling element 36 on the side of the first polarizing film 2000, and the alignment axis 130LA thereof on the side of the second polarizing film 2100.

In this case, such a light which has been emitted from the illuminating device 20 and has passed through the third polarizing film 2300 for constituting the liquid crystal display panel 10, penetrates through the liquid crystal layer 160, and then, is entered into the second polarizing film 2100. In this case, since such a voltage corresponding to picture information supplied from a picture information generating unit (not shown) is applied to the liquid crystal layer 16, the polarization condition of the light which passes through the liquid crystal layer 16 is controlled, and an amount of light which passes through the second polarizing film 2100 is adjusted, so that desirable picture light can be produced.

The light which has passed through the second polarizing film 2100 penetrates through the liquid crystal layer 160 which constitutes the view angle controlling element 36, and then, is entered into the first polarizing film 2000.

When a drive voltage is not applied to the liquid crystal layer 160 of the view angle control element 36, polarized planes of major light components of the light which has passed through the second polarizing film 2100 and has penetrated through the liquid crystal layer 160 are rotated by an angle of 90 degrees, and penetrates through the first polarizing film 2000. As a result, high transmittance may be achieved over a wide view angle range.

On the other hand, when a drive voltage is applied to the liquid crystal layer 160 of the view angle controlling element 36, among the light which has passed through the second polarizing film 2100 and has penetrated through the liquid crystal layer 160, such a light which is traveled in a predetermined azimuth angle and along a predetermined polar angle direction where an effective phase difference of the liquid crystal layer 160 becomes 0, or nearly equal to 0, is absorbed by the first polarizing film 2000.

That is to say, such a display device 1 can be realized by which in such a case that the drive voltage is not applied to the liquid crystal layer 160, the wide view angle can be obtained, whereas when the drive voltage is applied to the liquid crystal layer 160, the picture light can be darkened in the predetermined azimuth angle and the predetermined polar angle direction. In this embodiment 10, such a display device 1 can be realized by the view angle controlling element 36 in which at the azimuth angle corresponding to the right direction of the screen, when the screen is observed along a predetermined polar angle direction, brightness of a picture can be switched.

The light which has passed through the first polarizing film 2000 penetrates through the liquid crystal layer 170 which constitutes the view angle controlling element 37, and then, is entered into the polarizing film 2400. When a drive voltage is not applied to the liquid crystal layer 170 of the view angle control element 37, polarized planes of major light components of the light which has passed through the first polarizing film 2000 and has penetrated through the liquid crystal layer 170 are rotated by an angle of 90 degrees, and penetrates through the polarizing film 2400. As a result, high transmittance may be achieved over a wide view angle range.

On the other hand, when a drive voltage is applied to the liquid crystal layer 170 of the view angle controlling element 37, among the light which has passed through the first polarizing film 2000 and has penetrated through the liquid crystal layer 170, such a light which is traveled in a predetermined azimuth angle and along a predetermined polar angle direction where an effective phase difference of the liquid crystal layer 170 becomes 0, or nearly equal to 0, is absorbed by the polarizing film 2400.

That is to say, such a display device 1 can be realized by which in such a case that the drive voltage is not applied to the liquid crystal layer 170, the wide view angle can be obtained, whereas when the drive voltage is applied to the liquid crystal layer 170, the picture light can be darkened in the predetermined azimuth angle and the predetermined polar angle direction. In this embodiment 10, such a display device 1 can be realized by the view angle controlling element 37 in which at the azimuth angle corresponding to the left direction of the screen, when the screen is observed along a predetermined polar angle direction, brightness of a picture can be switched.

As previously explained, in accordance with the embodiment 10, such a display device 1 can be realized by which when the screen is observed from the predetermined polar angle in such an azimuth angle which corresponds to either the right direction or the left direction, otherwise, both the right direction and the left direction, the brightness of the picture can be switched.

In other words, such a display device can be realized by which when only the view angle controlling element 36 is driven, the brightness of the picture along the predetermined polar angle can be switched at the azimuth angle which corresponds to the right direction of the screen. Also, such a display device can be realized by which when only the view angle controlling element 37 is driven, the brightness of the picture along the predetermined polar angle can be switched at the azimuth angle which corresponds to the left direction of the screen. Furthermore, such a display device can be realized by which when both the view angle controlling element 36 and the view angle controlling element 37 are simultaneously driven, the brightness of the picture along the predetermined polar angle can be switched at the azimuth angles which correspond to the right direction of the screen and also the left direction thereof.

As previously explained, in the display device 1 of this embodiment 10, when the screen is observed along the oblique direction, brightness of the picture along the right/left direction of the screen is arbitrarily darken, so that visibility can be deteriorated. In such a case that such a view angle characteristic is applied to display devices of portable appliances such as a portable telephone, a notebook PC, and a PDA, and also to display devices of public-use appliances such as an ATM, this view angle characteristic may achieve an effect capable of avoiding peeping actions along a lateral direction.

More specifically, in the display device 1 of this embodiment 10, the brightness of the picture along the predetermined polar angle direction can be independently controlled along both the left direction and the right direction of the screen. As a consequence, for instance, the screen is set to a bright condition with respect to a person located on a left side of the own operator, so that visibility can be improved and both the own operator and this left-sided person can observe this screen, whereas any persons cannot peep on this screen from the right direction.

It should also be understood that in the display device of this embodiment 10, both the polarizing films for constituting the view angle controlling elements 36, 37 and the polarizing film for constituting the liquid crystal display panel 10 are realized by a single polarizing film. In this case, both the light which is effectively utilized in the view angle controlling element 36, or 37 and the light which is effectively utilized in the liquid crystal display panel 10 correspond to the same linearly polarized light, and a total number of the polarizing layers which cause the optical loss is decreased. As a result, such a display device capable of having a brighter representation can be realized. Otherwise, if the same bright representation is made, then such a display device operable under lower electric power can be realized.

It should also be understood that in the display device 1 of this embodiment 10, the view angle controlling element 36 and the view angle controlling element 37 have been arranged on the front surface side of the liquid crystal display panel 10. In this case, when a semi-transparent reflection type display panel is applied as this liquid crystal display panel 10, such a display device may be realized by which the view angles may be switched not only in the transmission display mode, but also in the reflection display mode.

Emodiment 11

Figure 39:
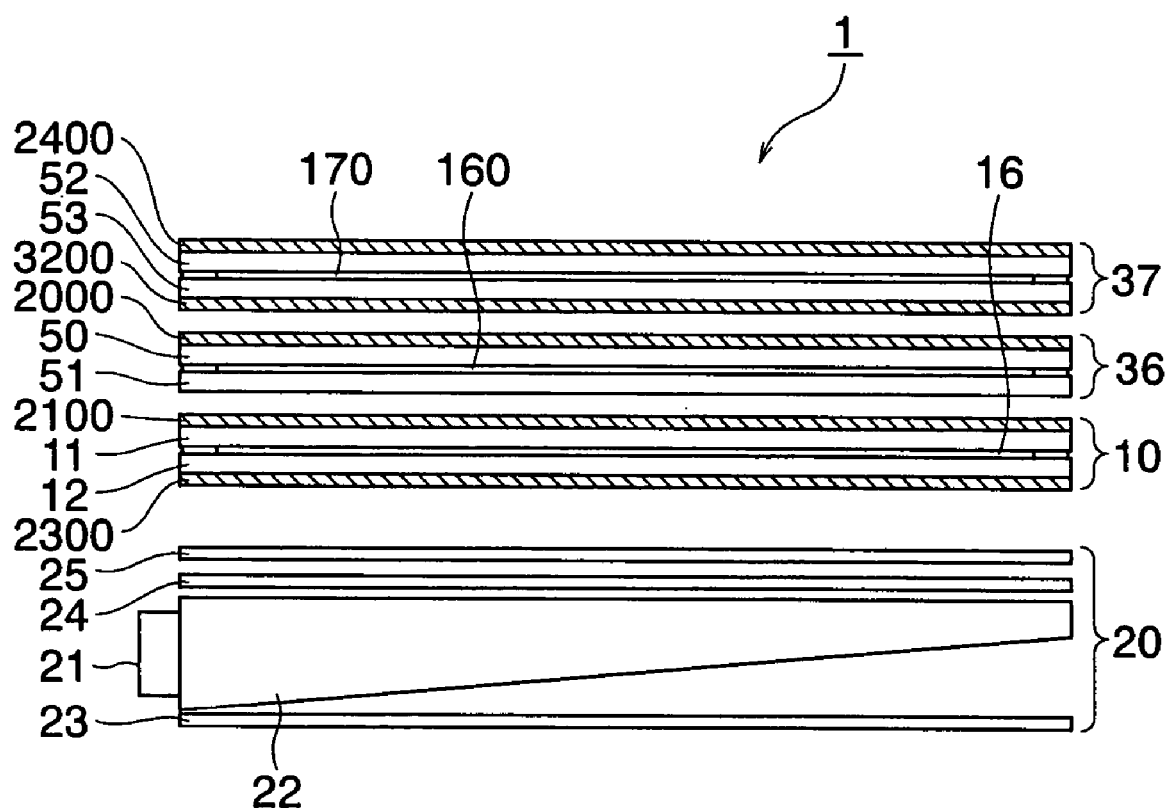
FIG. 39 is a schematic sectional view for describing a display device of the present invention.

Next, a description is made of a display device 1 according to another embodiment 11 of the present invention. FIG. 39 is a sectional view for partially showing a schematic structure of the display device 1 according to the embodiment 11 of the present invention.

This display device is constituted by newly arranging a reflection type polarizing film 3200 between the transparent substrate 53 for constructing the view angle controlling element 37 and the first polarizing film 2000 in the display device 1 explained in the previous embodiment 10. As a consequence, the same reference numerals shown in the above-explained embodiment 10 will be employed as those for denoting the same structural members having the same functions in this embodiment 11, and detailed explanations thereof are omitted.

As the reflection type polarizing film 3200, such a reflection type polarizing film capable of separating linearly polarized light components which are intersected to each other at a right angle by way of a reflecting function and a transmitting function is employed.

As such a reflection type polarizing film, a birefringence reflection type polarization film formed by stacking polymer films having different birefringence characteristics on each other in plural layers may be employed, which is disclosed in, for example, WO95/27919; such an optical member manufactured by arranging phase difference films on both a front surface and a rear surface of a cholestic liquid crystal film may be employed; a dielectric multilayer film manufactured by stacking dielectric materials having different refractive indexes on each other may be used; or a polarization filter made by a metal wire grid may be employed.

In the case of this birefringence reflection type polarization film, such a film has been marketed in the product name of "DBEF" from 3M Company, while this "DBEF" film transmits therethrough a predetermined polarized light component within light entered into this film, and reflects a linearly polarized light component whose polarization axis is intersected with the first-mentioned linearly polarized light component at a right angle. Thus, this DBEF film may be used as the reflection type polarizing film.

As to the polarization filter made by the metal wire grid, metal line-shaped patterns having electric conductivities such as silver, aluminium, and chrome are formed on a transparent base member in a pitch of approximately 1500 Angstrom. If the transparent base member is a flat plate, then a flat plate type of reflection type polarizing film may be realized.

In this embodiment 11, the reflection type polarizing film 3200 is adhered to the transparent substrate 53 for constituting the view angle controlling element 37 by an adhesive agent. However, the present invention does not limit such a transparent substrate to which a polarizing film is adhered.

Figure 40:
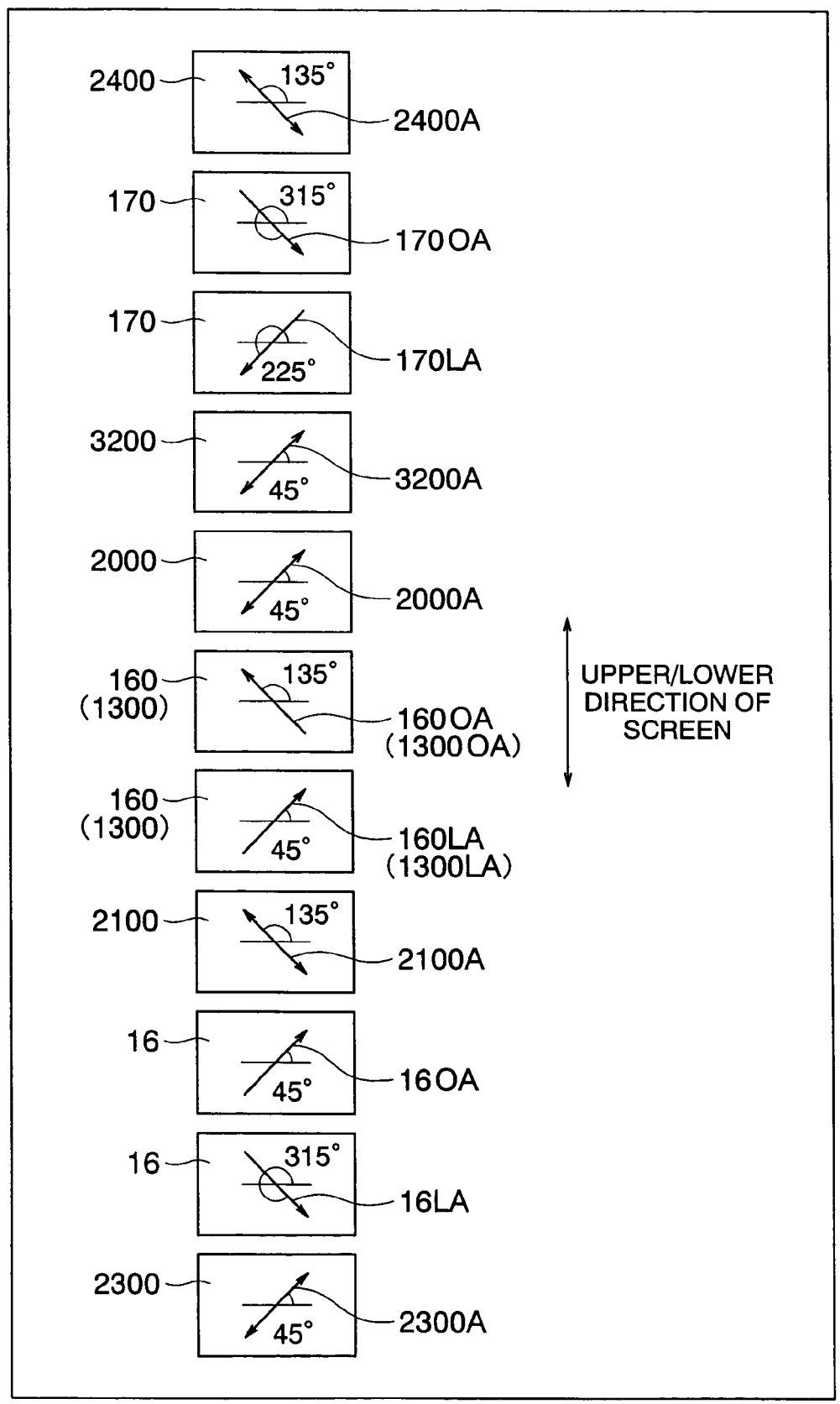
FIG. 40 is an explanatory diagram for explaining a relationship as to optical axes of an optical member related to a display device of the present invention.

FIG. 40 is a diagram for explaining a relationship as to optical axes such as absorption axes of polarizing films, a reflection axis of a reflection type polarizing film, an alignment axis of a liquid crystal layer of a liquid crystal display panel, and an alignment axis of a liquid crystal layer of the polarization condition switching means related to the display device 1 of this embodiment 11.

As shown in FIG. 40, it is so assumed that in the display device of this embodiment 11, absorption axes of polarizing films and alignment axes of liquid crystal layers as to the liquid crystal display panel 10, the view angle controlling element 36, and the view angle controlling element 37 are the same as those of the above-described embodiment 10 explained with reference to FIG. 38. Also, it is so assumed that a reflection axis of the reflection type polarizing film 3200 corresponds to 45 degrees.

Similar to the above-described embodiment 10, also, in this case, such a display device 1 can be realized by which when the screen is observed from the predetermined polar angle in such an azimuth angle which corresponds to either the right direction or the left direction, otherwise, both the right direction and the left direction, the brightness of the picture can be switched.

In other words, such a display device can be realized by which when only the view angle controlling element 36 is driven, the brightness of the picture along the predetermined polar angle can be switched at the azimuth angle which corresponds to the right direction of the screen. Also, such a display device can be realized by which when only the view angle controlling element 37 is driven, the brightness of the picture along the predetermined polar angle can be switched at the azimuth angle which corresponds to the left direction of the screen. Furthermore, such a display device can be realized by which when both the view angle controlling element 36 and the view angle controlling element 37 are simultaneously driven, the brightness of the picture along the predetermined polar angle can be switched at the azimuth angles which correspond to the right direction of the screen and also the left direction thereof.

More specifically, in the display device of this embodiment 11, when such a drive voltage higher than, or equal to 3 V, more preferably, higher than, or equal to 5 V is applied to the liquid crystal layer 170 of the view angle controlling element 37, externally supplied light is reflected on the reflection type polarizing film 3200, so that a mirror-like condition can be realized.

In other words, it is possible to realize such a display device capable of switching a condition under which a wide view angle is realized; another condition under which the screen is darkened in a predetermined azimuth angle and a predetermined polar angle direction, and thus, visibility is deteriorated; and a mirror-like condition.

In the case that the screen is brought into such a mirror-like condition, it is desirable that the illuminating device 20 is turned OFF in order not to display a picture on the liquid crystal display panel 10. This operation is performed so as to reduce the power consumption of the display device 1 by avoiding that unnecessary power is consumed in the illuminating device 20 and the liquid crystal display panel 10 when the screen is brought into such a mirror-like condition.

It should be understood that the first polarizing film 2000 may be omitted in the display device 1 of this embodiment 11. In this case, a total number of the polarizing layers which cause the optical loss is decreased. As a result, such a display device capable of having a brighter representation can be realized. Otherwise, if the same bright representation is made, then such a display device operable under lower electric power can be realized.

It should also be understood that generally speaking, the polarization degree of the reflection type polarizing film 3200 is low in an actual condition. As a result, when the first polarizing film 2000 is omitted, there is such a risk that a minimum value of transmittance which is realized in the predetermined azimuth angle and the predetermined polar angle direction for controlling the brightness by the view angle controlling element 36 may become higher than that achieved in the case that the display device is equipped with the first polarizing film 2000.

Under such a circumstance, a condition as to whether or not the first polarizing film 2000 is required may be properly selected based upon a required characteristic.

Embodiment 12

Figure 41:
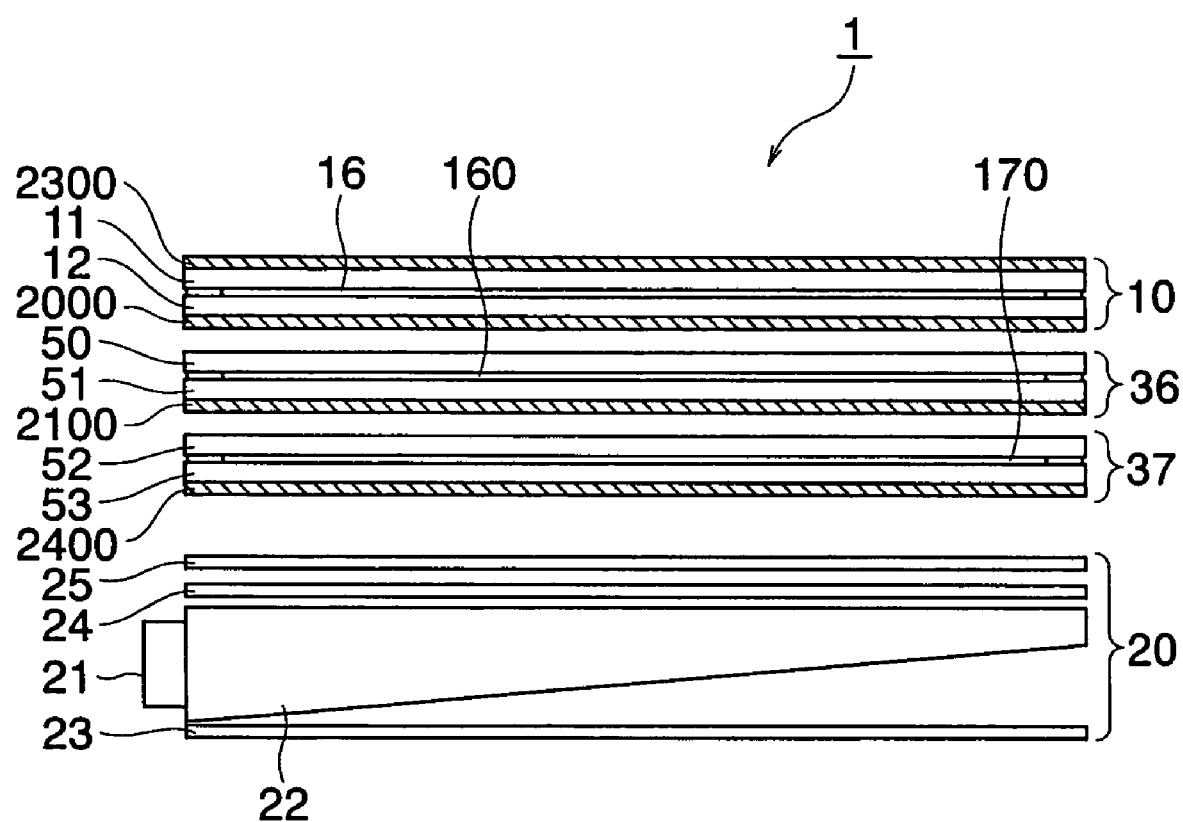
FIG. 41 is a schematic sectional view for describing a display device of the present invention.

Next, a description is made of a display device 1 according to another embodiment 12 of the present invention with reference to drawings. FIG. 41 is a sectional view for partially showing a schematic structure of the display device 1 according to the embodiment 12 of the present invention.

The display device 1 of this embodiment 12 is featured by changing a positional relationship among the view angle controlling elements 36 and 37, and also, the liquid crystal display panel 10 in the display device explained in the previous embodiment 10. As a consequence, the same reference numerals shown in the above-explained embodiment 10 will be employed as those for denoting the same structural members having the same functions in this embodiment 12, and detailed explanations thereof are omitted.

In the display device 1 of this embodiment 12, the view angle controlling element 37, the view angle controlling element 36, and the liquid crystal display panel 10 are arranged in this order from the side of the illuminating device 20.

The polarizing film 2400 is arranged on the rear plane side of the view angle controlling element 37, and the second polarizing film 2100 for constituting the view angle controlling element 36 may function as a polarizing film provided on the front surface side of the view angle controlling element 37. Also, the first polarizing film 2000 for constituting the view angle controlling element 36 may function as a polarizing film arranged on the rear surface side of the liquid crystal display panel 10, and the third polarizing film 2300 is arranged on the front surface side of the liquid crystal display panel 10.

In this embodiment 12, the first polarizing film 2000 is adhered to the transparent substrate 12 which constitutes the liquid crystal display panel 10 by an adhesive agent, and also, the second polarizing film 2100 is adhered to the transparent substrate 51 which constitutes the view angle controlling element 36 by an adhesive agent. Also, a third polarizing film 2300 is adhered to the transparent substrate 11 for constructing the liquid crystal display panel 10 by using an adhesive agent, and the polarizing film 2400 is adhered to the transparent substrate 53 which constitutes the view angle controlling element 37 by an adhesive agent. However, the present invention is not limited to the transparent substrates to which these polarizing films are adhered.

Figure 42:
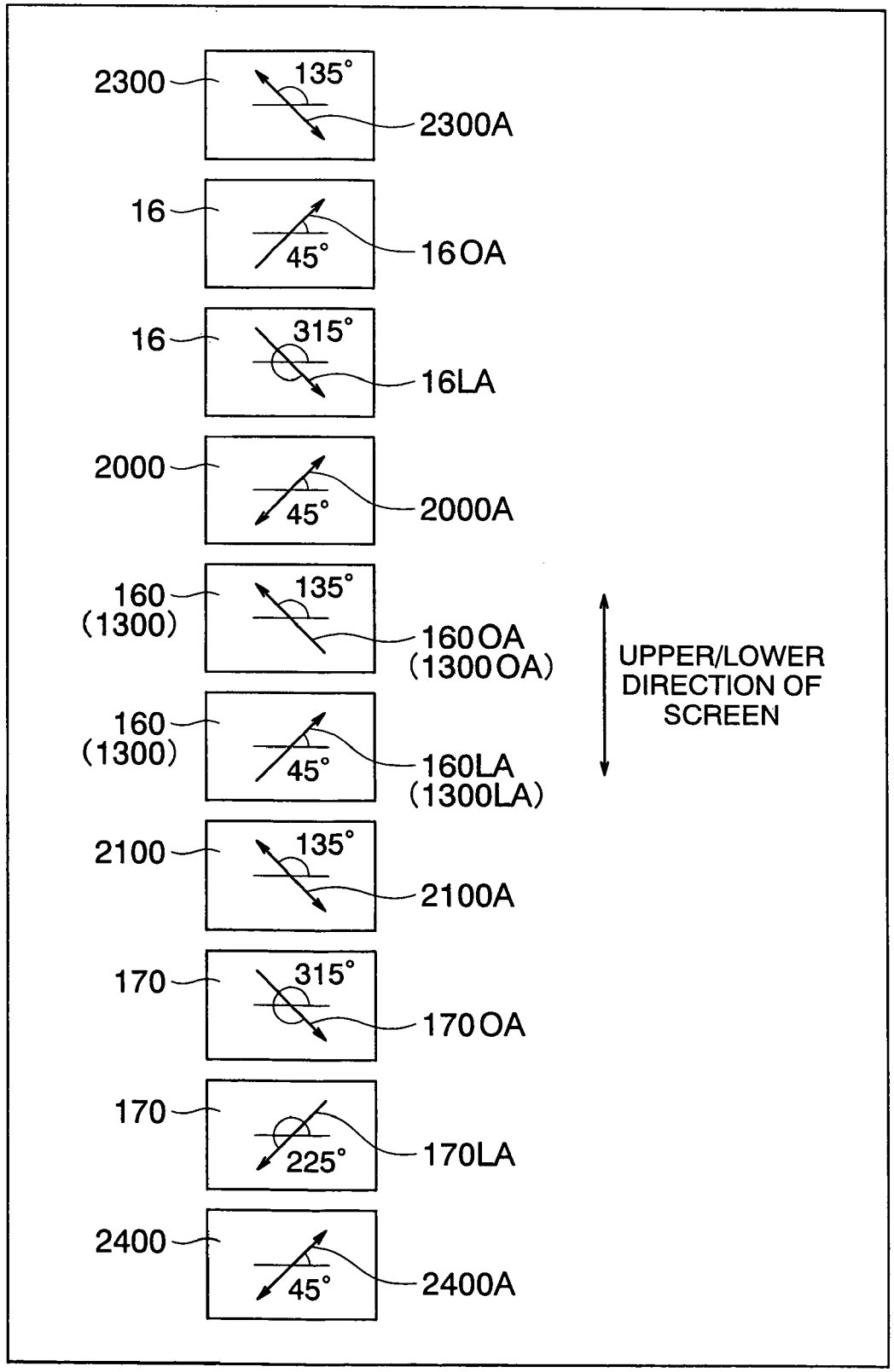
FIG. 42 is an explanatory diagram for explaining a relationship as to optical axes of an optical member related to a display device of the present invention.

FIG. 42 is a diagram for representing one example as to optical axes such as absorption axes of polarizers, an alignment axis of the liquid crystal layer of the liquid crystal display panel 10, and alignment axes of the liquid crystal layers of the view angle controlling elements 36 and 37 related to the display device 1 of this embodiment 12.

As shown in FIG. 42, in the display device 1 of this embodiment 12, it is so arranged that an absorption axis 2400A of the polarizing layer of the polarizing film 2400 corresponds to 45 degrees; and an alignment axis 170LA of the liquid crystal layer 170 of the view angle controlling element 37 on the side of the polarizing film 2400 corresponds to 225 degrees, and an alignment axis 170OA thereof on the side of the second polarizing film 2100 corresponds to 315 degrees. Also, an absorption axis 2100A of the polarizing layer of the second polarizing film 2100 corresponds to 135 degrees; and an alignment axis 160LA of the liquid crystal layer 160 of the view angle controlling element 36 on the side of the second polarizing film 2100 corresponds to 45 degrees, and an alignment axis 160OA thereof on the side of the first polarizing film 2000 corresponds to 135 degrees. Also, an absorption axis 2000A of the polarizing layer of the first polarizing film 2000 corresponds to 45 degrees; and an alignment axis 16LA of the liquid crystal layer 16 of the liquid crystal display panel 10 on the side of the first polarizing film 2000 corresponds to 315 degrees, and an alignment axis 16OA thereof on the side of the third polarizing film 2300 corresponds to 45 degrees.

Also, an absorption axis 2300A of the polarizing layer of the third polarizing film 2300 corresponds to 135 degrees.

In this case, such a light which has been emitted from the illuminating device 20 and has passed through the polarizing film 2400 for constituting the view angle controlling element 37, penetrates through the liquid crystal layer 170, and then, is entered into the second polarizing film 2100. When a drive voltage is not applied to the liquid crystal layer 170 of the view angle control element 37, polarized planes of major light components of the light which has passed through the polarizing film 2400 and has penetrated through the liquid crystal layer 170 are rotated by an angle of 90 degrees, and penetrates through the second polarizing film 2100. As a result, high transmittance may be achieved over a wide view angle range.

On the other hand, when a drive voltage is applied to the liquid crystal layer 170 of the view angle controlling element 37, among the light which has passed through the polarizing film 2400 and has penetrated through the liquid crystal layer 170, such a light which is traveled in a predetermined azimuth angle and along a predetermined polar angle direction where an effective phase difference of the liquid crystal layer 170 becomes 0, or nearly equal to 0, is absorbed by the second polarizing film 2100.

That is to say, such a display device 1 can be realized by which in such a case that the drive voltage is not applied to the liquid crystal layer 170, the bright illumination light can be obtained in a wide view angle range, whereas when the drive voltage is applied to the liquid crystal layer 170, the illumination light from the illuminating device 20 is darkened in the predetermined azimuth angle and the predetermined polar angle direction. In this embodiment 12, the brightness of the illuminating light directed to the predetermined polar angle direction at such an azimuth angle corresponding to the left direction can be switched by the view angle controlling element 37.

Next, the light which has passed through the second polarizing film 2100 penetrates through the liquid crystal layer 160 which constitutes the view angle controlling element 36, and then, is entered into the first polarizing film 2000.

When a drive voltage is not applied to the liquid crystal layer 160 of the view angle control element 36, polarized planes of major light components of the light which has passed through the second polarizing film 2100 and has penetrated through the liquid crystal layer 160 are rotated by an angle of 90 degrees, and penetrates through the first polarizing film 2000. As a result, high transmittance may be achieved over a wide view angle range.

On the other hand, when a drive voltage is applied to the liquid crystal layer 160 of the view angle controlling element 36, among the light which has passed through the second polarizing film 2100 and has penetrated through the liquid crystal layer 160, such a light which is traveled in a predetermined azimuth angle and along a predetermined polar angle direction where an effective phase difference of the liquid crystal layer 160 becomes 0, or nearly equal to 0, is absorbed by the first polarizing film 2000.

That is to say, such a display device 1 can be realized by which in such a case that the drive voltage is not applied to the liquid crystal layer 160, the bright illumination light can be obtained in a wide view angle range, whereas when the drive voltage is applied to the liquid crystal layer 160, the illumination layer from the illuminating device 20 is darkened in the predetermined azimuth angle and the predetermined polar angle direction. In this embodiment 12, the brightness of the illumination light directed to the predetermined polar angle direction at such an azimuth angle corresponding to the left direction can be switched by the view angle controlling element 36.

Such a light which passes through the first polarizing film 2000 penetrates through the liquid crystal layer 16 for constituting the liquid crystal display panel 10, and then, is entered to the third polarizing film 2300. In this case, since such a voltage corresponding to picture information supplied from a picture information generating unit (not shown) is applied to the liquid crystal layer 16, the polarization condition of the light which passes through the liquid crystal layer 16 is controlled, and an amount of light which passes through the third polarizing film 2300 is adjusted, so that desirable picture light can be produced.

As a consequence, such a display device can be realized by which when only the view angle controlling element 36 is driven, the brightness of the picture along the predetermined polar angle can be switched at the azimuth angle which corresponds to the right direction of the screen. Also, such a display device can be realized by which when only the view angle controlling element 37 is driven, the brightness of the picture along the predetermined polar angle can be switched at the azimuth angle which corresponds to the left direction of the screen. Furthermore, such a display device can be realized by which when both the view angle controlling element 36 and the view angle controlling element 37 are simultaneously driven, the brightness of the picture along the predetermined polar angle can be switched at the azimuth angles which correspond to the right direction of the screen and also the left direction thereof.

As previously explained, in the display device 1 of this embodiment 12, when the screen is observed along the oblique direction, brightness of the picture along the right/left direction of the screen is arbitrarily darken, so that visibility can be deteriorated. In such a case that such a view angle characteristic is applied to display devices of portable appliances such as a portable telephone, a notebook PC, and a PDA, and also to display devices of public-use appliances such as an ATM, this view angle characteristic may achieve an effect capable of avoiding peeping actions along a lateral direction.

More specifically, in the display device 1 of this embodiment 12, the brightness of the picture along the predetermined polar angle direction can be independently controlled along both the left direction and the right direction of the screen. As a consequence, for instance, the screen is set to a bright condition with respect to a person located on a left side of the own operator, so that visibility can be improved and both the own operator and this left-sided person can observe this screen, whereas any persons cannot peep on this screen from the left direction.

It should also be understood that in the display device of this embodiment 12, both the polarizing films for constituting the view angle controlling elements 36, 37 and the polarizing film for constituting the liquid crystal display panel 10 are realized by a single polarizing film. In this case, both the light which is effectively utilized in the view angle controlling element 36, or 37 and the light which is effectively utilized in the liquid crystal display panel 10 correspond to the same linearly polarized light, and a total number of the polarizing layers which cause the optical loss is decreased. As a result, such a display device capable of having a brighter representation can be realized. Otherwise, if the same bright representation is made, then such a display device operable under lower electric power can be realized.

It should also be understood that in the display device 1 of this embodiment 12, the view angle controlling element 36 and the view angle controlling element 37 have been arranged on the rear surface side of the liquid crystal display panel 10. In this case, when a semi-transparent reflection type display panel is applied as this liquid crystal display panel 10, such a display device may be realized by which a brighter representation can be obtained in the reflection display mode since there is no an optical member for losing the light on the front surface side of the liquid crystal display panel 10. Also, since the liquid crystal display panel 10 is arranged on the front-most surface of the display device 1, such a display device can be realized by which a position for displaying thereon a picture extends back a shorter way.

Emodiment 13

Figure 43:
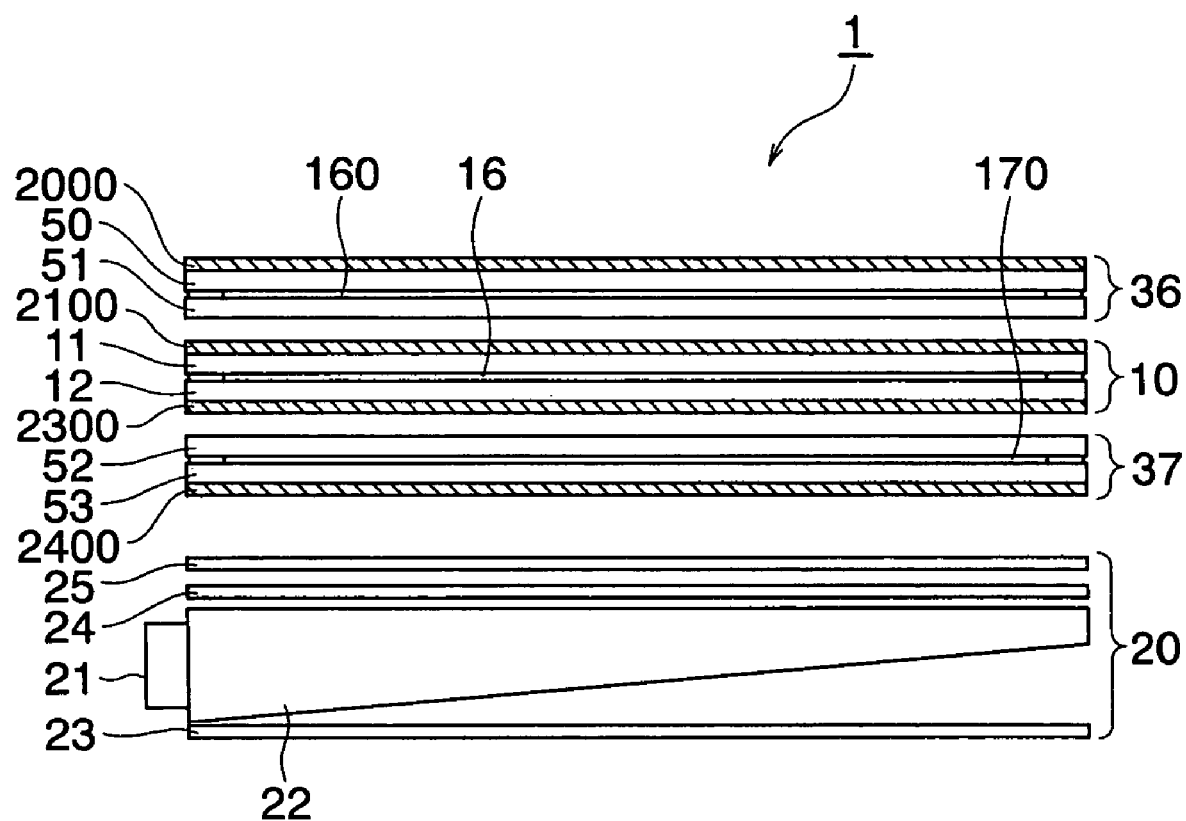
FIG. 43 is a schematic sectional view for describing a display device of the present invention.

Next, a description is made of a display device 1 according to another embodiment 13 of the present invention with reference to drawings. FIG. 43 is a sectional view for partially showing a schematic structure of the display device 1 according to the embodiment 13 of the present invention.

The display device 1 of this embodiment 13 is featured by changing a positional relationship among the view angle controlling elements 36 and 37, and also, the liquid crystal display panel 10. As a consequence, the same reference numerals shown in the above-explained embodiment 10 will be employed as those for denoting the same structural members having the same functions in this embodiment 13, and detailed explanations thereof are omitted.

In the display device 1 of this embodiment 13, the view angle controlling element 37, the liquid crystal display panel 10 and the view angle controlling element 36 are arranged in this order from the side of the illuminating device 20.

The polarizing film 2400 is arranged on the rear plane side of the view angle controlling element 37, and the third polarizing film 2300 for constituting the liquid crystal display panel 10 may function as a polarizing film provided on the front surface side of the view angle controlling element 37. Also, the second polarizing film 2100 for constituting the view angle controlling element 36 may function as a polarizing film arranged on the front surface side of the view angle controlling element 36, and the first polarizing film 2000 is arranged on the front surface side of the view angle controlling element 36.

In this embodiment 13, the first polarizing film 2000 is adhered to the transparent substrate 50 which constitutes the view angle controlling element 36 by an adhesive agent, and also, the second polarizing film 2100 is adhered to the transparent substrate 11 which constitutes the liquid crystal display panel 10 by an adhesive agent. Also, the third polarizing film 2300 is adhered to the transparent substrate 12 for constructing the liquid crystal display panel 10 by using an adhesive agent, and the polarizing film 2400 is adhered to the transparent substrate 53 which constitutes the view angle controlling element 37 by an adhesive agent. However, the present invention is not limited to the transparent substrates to which these polarizing films are adhered.

Figure 44:
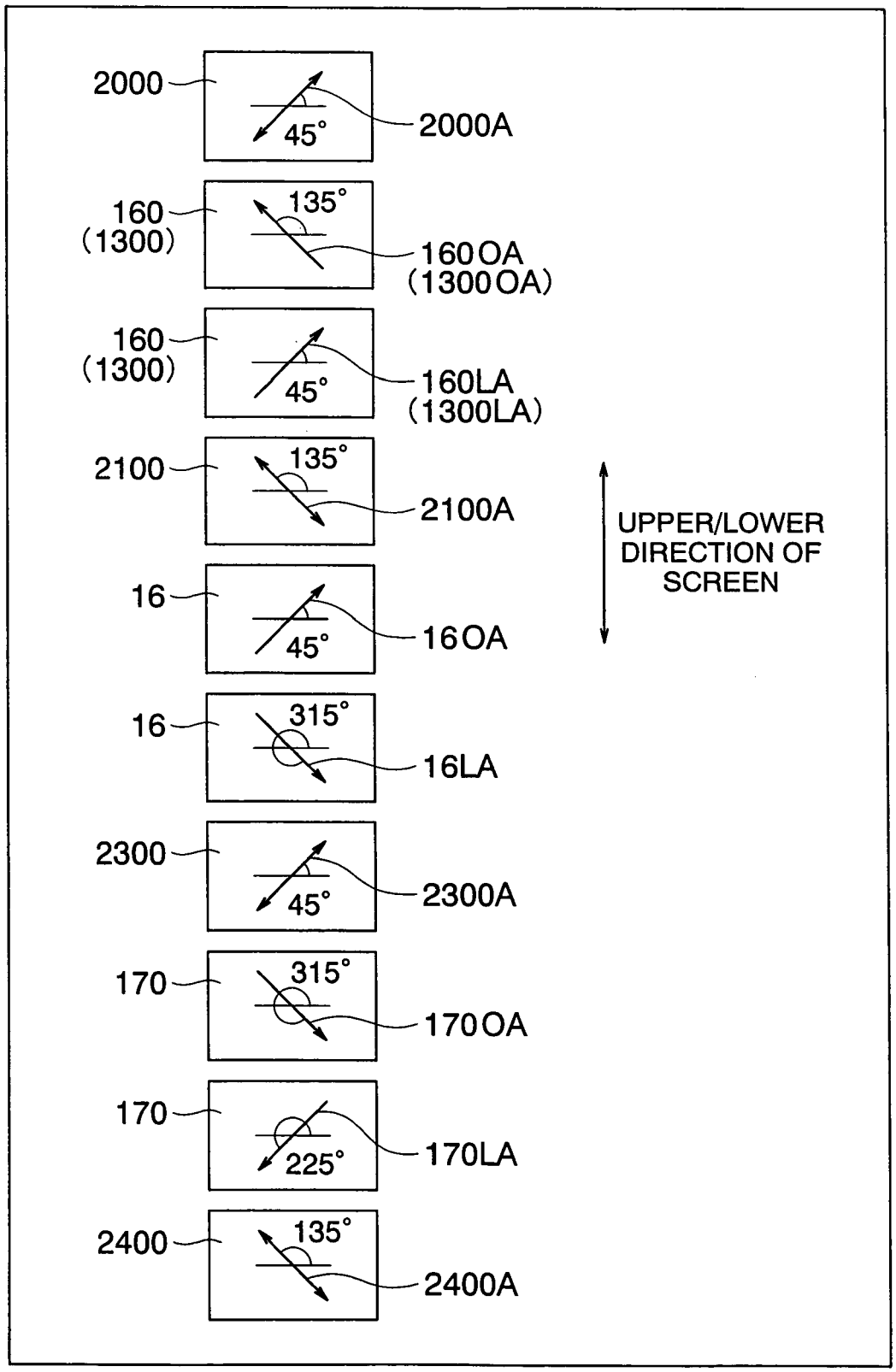
FIG. 44 is an explanatory diagram for explaining a relationship as to optical axes of an optical member related to a display device of the present invention.

FIG. 44 is a diagram for representing one example as to optical axes such as absorption axes of polarizers, an alignment axis of the liquid crystal layer of the liquid crystal display panel 10, and alignment axes of the liquid crystal layers of the view angle controlling elements 36 and 37 related to the display device 1 of this embodiment 13.

As shown in FIG. 44, in the display device 1 of this embodiment 13, it is so arranged that an absorption axis 2400A of the polarizing layer of the polarizing film 2400 corresponds to 135 degrees; and an alignment axis 170LA of the liquid crystal layer 170 of the view angle controlling element 37 on the side of the polarizing film 2400 corresponds to 225 degrees, and an alignment axis 170OA thereof on the side of the third polarizing film 2300 corresponds to 315 degrees. Also, an absorption axis 2300A of the polarizing layer of the third polarizing film 2300 corresponds to 45 degrees; and an alignment axis 16LA of the liquid crystal layer 16 of the liquid crystal display panel 10 on the side of the third polarizing film 2300 corresponds to 315 degrees, and an alignment axis 16OA thereof on the side of the second polarizing film 2100 corresponds to 45 degrees. An alignment axis 160LA of the liquid crystal layer 160 of the view angle controlling element 36 on the side of the second polarizing film 2100 corresponds to 45 degrees, and an alignment axis 160OA thereof on the side of the first polarizing film 2000 corresponds to 315 degrees. Also, an absorption axis 2000A of the polarizing layer of the first polarizing film 2000 corresponds to 45 degrees.

In this case, such a light which has been emitted from the illuminating device 20 and has passed through the polarizing film 2400 for constituting the view angle controlling element 37, penetrates through the liquid crystal layer 170, and then, is entered into the second polarizing film 2100. When a drive voltage is not applied to the liquid crystal layer 170 of the view angle control element 37, polarized planes of major light components of the light which has passed through the polarizing film 2400 and has penetrated through the liquid crystal layer 170 are rotated by an angle of 90 degrees, and penetrates through the second polarizing film 2100. As a result, high transmittance may be achieved over a wide view angle range.

On the other hand, when a drive voltage is applied to the liquid crystal layer 170 of the view angle controlling element 37, among the light which has passed through the polarizing film 2400 and has penetrated through the liquid crystal layer 170, such a light which is traveled in a predetermined azimuth angle and along a predetermined polar angle direction where an effective phase difference of the liquid crystal layer 170 becomes 0, or nearly equal to 0, is absorbed by the second polarizing film 2100.

That is to say, such a display device 1 can be realized by which in such a case that the drive voltage is not applied to the liquid crystal layer 170, the bright illumination light can be obtained in a wide view angle range, whereas when the drive voltage is applied to the liquid crystal layer 170, the illumination light from the illuminating device 20 is darkened in the predetermined azimuth angle and the predetermined polar angle direction. In this embodiment 12, the brightness of the illuminating light directed to the predetermined polar angle direction at such an azimuth angle corresponding to the left direction can be switched by the view angle controlling element 37.

Such a light which has passed through the third polarizing film 2300 passes through the liquid crystal layer 16, and then, is entered to the second polarizing film 2100. In this case, since such a voltage corresponding to picture information supplied from a picture information generating unit (not shown) is applied to the liquid crystal layer 16, the polarization condition of the light which passes through the liquid crystal layer 16 is controlled, and an amount of light which passes through the second polarizing film 2100 is adjusted, so that desirable picture light can be produced.

Next, the light which has passed through the second polarizing film 2100 penetrates through the liquid crystal layer 160 which constitutes the view angle controlling element 36, and then, is entered into the first polarizing film 2000.

When a drive voltage is not applied to the liquid crystal layer 160 of the view angle control element 36, polarized planes of major light components of the light which has passed through the second polarizing film 2100 and has penetrated through the liquid crystal layer 160 are rotated by an angle of 90 degrees, and penetrates through the first polarizing film 2000. As a result, high transmittance may be achieved over a wide view angle range.

On the other hand, when a drive voltage is applied to the liquid crystal layer 160 of the view angle controlling element 36, among the light which has passed through the second polarizing film 2100 and has penetrated through the liquid crystal layer 160, such a light which is traveled in a predetermined azimuth angle and along a predetermined polar angle direction where an effective phase difference of the liquid crystal layer 160 becomes 0, or nearly equal to 0, is absorbed by the first polarizing film 2000.

That is to say, such a display device 1 can be realized by which in such a case that the drive voltage is not applied to the liquid crystal layer 160, the bright picture can be obtained in a wide view angle range, whereas when the drive voltage is applied to the liquid crystal layer 160, the picture is darkened in the predetermined azimuth angle and the predetermined polar angle direction. In this embodiment 13, the brightness of the picture along the predetermined polar angle direction at such an azimuth angle corresponding to the left direction can be switched by the view angle controlling element 36.

As a consequence, such a display device can be realized by which when only the view angle controlling element 36 is driven, the brightness of the picture along the predetermined polar angle can be switched at the azimuth angle which corresponds to the right direction of the screen. Also, such a display device can be realized by which when only the view angle controlling element 37 is driven, the brightness of the picture along the predetermined polar angle can be switched at the azimuth angle which corresponds to the left direction of the screen. Furthermore, such a display device can be realized by which when both the view angle controlling element 36 and the view angle controlling element 37 are simultaneously driven, the brightness of the picture along the predetermined polar angle can be switched at the azimuth angles which correspond to the right direction of the screen and also the left direction thereof.

As previously explained, in the display device 1 of this embodiment 13, when the screen is observed along the oblique direction, brightness of the picture along the right/left direction of the screen is arbitrarily darken, so that visibility can be deteriorated. In such a case that such a view angle characteristic is applied to display devices of portable appliances such as a portable telephone, a notebook PC, and a PDA, and also to display devices of public-use appliances such as an ATM, this view angle characteristic may achieve an effect capable of avoiding peeping actions along a lateral direction.

Also, in the display device 1 of this embodiment 13, the brightness of the picture along the predetermined polar angle direction can be independently controlled along both the left direction and the right direction of the screen. As a consequence, for instance, the screen is set to a bright condition with respect to a person located on a left side of the own operator, so that visibility can be improved and both the own operator and this left-sided person can observe this screen, whereas any persons cannot peep on this screen from the left direction.

It should also be understood that in the display device of this embodiment 13, both the polarizing films for constituting the view angle controlling elements 36, 37 and the polarizing film for constituting the liquid crystal display panel 10 are realized by a single polarizing film. In this case, both the light which is effectively utilized in the view angle controlling element 36, or 37 and the light which is effectively utilized in the liquid crystal display panel 10 correspond to the same linearly polarized light, and a total number of the polarizing layers which cause the optical loss is decreased. As a result, such a display device capable of having a brighter representation can be realized. Otherwise, if the same bright representation is made, then such a display device operable under lower electric power can be realized.

It should also be noted that in the above-explained embodiments, such a polarizing film has been employed which is arranged by sandwiching the polarizing layer whose base material is polyvinylalcohol by the protection films. Alternatively, since a coating type polarizing film is employed, these protection films may be omitted.

Also, a reflection preventing process by a reflection preventing film may be carried out with respect to a boundary plane between air and each of the structural members.

Also, in the display devices according to the present invention, a reflection type polarizing film may be alternatively arranged on the frontmost surface. In this alternative case, a reflection axis of this reflection type polarizing film may be arranged in such a manner that among the polarizing films for constituting the display devices, this reflection axis is located parallel to an absorption axis of a polarizing layer of such a polarizing film which is arranged on the frontmost surface side.

In this case, when the illuminating device is turned ON and the liquid crystal display panel is driven, a picture may be observed through this reflection type polarizing film. On the other hand, when the illuminating device is turned OFF, the externally supplied light is reflected on this reflection type polarizing film, the screen may become such a mirror-like condition.

Also, in such a case that picture light projected to the oblique direction is limited by either a view angle limiting element or a view angle controlling element, the visibility of the picture is further deteriorated by reflecting the externally supplied light by the reflection type polarizing film. As a result, a higher peeping action preventing effect may be achieved.

Both the view angle limiting elements and the view angle controlling elements, according to the present invention, can suppress, or control that the light is penetrated at the predetermined azimuth angle and along the polar angle direction. In the case that such view angle limiting/controlling elements are applied to a monitor mounted on a vehicle, this view angle characteristic may achieve an effect capable of avoiding that image light falls on a windshield of the vehicle. In the case that such view angle limiting/controlling elements are applied to display devices of terminal units and display devices of public-use appliances such as an ATM, this view angle characteristic may achieve an effect capable of avoiding peeping actions.

Also, since such a display device to which either the view angle limiting element or the view angle controlling element of the present invention is applied may have the peeping action preventing effect, this display device may be suitably used as a display device for a portable appliance such as portable telephone, a PDA, and a notebook PC, which are expected to be used in crowded persons.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical element comprising:
a first polarizing layer; a second polarizing layer; and a liquid crystal layer arranged between said first polarizing layer and said second polarizing layer; wherein: absorption axes of said first polarizing layer and said second polarizing layer are located parallel to each other; said liquid crystal layer corresponds to hybrid-aligned nematic liquid crystal; an alignment axis of said liquid crystal layer is located substantially parallel to or perpendicular to the absorption axes of the first and second polarizing layers on a side of said liquid crystal layer facing said second polarizing layer;
said optical element being further comprised of:
a phase difference plate having an optically negative uni-axial anisotropic medium on the side of said liquid crystal layer having liquid crystal molecules vertically, or substantially vertically aligned.

2. A display device comprising:
an optical element including: a first polarizing layer; a second polarizing layer; and a liquid crystal layer arranged between said first polarizing layer and said second polarizing layer; in which absorption axes of said first polarizing layer and said second polarizing layer are located parallel to each other; said liquid crystal layer corresponds to hybrid-aligned nematic liquid crystal; an alignment axis of said liquid crystal layer is located substantially parallel to or perpendicular to the absorption axes of the first and second polarizing layers on a side of said liquid crystal layer facing said second polarizing layer; and in which said optical element is further comprised of: a phase difference plate having an optically negative uni-axial anisotropic medium on the side of said liquid crystal layer having liquid crystal molecules vertically, or substantially vertically aligned;
an illuminating device for illuminating light toward said optical element; and
a liquid crystal display panel including: a third polarizing layer; and a liquid crystal layer arranged between either said first polarizing layer or said second polarizing layer and said third polarizing layer, said a liquid crystal display panel displaying a picture by adjusting an amount of light illuminated from said illuminating device.

3. A display device as claimed in claim 2, wherein:
said optical element is further comprised of:
a reflection type polarizing layer provided on the side of said illuminating device of at least one of said first polarizing layer and said second polarizing layer.

4. An optical element comprising:
a first transparent substrate; a second transparent substrate arranged opposite to said first transparent substrate; a liquid crystal layer arranged between said first transparent substrate and said second transparent substrate; a first transparent electrode and a first alignment layer which are arranged between said liquid crystal layer and said first transparent substrate; a second transparent electrode and a second alignment layer which are arranged between said liquid crystal layer and said second transparent substrate; a phase difference plate arranged on the side of said first transparent substrate, as viewed from said liquid crystal layer, which phase difference plate is by comprised of an optically negative uni-axial anisotropic medium; a first polarizing layer arranged on the opposite side from said liquid crystal layer side, as viewed from said phase difference plate; and a second polarizing layer arranged on the side of said second transparent substrate, as viewed from said liquid crystal layer; wherein:
liquid crystal molecules of said liquid crystal layer are comprised of nematic liquid crystal whose dielectric anisotropy is positive, said nematic liquid crystal being aligned under such a condition that liquid crystal molecules are vertically, or substantially vertically aligned with respect to a substrate plane on the side of said liquid crystal layer facing said first transparent substrate, and also, are aligned parallel to, or substantially parallel with respect to a substrate plane on the side of said liquid crystal layer facing said second transparent substrate;
absorption axes of said first polarizing layer and said second polarizing layer are located parallel to each other; and
an alignment axis of said second alignment layer is located parallel to, or perpendicular to the absorption axes of said first polarizing layer and said second polarizing layer.

5. An optical element as claimed in claim 4, wherein:
said optical element is further comprised of:
a reflection type polarizing layer which is provided on both of said first polarizing layer and said second polarizing layer, or on a side of said first polarizing layer or said second polarizing layer opposite to a light emitting direction of said first polarizing layer and said second polarizing layer.

6. A display device comprising:
a first transparent substrate; a second transparent substrate arranged opposite to said first transparent substrate; a liquid crystal layer arranged between said first transparent substrate and said second transparent substrate; a first transparent electrode and a first alignment layer which are arranged between said liquid crystal layer and said first transparent substrate; a second transparent electrode and a second alignment layer which are arranged between said liquid crystal layer and said second transparent substrate; a phase difference plate arranged on the side of said first transparent substrate, as viewed from said liquid crystal layer, which phase difference plate is comprised of an optically negative uni-axial anisotropic medium; a first polarizing layer arranged on the opposite side from said liquid crystal layer side, as viewed from said phase difference plate; and a second polarizing layer arranged on the side of said second transparent substrate, as viewed from said liquid crystal layer; in which
liquid crystal molecules of said liquid crystal layer by are comprised of nematic liquid crystal whose dielectric anisotropy is positive, said nematic liquid crystal being aligned under such a condition that liquid crystal molecules are vertically, or substantially vertically aligned with respect to a substrate plane on the side of said liquid crystal layer facing said first transparent substrate, and also, are aligned parallel to, or substantially parallel with respect to a substrate plane on the side of said liquid crystal layer facing said second transparent substrate; absorption axes of said first polarizing layer and said second polarizing layer are located parallel to each other; and an alignment axis of said second alignment layer is located parallel to, or perpendicular to the absorption axes of said first polarizing layer and said second polarizing layer;
an illuminating device for illuminating light toward said optical element; and a liquid crystal display panel including: a third polarizing layer; and a liquid crystal layer arranged between either said first polarizing layer or said second polarizing layer and said third polarizing layer; said liquid crystal display panel displaying a picture by adjusting an amount of light illuminated from said illuminating device.

* * * * *